United States Patent
Feng et al.

(10) Patent No.: US 11,988,891 B2
(45) Date of Patent: May 21, 2024

(54) DISCRETE VARIABLE FOCUS ASSEMBLIES, APPARATUSES, AND METHODS OF USE

(71) Applicant: Hand Held Products, Inc., Charlotte, NC (US)

(72) Inventors: Chen Feng, Snohomish, WA (US); Tao Xian, Mount Laurel, NJ (US); Paul Poloniewicz, Waxhaw, NC (US); Scott Bracken, Lynwood, WA (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 17/814,723

(22) Filed: Jul. 25, 2022

(65) Prior Publication Data
US 2022/0357552 A1 Nov. 10, 2022

Related U.S. Application Data

(63) Continuation of application No. 16/781,444, filed on Feb. 4, 2020, now Pat. No. 11,428,894.

(51) Int. Cl.
*G02B 7/04* (2021.01)

(52) U.S. Cl.
CPC ..................... *G02B 7/04* (2013.01)

(58) Field of Classification Search
CPC . G02B 7/04; G02B 7/023; G02B 7/08; G02B 27/0018; H02K 41/031; G06K 7/10841
(Continued)

(56) References Cited

U.S. PATENT DOCUMENTS

| 5,289,442 A | 2/1994 | Van Rosmalen |
| 5,499,143 A | 3/1996 | Sakamoto et al. |

(Continued)

FOREIGN PATENT DOCUMENTS

| CN | 101023386 A | 8/2007 |
| CN | 101443686 A | 5/2009 |

(Continued)

OTHER PUBLICATIONS

Extended European Search Report dated Jul. 21, 2023 for EP Application No. 23158736, 7 page(s).

(Continued)

*Primary Examiner* — William R Alexander
(74) *Attorney, Agent, or Firm* — Alston & Bird LLP

(57) ABSTRACT

Various embodiments described herein provide a discrete focusing lens assembly. Some embodiments are designed to enable repositioning of one or more components, such as a lens barrel assembly, to adjust the focus of the discrete focusing lens assembly. Some example discrete focusing lens assemblies include a module base housing a lens barrel assembly having a pair of positioning magnets, a pair of positioning coil assemblies associated with the positioning magnets, and at least one module alignment pin positioning and/or aligning some or all of the components. The positioning coil assemblies together with the positioning magnets are configured to exert various magnetic fields to reposition the lens barrel assembly. Further embodiments are provided for imaging apparatus including at least one discrete focusing lens assembly described herein. Further, embodiments are provided for processes for assembling a discrete focusing lens assembly described herein.

17 Claims, 23 Drawing Sheets

(58) Field of Classification Search
USPC .......................................................... 359/824
See application file for complete search history.

(56) References Cited

U.S. PATENT DOCUMENTS

| | | | |
|---|---|---|---|
| 8,711,496 B2 | 4/2014 | Wu | |
| 9,134,503 B2 | 9/2015 | Topliss | |
| 10,036,896 B2 | 7/2018 | Hee et al. | |
| 10,656,373 B1* | 5/2020 | Bardagjy | H02K 41/031 |
| 2005/0264901 A1 | 12/2005 | Honsho | |
| 2006/0214520 A1 | 9/2006 | Tseng | |
| 2007/0035628 A1 | 2/2007 | Kanai | |
| 2007/0047942 A1 | 3/2007 | Chang et al. | |
| 2007/0127325 A1 | 6/2007 | Yamashita | |
| 2007/0217043 A1 | 9/2007 | Cho et al. | |
| 2008/0225410 A1 | 9/2008 | Ning et al. | |
| 2008/0266684 A1 | 10/2008 | Chang | |
| 2010/0046085 A1* | 2/2010 | Yumiki | G03B 17/14 |
| | | | 359/695 |
| 2010/0053768 A1* | 3/2010 | Yumiki | G02B 15/144109 |
| | | | 359/698 |
| 2010/0060995 A1* | 3/2010 | Yumiki | H04N 23/69 |
| | | | 359/823 |
| 2010/0237718 A1 | 9/2010 | Tsai et al. | |
| 2010/0246035 A1 | 9/2010 | Yamashita et al. | |
| 2011/0103789 A1* | 5/2011 | Honjo | H04N 23/663 |
| | | | 348/335 |
| 2011/0116176 A1* | 5/2011 | Yumiki | H04N 23/55 |
| | | | 359/704 |
| 2011/0164154 A1* | 7/2011 | Honjo | H04N 23/663 |
| | | | 348/241 |
| 2011/0235187 A1* | 9/2011 | Yumiki | G02B 15/144109 |
| | | | 359/694 |
| 2011/0242404 A1* | 10/2011 | Yumiki | G02B 15/144109 |
| | | | 348/360 |
| 2011/0242405 A1* | 10/2011 | Yumiki | H04N 23/69 |
| | | | 348/360 |
| 2011/0242406 A1* | 10/2011 | Yumiki | H04N 23/673 |
| | | | 348/360 |
| 2011/0242681 A1* | 10/2011 | Yumiki | H04N 23/673 |
| | | | 359/704 |
| 2011/0254996 A1* | 10/2011 | Yumiki | H04N 23/69 |
| | | | 348/360 |
| 2011/0254997 A1* | 10/2011 | Yumiki | H04N 23/69 |
| | | | 348/360 |
| 2012/0002102 A1 | 1/2012 | Sekimoto | |
| 2012/0120511 A1 | 5/2012 | Ku | |
| 2012/0182633 A1 | 7/2012 | Kobayashi et al. | |
| 2012/0237147 A1 | 9/2012 | Utz | |
| 2013/0062414 A1 | 3/2013 | Anselment et al. | |
| 2013/0235470 A1* | 9/2013 | Yumiki | G02B 15/144109 |
| | | | 359/696 |
| 2013/0235483 A1 | 9/2013 | Wu | |
| 2014/0160535 A1 | 6/2014 | Shen et al. | |
| 2015/0110480 A1 | 4/2015 | Suzuka | |
| 2015/0110481 A1 | 4/2015 | Suzuka | |
| 2015/0110482 A1 | 4/2015 | Suzuka | |
| 2015/0296143 A1 | 10/2015 | Kang et al. | |
| 2015/0373272 A1 | 12/2015 | Lim et al. | |
| 2016/0252702 A1 | 9/2016 | Tsuchiya et al. | |
| 2017/0192195 A1 | 7/2017 | Murakami | |
| 2018/0004994 A1 | 1/2018 | Bottazzi et al. | |
| 2018/0024329 A1 | 1/2018 | Goldenberg et al. | |
| 2018/0031860 A1 | 2/2018 | Bachar et al. | |
| 2018/0109660 A1 | 4/2018 | Yoon et al. | |
| 2018/0196238 A1 | 7/2018 | Goldenberg et al. | |
| 2018/0224631 A1 | 8/2018 | Ichihashi | |
| 2018/0224665 A1 | 8/2018 | Im et al. | |
| 2018/0364450 A1 | 12/2018 | Lee et al. | |
| 2019/0121053 A1 | 4/2019 | Hagiwara | |
| 2019/0162934 A1 | 5/2019 | Dong | |
| 2019/0196137 A1 | 6/2019 | Ushioda | |
| 2019/0265432 A1 | 8/2019 | Kawanabe | |
| 2020/0249426 A1 | 8/2020 | Kazuo | |
| 2020/0260011 A1 | 8/2020 | Sasaki et al. | |
| 2020/0341350 A1 | 10/2020 | Tseng et al. | |
| 2021/0063679 A1 | 3/2021 | Park | |
| 2021/0231904 A1 | 7/2021 | Son et al. | |
| 2021/0239932 A1 | 8/2021 | Feng et al. | |
| 2021/0382262 A1 | 12/2021 | Wu et al. | |
| 2022/0046151 A1 | 2/2022 | Shabtay et al. | |

FOREIGN PATENT DOCUMENTS

| | | |
|---|---|---|
| CN | 102906763 A | 1/2013 |
| CN | 203365879 U | 12/2013 |
| CN | 108088424 A | 5/2018 |
| CN | 108345083 A | 7/2018 |
| CN | 109188641 A | 1/2019 |
| CN | 110908067 A | 3/2020 |
| EP | 3862803 A1 | 8/2021 |
| JP | S59-094709 A | 5/1984 |
| JP | 05-094629 A | 4/1993 |
| JP | 2007-074696 A | 3/2007 |
| JP | 2007-155886 A | 6/2007 |
| JP | 2010-068635 A | 3/2010 |
| JP | 2011-039481 A | 2/2011 |
| JP | 2012-093558 A | 5/2012 |
| JP | 2012-145837 A | 8/2012 |
| JP | 2012-189711 A | 10/2012 |
| JP | 2015-099275 A | 5/2015 |
| JP | 2015-127724 A | 7/2015 |
| JP | 3200481 U | 10/2015 |
| JP | 2016-020939 A | 2/2016 |
| JP | 2016-028299 A | 2/2016 |
| JP | 2018-128588 A | 8/2018 |
| JP | 2018-180352 A | 11/2018 |
| JP | 2019-078850 A | 5/2019 |
| JP | 2019-101403 A | 6/2019 |
| WO | 2014/210516 A2 | 12/2014 |
| WO | 2015/110916 A1 | 7/2015 |
| WO | 2020/013465 A1 | 1/2020 |
| WO | 2020/027588 A1 | 2/2020 |

OTHER PUBLICATIONS

English Translation of JP Office Action dated Jul. 8, 2022 for JP Application No. 2021014562, 3 pages.
English Translation of JP Office Action, including Search Report, dated Mar. 25, 2022 for JP Application No. 2021014562, 18 pages.
European search report dated Jul. 1, 2021 for EP Application No. 21154455.
Extended European search report dated Jul. 1, 2021 for EP Application No. 21154455, 9 pages.
JP Office Action dated Jul. 8, 2022 for JP Application No. 2021014562, 2 pages.
JP Office Action dated Mar. 25, 2022 for JP Application No. 2021014562.
Non-Final Office Action received for U.S. Appl. No. 16/781,444, dated Jan. 5, 2022, 18 pages.
Notice of Allowance received for U.S. Appl. No. 16/781,444, dated Apr. 21, 2022, 10 pages.
Notice of Allowance received for U.S. Appl. No. 16/781,444, dated Jun. 10, 2022, 2 pages.
CN Office Action dated Sep. 1, 2023 for CN Application No. 202110156292, 8 page(s).
English Translation of JP Notice of Allowance, including Search Report dated May 29, 2023 for JP Application No. 2022005668, 2 page(s).
English Translation of JP Office Action dated Apr. 5, 2023 for JP Application No. 2022005668, 5 page(s).
English Translation of JP Office Action dated Dec. 7, 2022 for JP Application No. 2022005668, 4 page(s).
English Translation of JP Office Action dated Jul. 27, 2023 for JP Application No. 2022178791, 3 page(s).
European search report dated Dec. 20, 2022 for EP Application No. 22152327, 9 page(s).
JP Notice of Allowance, including Search Report dated May 29, 2023 for JP Application No. 2022005668, 3 page(s).

(56) References Cited

OTHER PUBLICATIONS

JP Office Action dated Apr. 5, 2023 for JP Application No. 2022005668, 7 page(s).
JP Office Action dated Dec. 7, 2022 for JP Application No. 2022005668.
JP Office Action dated Jul. 27, 2023 for JP Application No. 2022178791, 3 page(s).
Non-Final Rejection dated Jun. 12, 2023 for U.S. Appl. No. 17/157,986, 11 page(s).
Requirement for Restriction/Election dated Mar. 20, 2023 for U.S. Appl. No. 17/157,986, 7 page(s).
Notice of Allowance and Fees Due (PTOL-85) dated Sep. 26, 2023 for U.S. Appl. No. 17/157,986, 10 page(s).
Intention to grant dated Oct. 11, 2023 for EP Application No. 21154455, 9 page(s).
U.S. Appl. No. 16/781,444, filed Feb. 4, 2020, U.S. Pat. No. 11,428,894.
Decision to grant a European patent Mailed on Feb. 15, 2024 for EP Application No. 21154455, 2 page(s).
Non-Final Rejection Mailed on Feb. 1, 2024 for U.S. Appl. No. 17/654,502, 12 page(s).
Intention to grant Mailed on Jan. 19, 2024 for EP Application No. 22152327, 9 page(s).
CN Office Action Mailed on Mar. 5, 2024 for CN Application No. 202110156292, 11 page(s).
Communication about intention to grant a European patent Mailed on Jan. 19, 2024 for EP Application No. 22152327, 7 page(s).
English Translation of JP Office Action dated Nov. 2, 2023 for JP Application No. 2022178791, 4 page(s).
JP Office Action Mailed on Nov. 2, 2023 for JP Application No. 2022178791, 4 page(s).

* cited by examiner

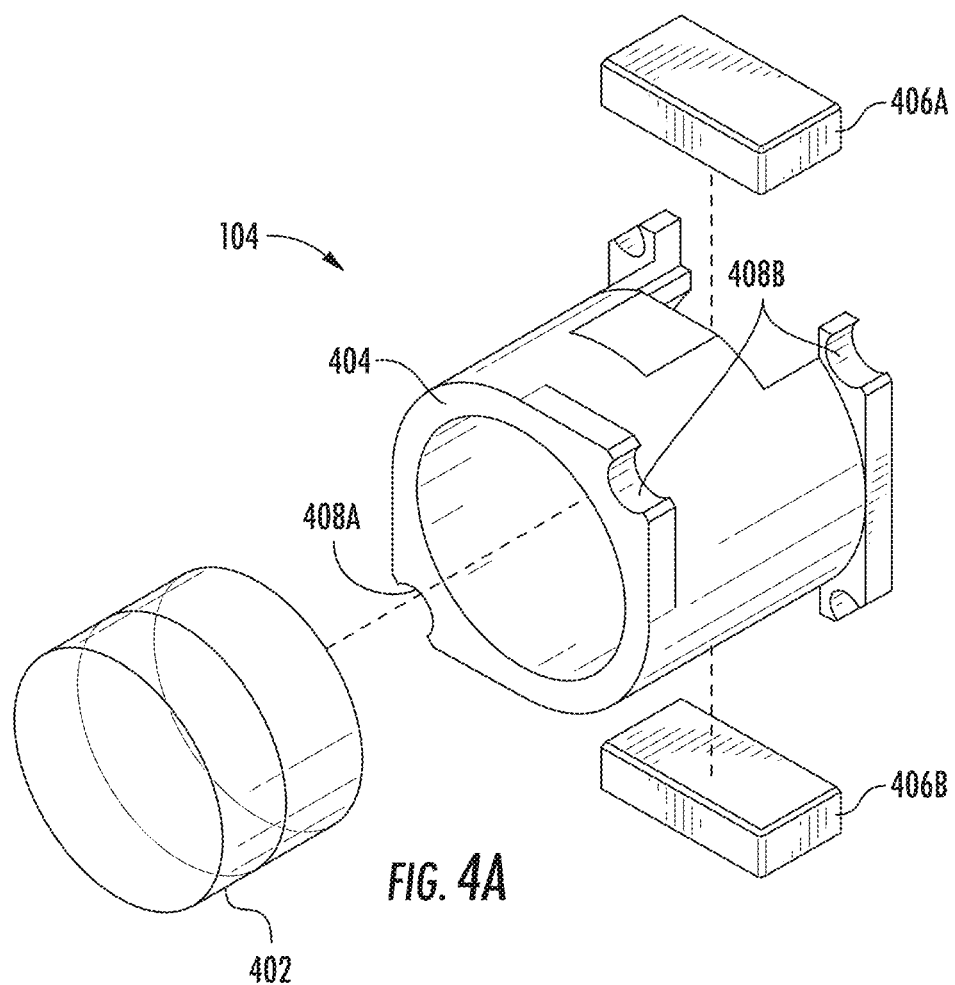
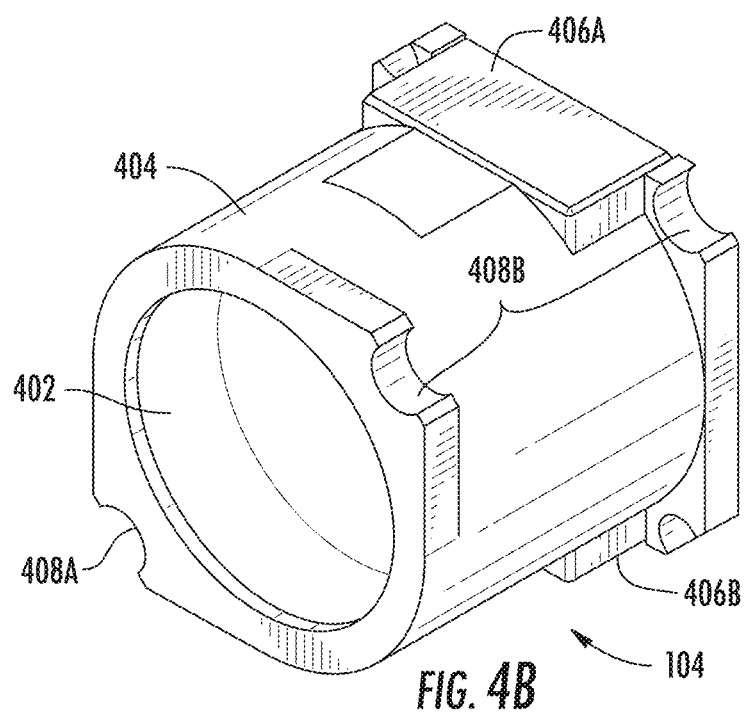

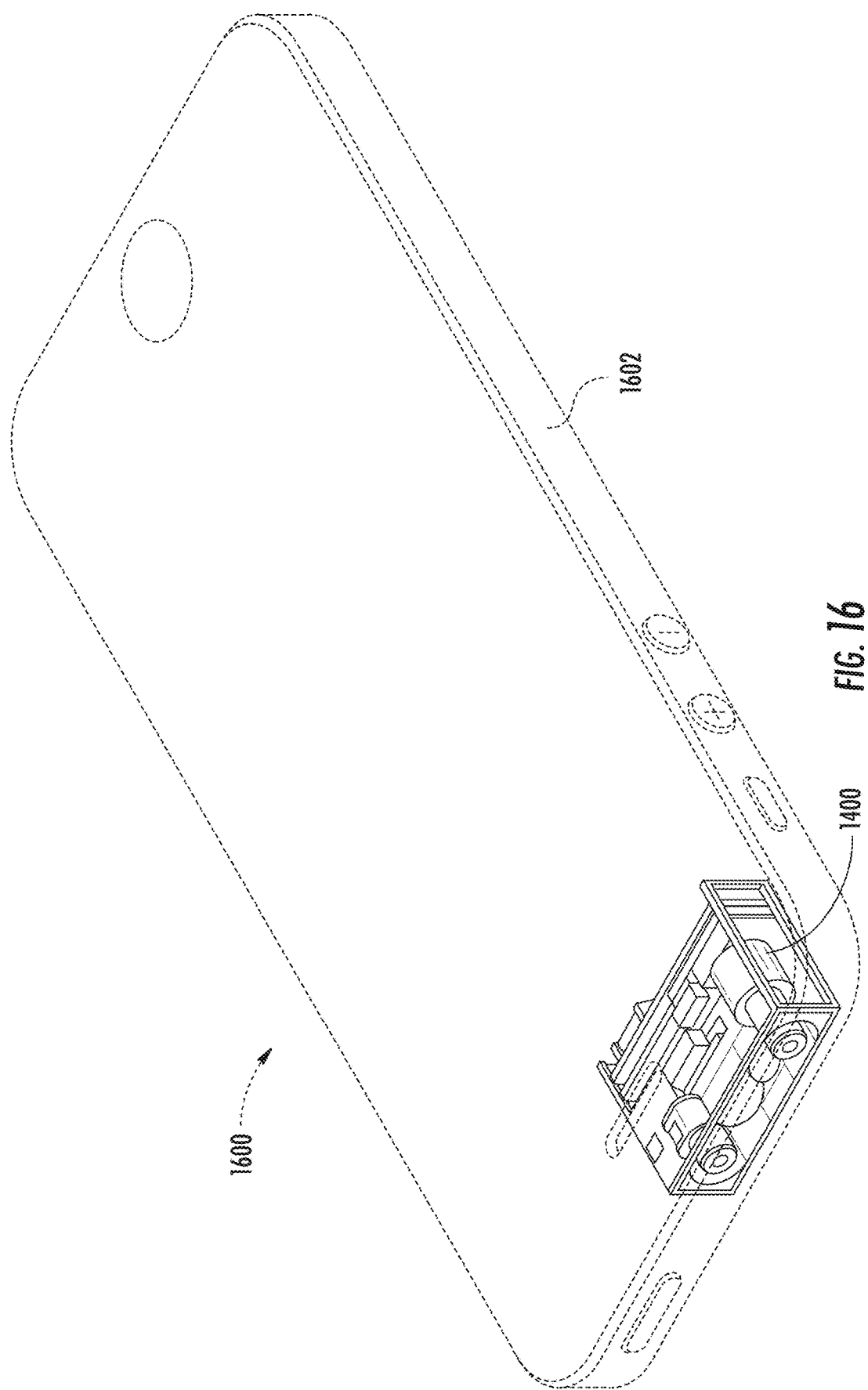

DISCRETE VARIABLE FOCUS ASSEMBLIES, APPARATUSES, AND METHODS OF USE

CROSS REFERENCE TO RELATED APPLICATIONS

This application is a continuation of U.S. application Ser. No. 16/781,444, titled "DISCRETE VARIABLE FOCUS ASSEMBLIES AND APPARATUSES," filed Feb. 4, 2020, the contents of which are incorporated herein by reference in their entirety.

TECHNOLOGICAL FIELD

Embodiments of the present disclosure generally relate to lens focusing assemblies for imaging apparatuses, such as barcode and/or other symbology scanners, and specifically to variable focus lens assemblies for use in small form factor imaging apparatuses and configured for discrete focusing using electromagnetism.

BACKGROUND

Lenses are often designed such that objects at a particular predetermined range appear in focus via the lens. In this regard, an imaging apparatus may utilize a sensor to capture an image data object representing a field of view via the lens. Stationary lenses are limited to the predetermined range being in focus. Variable focus lenses advantageously provide the ability to alter the predetermined range, conventional implementations for variable focusing remain bulky, slow, and/or vulnerable to one or more environmental impacts. In this regard, conventional variable focus lenses are often not suitable for use in small form factor mobile imaging apparatuses, and/or physically cannot fit within such apparatuses for use. Applicant has discovered problems with current implementations of variable focus lens assemblies and apparatuses. Through applied effort, ingenuity, and innovation, Applicant has solved many of these identified problems by developing embodied in the present disclosure, which are described in detail below.

BRIEF SUMMARY

In general, embodiments of the present disclosure provided herein include discrete focusing lens assemblies and discrete focus imaging apparatuses including one or more such assemblies. Other implementations for one or more of the discrete focusing lens assemblies and/or discrete focusing imaging apparatuses will be, or will become, apparent to one with skill in the art upon examination of the following figures and detailed description. It is intended that all such additional implementations be included within this description be within the scope of the disclosure, and be protected by the following claims.

In accordance with one aspect of the present disclosure, a discrete focusing lens assembly is provided. The discrete focusing lens assembly is configured to position at least a lens barrel assembly to a predefined number of focal positions, and/or within a continuous set of focal positions, with reduced form factor such that the assembly may be fit within a small form factor apparatus chassis. In at least one example embodiment, an example discrete focusing lens assembly comprises a positioning coil board comprising at least a first positioning coil assembly and a second positioning coil assembly. The example discrete focusing lens assembly further comprises a lens barrel assembly. The example discrete focusing lens further comprises a module base defining an inner module space designed to fit the lens barrel assembly, where the module base is designed to support the first positioning coil assembly at a first coil position and the second positioning coil assembly at a second coil position, the first coil position opposite the second coil position. The example discrete focusing lens further comprises at least one module alignment pin engaged with the module base, the positioning coil board, and the lens barrel assembly, where the first positioning coil assembly and the second positioning coil assembly, together with the lens barrel assembly, define a focus position for the lens barrel assembly.

Additionally or alternatively, in at least some embodiments of the discrete focusing lens assembly, the first positioning coil assembly comprises a first positioning coil, the first positioning coil is positioned around a first positioning pad, and the second positioning coil assembly comprises a second positioning coil, where the second positioning coil is positioned around a second positioning pad, and where the lens barrel assembly comprises a first positioning magnet located adjacent to the first positioning pad, a second positioning magnet located adjacent to the second positioning pad, and an imaging optical lens, where first positioning pad, the first positioning coil, and the first positioning magnet together with the second positioning pad, the second positioning coil, and the second positioning magnet define the focus position for the lens barrel assembly. Additionally or alternatively, in at least some such embodiments of the discrete focusing lens assembly, the first positioning pad is located in a first coil inner region defined by the first positioning coil and the second positioning pad is located in a second coil inner region defined by the second positioning coil. Additionally or alternatively, in at least some such embodiments of the discrete focusing lens assembly, the first positioning pad comprises a first iron positioning pad, and wherein the second positioning pad comprises a second iron positioning pad. Additionally or alternatively, in at least some such embodiments of the discrete focusing lens assembly, the focus position comprises a default focus position in a circumstance where the positioning coil board is in a non-powered state, and the first positioning pad is aligned with the first positioning magnet and the second positioning pad is aligned with the second positioning magnet at the default focus position. Additionally or alternatively, in at least some such embodiments of the discrete focusing lens assembly, the default focus position is based on a default focus range.

Additionally or alternatively, in at least some such embodiments of the discrete focusing lens assembly, the first positioning magnet and the second positioning magnet each comprise a non-glossy dark surface. Additionally or alternatively, in at least some such embodiments of the discrete focusing lens assembly, the non-glossy dark surface comprises a magnet surface epoxy.

Additionally or alternatively, in at least some embodiments of the discrete focusing lens assembly, the module base, the positioning coil board, and the lens barrel assembly each comprise at least one alignment pin opening, each alignment pin opening positioned to enable the at least one module alignment pin to engage each of the module base, the positioning coil board, and the lens barrel assembly through the at least one alignment pin opening.

Additionally or alternatively, in at least some embodiments of the discrete focusing lens assembly, the module base, the positioning coil board, and the lens barrel assembly each comprise a first alignment pin opening and a second alignment pin opening, each of the first alignment pin openings located opposite one of the second alignment pin openings, and the at least one module alignment pin comprises a first alignment pin and a second alignment pin, where the first alignment pin is engaged with the module base, the positioning coil board, and the lens barrel assembly via each of the first alignment pin openings, and where the second alignment pin is engaged with the module base, the positioning coil, and the lens barrel assembly via each of the second alignment pin openings.

Additionally or alternatively, in at least some embodiments of the discrete focusing lens assembly, the focus position comprises a continuous focus position based on a value of a powered state for the positioning coil board.

Additionally or alternatively, in at least some embodiments of the discrete focusing lens assembly, the discrete focusing lens assembly comprises an assembly height of less than 7 millimeters.

Additionally or alternatively, in at least some embodiments of the discrete focusing lens assembly, the focus position for the lens barrel assembly comprises a first focus position in a circumstance where the positioning coil board is in a first powered state, the focus position for the lens barrel assembly comprises a second focus position in a circumstance where the positioning coil board is in a second powered state, and the focus position for the lens barrel assembly comprises a default focus position in a circumstance where the positioning coil board is in a non-powered state.

Additionally or alternatively, in at least some embodiments of the discrete focusing lens assembly, the discrete focusing lens assembly further comprises coil powering circuitry connected to the positioning coil board, the first positioning coil assembly, the second positioning coil assembly, or a combination thereof, where the coil powering circuitry is configured to power the first positioning coil assembly, the second positioning coil assembly, or a combination thereof.

Additionally or alternatively, in at least some embodiments of the discrete focusing lens assembly, the module base comprises a first positioning area to receive the first positioning coil assembly and a second positioning area to receive the second positioning coil assembly.

Additionally or alternatively, in at least some embodiments of the discrete focusing lens assembly, the at least one module alignment pin comprises a friction-free pin.

Additionally or alternatively, in at least some embodiments of the discrete focusing lens assembly, the discrete focusing lens assembly further comprises a lens mount for mounting the discrete focusing lens assembly within an imaging apparatus, wherein the lens mount is attached to the module base.

In accordance with another aspect of the present disclosure, a multi-sensor imaging apparatus is provided. The multi-sensor imaging apparatus is configured for discrete focusing as disclosed herein. The multi-sensor imaging apparatus comprises an apparatus chassis configured to house at least a discrete focusing lens assembly and at least one additional lens assembly. The discrete focusing lens assembly of the multi-sensor imaging apparatus comprises a first positioning coil assembly comprising a first positioning coil, where the first positioning coil is positioned around a first positioning pad. The discrete focusing lens assembly of the multi-sensor imaging apparatus further comprises a second positioning coil assembly comprising a second positioning coil, where the second positioning coil is positioned around a second positioning pad. The discrete focusing lens assembly of the multi-sensor imaging apparatus further comprises a lens barrel assembly comprising first positioning magnet located adjacent to the first positioning pad, a second positioning magnet located adjacent to the second positioning pad, and an imaging optical lens. The discrete focusing lens assembly of the multi-sensor imaging apparatus further comprises a module base defining an inner module space designed to fit the lens barrel assembly, and the module base is designed to support the first positioning coil assembly at a first coil position and the second positioning coil assembly at a second coil position, the first coil position opposite the second coil position. The discrete focusing lens assembly of the multi-sensor imaging apparatus further comprises at least one module alignment pin engaged with the module base, the positioning coil assembly, and the lens barrel assembly, where the first positioning pad, the first positioning coil, and the first positioning magnet together with the second positioning pad, the second positioning coil, and the second positioning magnet define a focus position for the lens barrel assembly.

In accordance with yet another aspect of the present disclosure, a method of assembling a discrete focusing lens assembly. The method may be performed by any of a number of actors, including one or more human actors, computer-operated machines and/or robotic systems, and/or the like. In at least one example embodiment of the method, the method comprises assembling a lens barrel, a pair of positioning magnets, and an imaging lens to form a lens barrel assembly, where the lens barrel assembly comprises a first positioning magnet of the pair of positioning magnets mounted opposite a second positioning magnet of the pair of positioning magnets. The example method further comprises inserting the lens barrel assembly into a module space defined by a module base, the module base comprising at least one alignment pin opening. The example method further comprises engaging at least one module alignment pin with the lens barrel assembly through the at least one alignment pin opening of the module base. The example method further comprises assembling a first positioning coil assembly and a second positioning coil assembly. The example method further comprises attaching, on the module base, the first positioning coil assembly and the second positioning coil assembly, the first positioning coil assembly positioned opposite the second positioning coil assembly.

Additionally or alternatively, in at least some example embodiments of the method, the method further comprises inserting a first positioning pad into a first coil inner region defined by a first positioning coil to form a first coil-pad assembly; and attaching a flex connector to the first coil-pad assembly to form the first positioning coil assembly.

BRIEF DESCRIPTION OF THE DRAWINGS

Figure 1A:
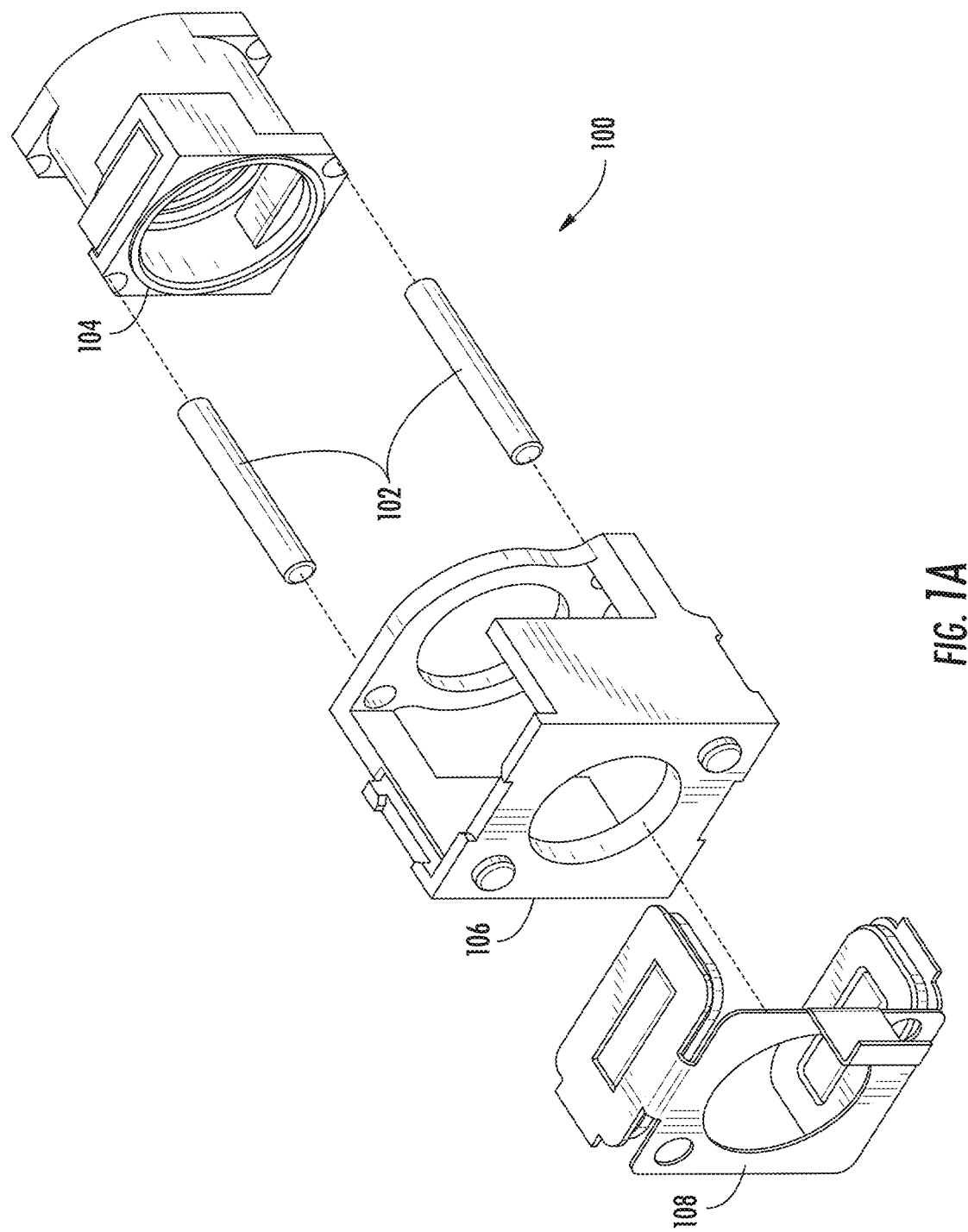
Figure 1B:
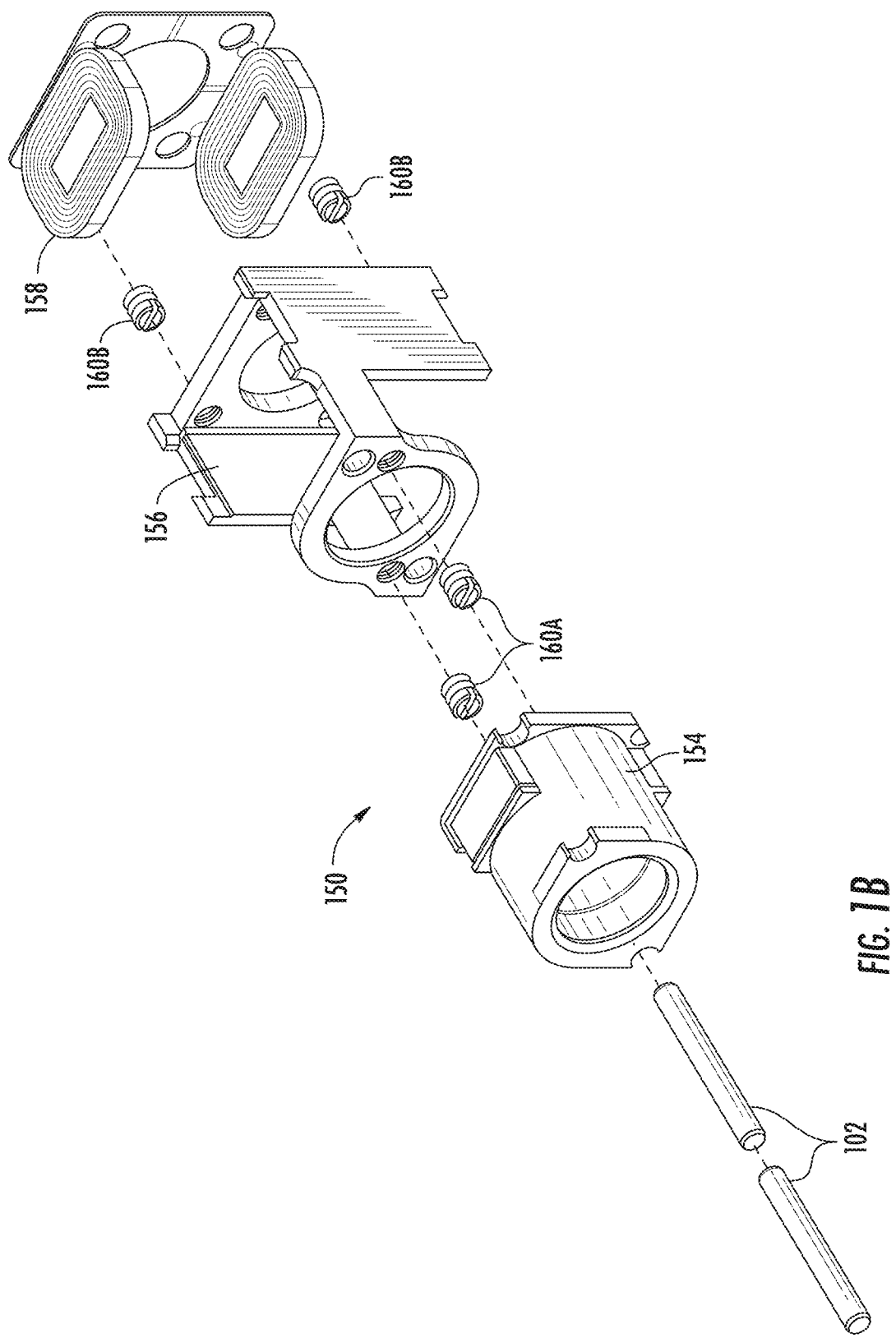
Figure 3A:
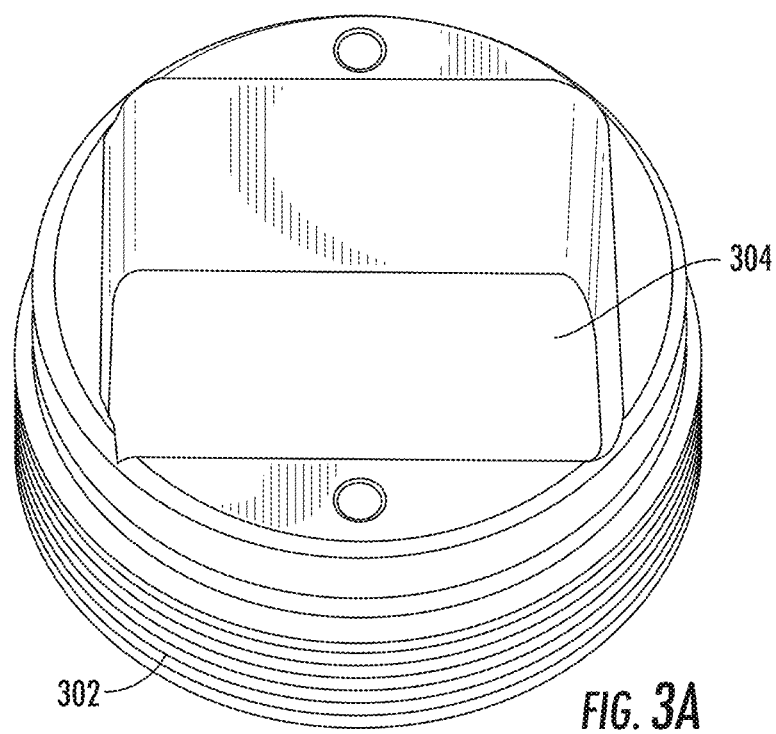
Figure 3B:
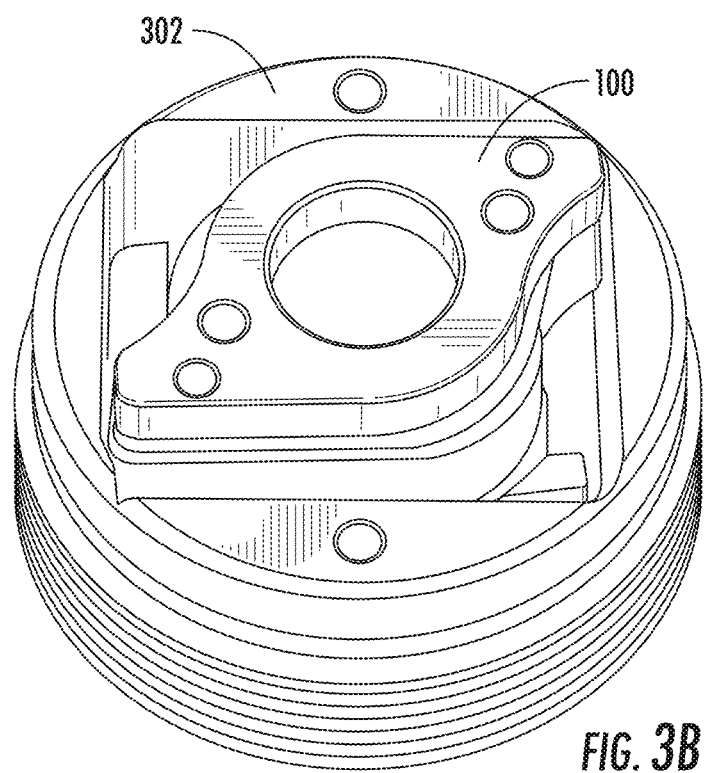
Figure 5A:
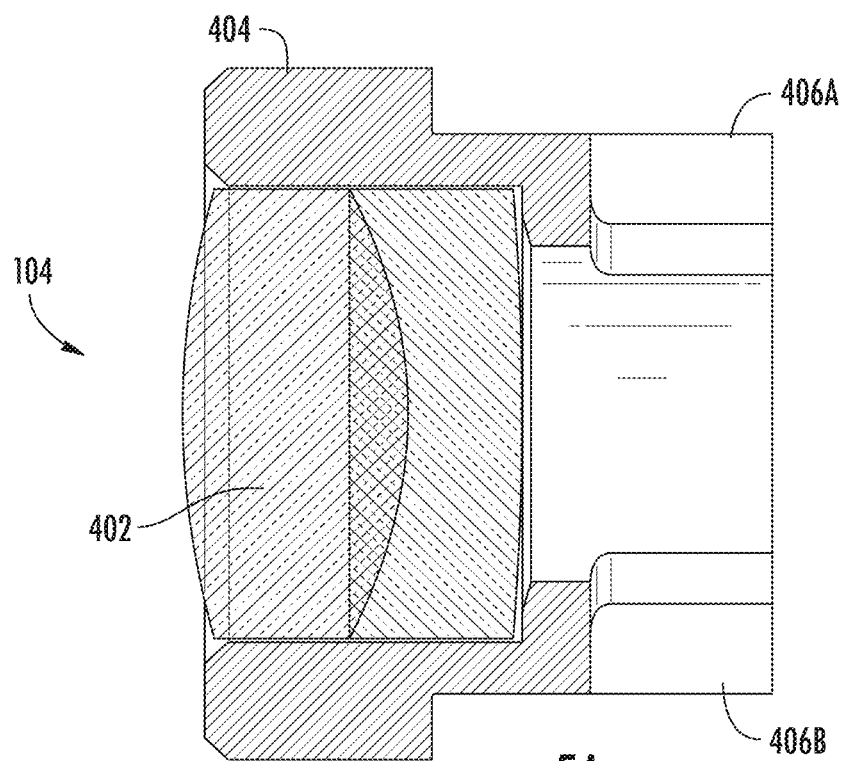
Figure 5B:
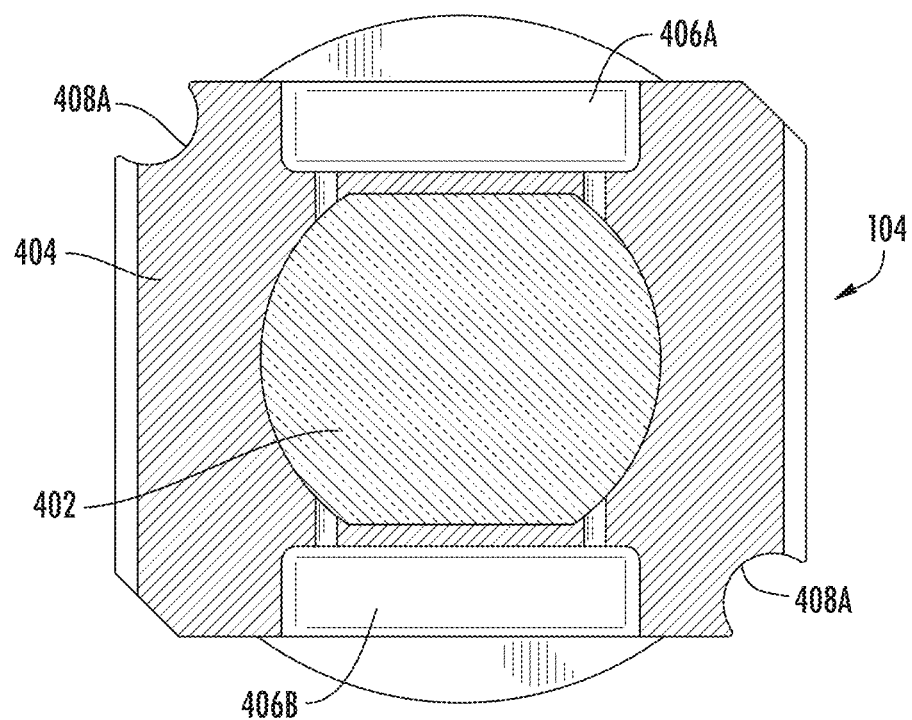
Figure 6:
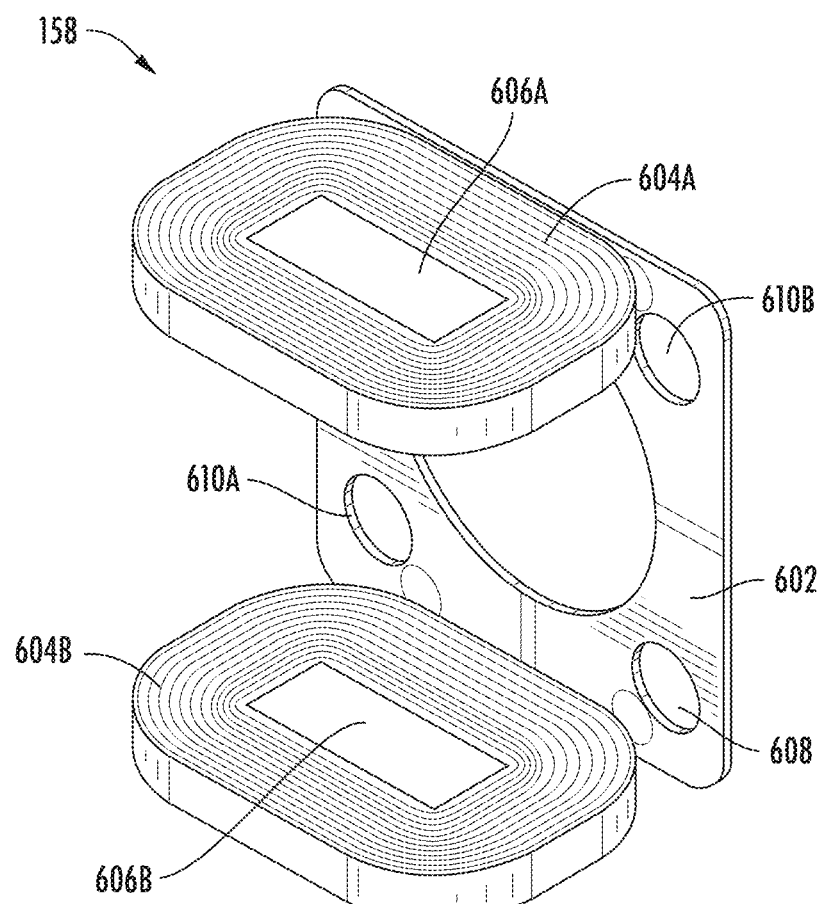
Figure 7A:
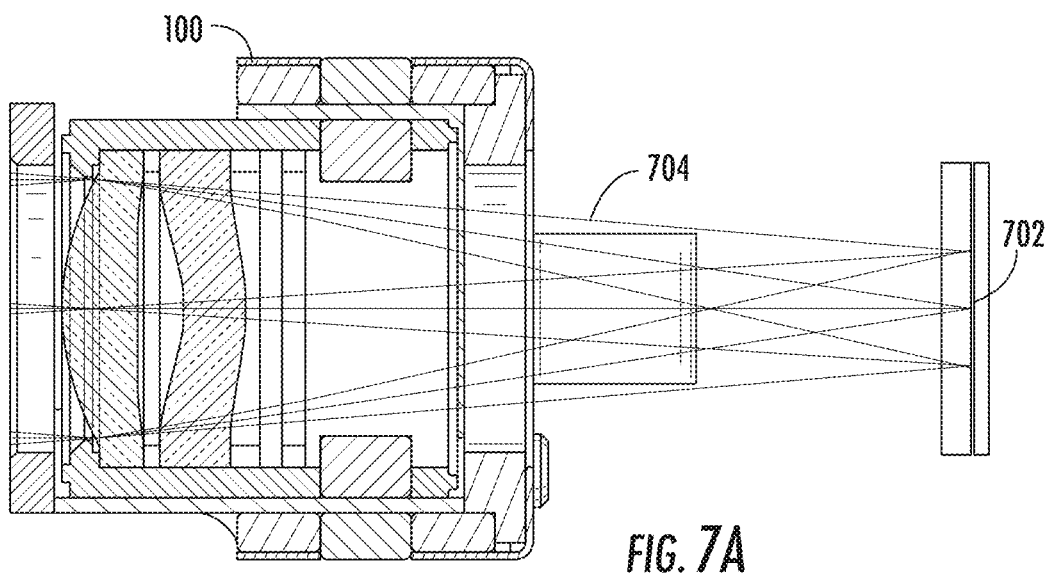
Figure 7B:
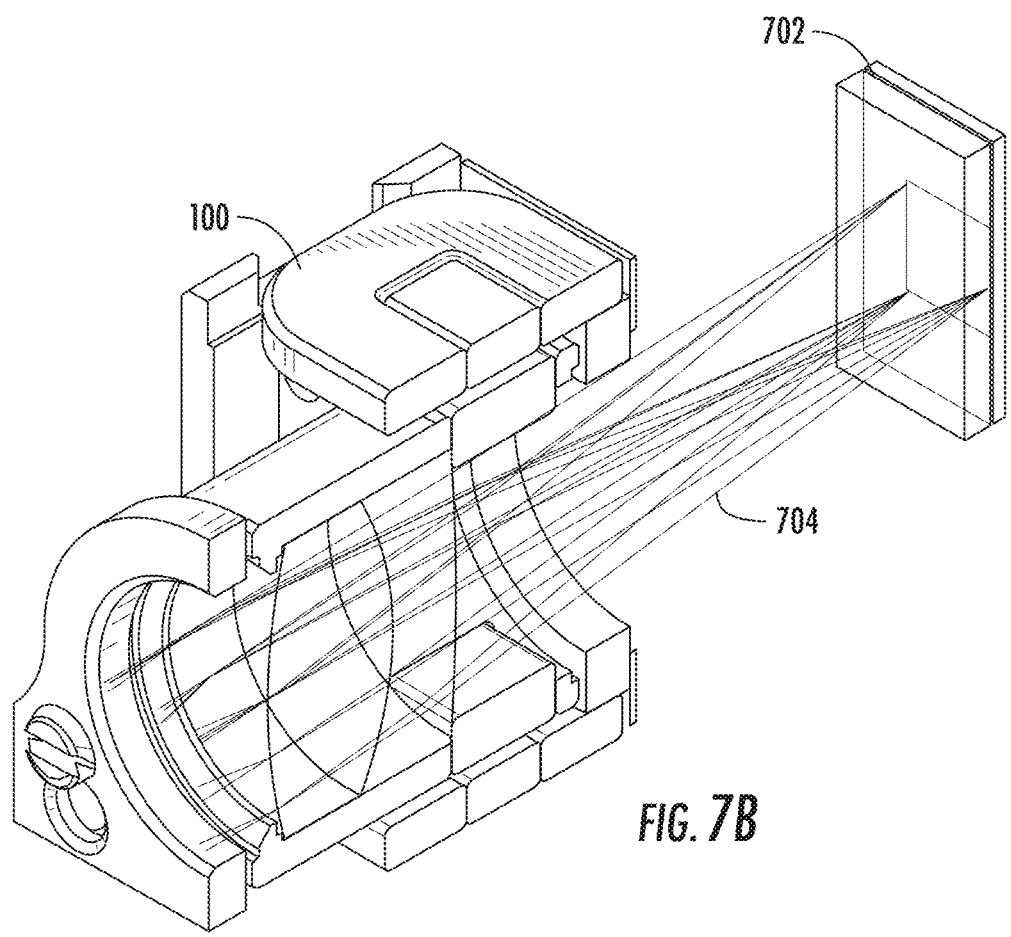
Figure 8A:
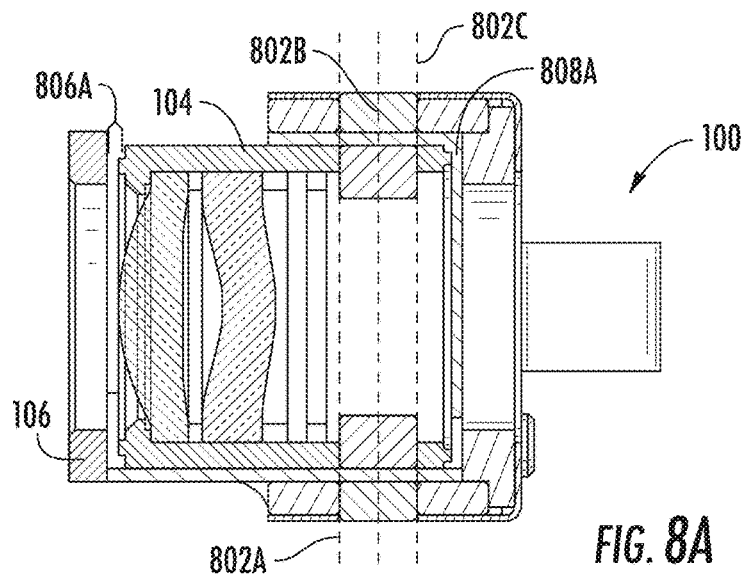
Figure 8B:
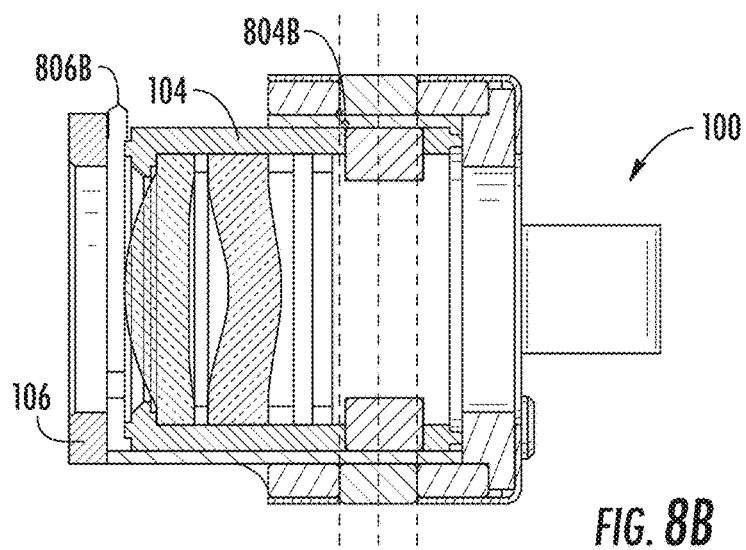
Figure 8C:
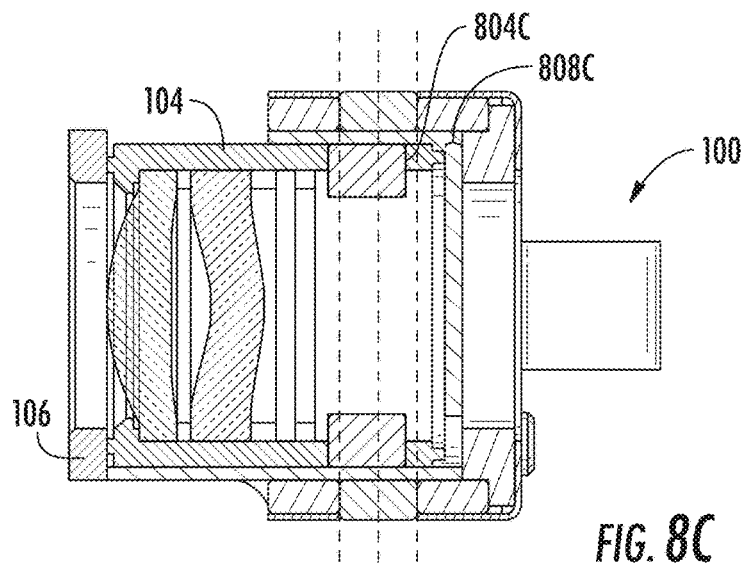
Figure 9A:
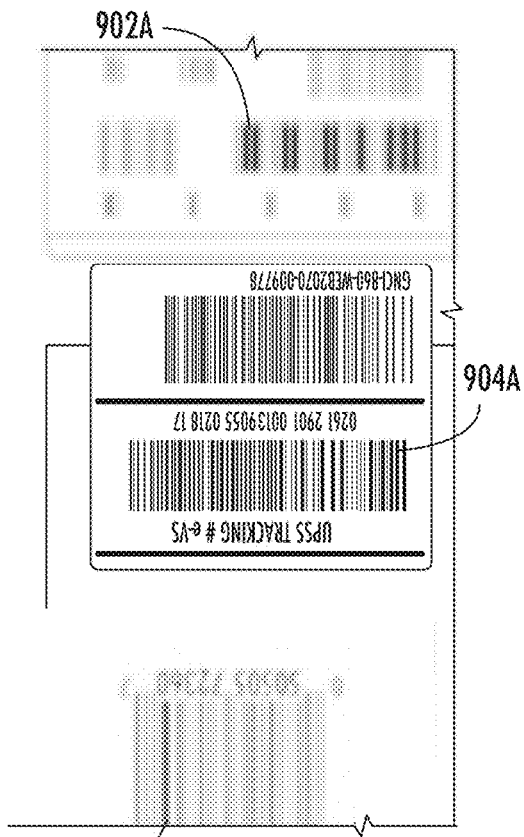
Figure 9B:
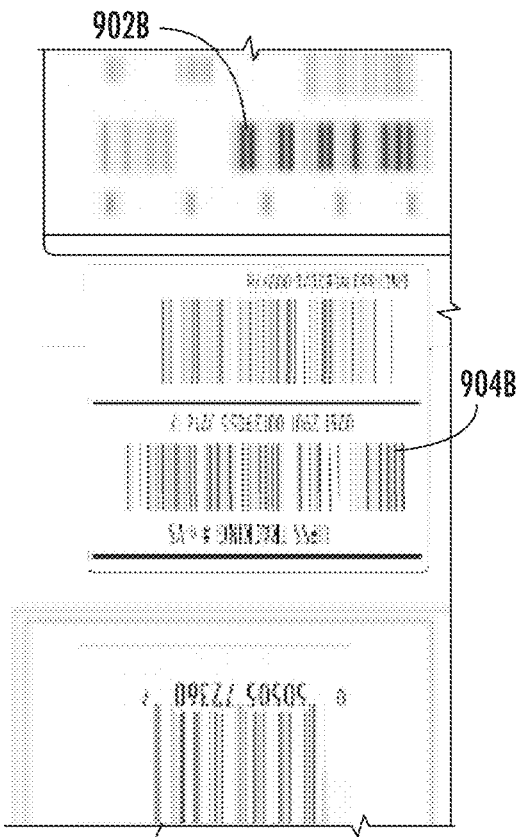
Figure 9C:
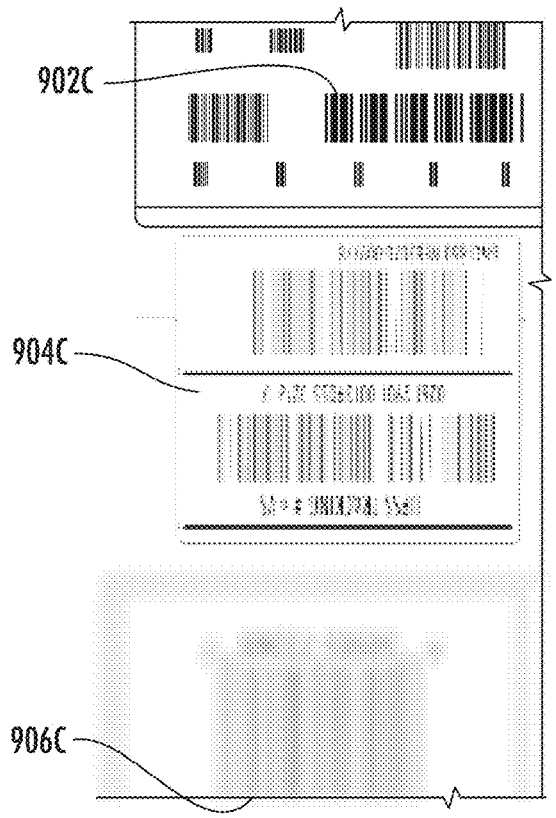
Figure 10A:
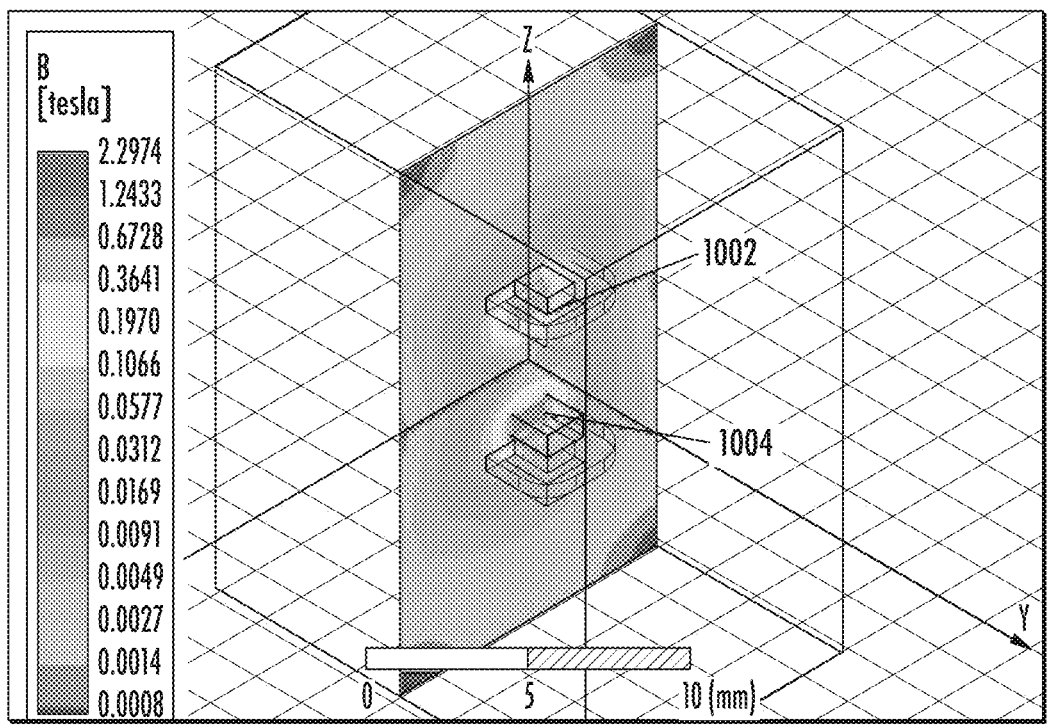
Figure 10B:
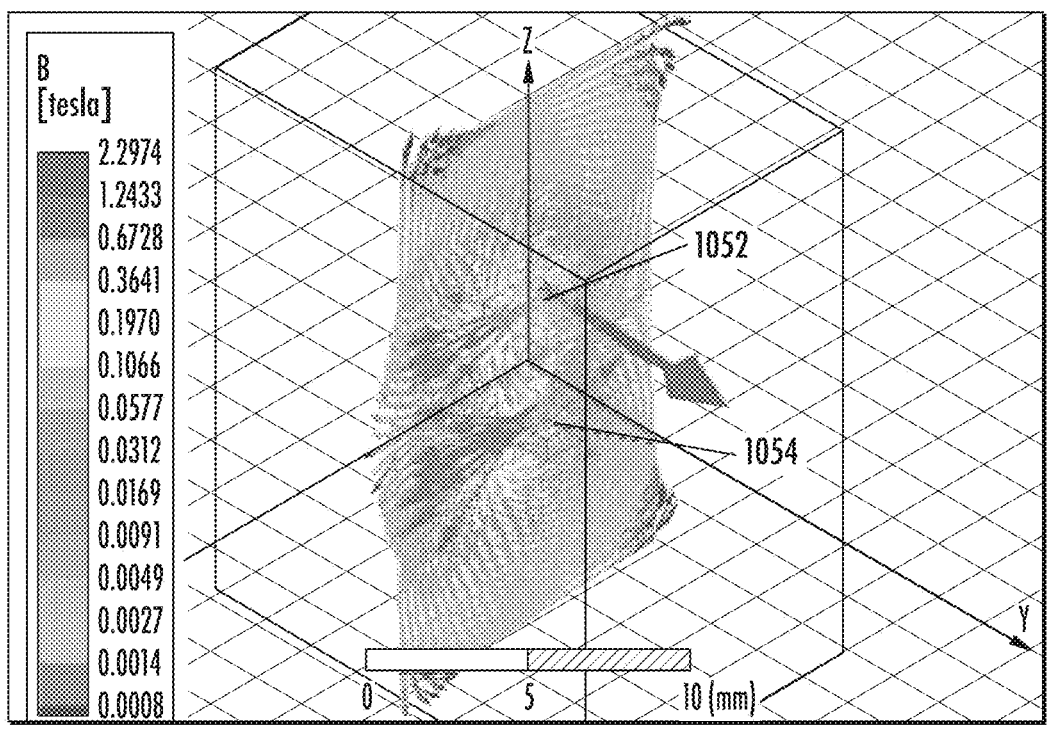
Figure 11:
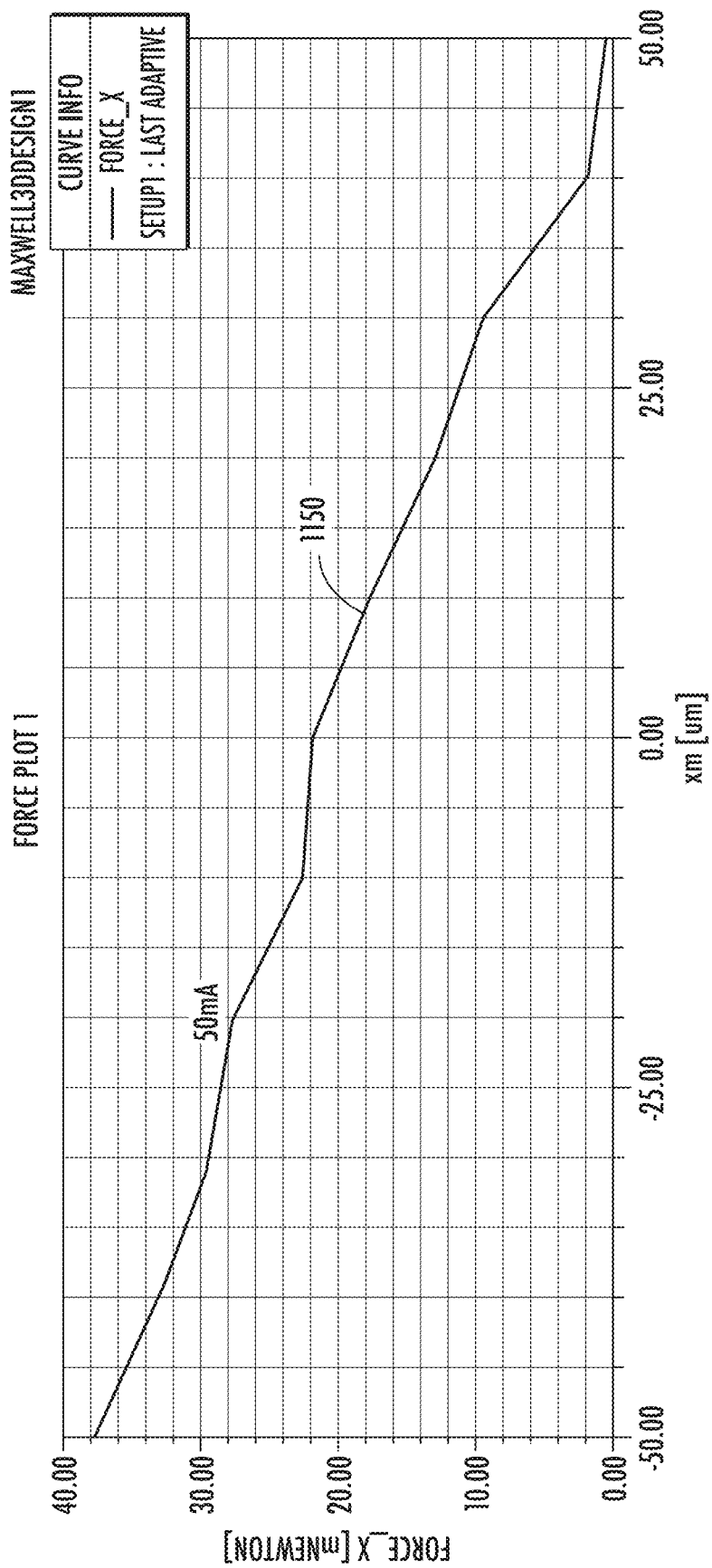
Figure 12A:
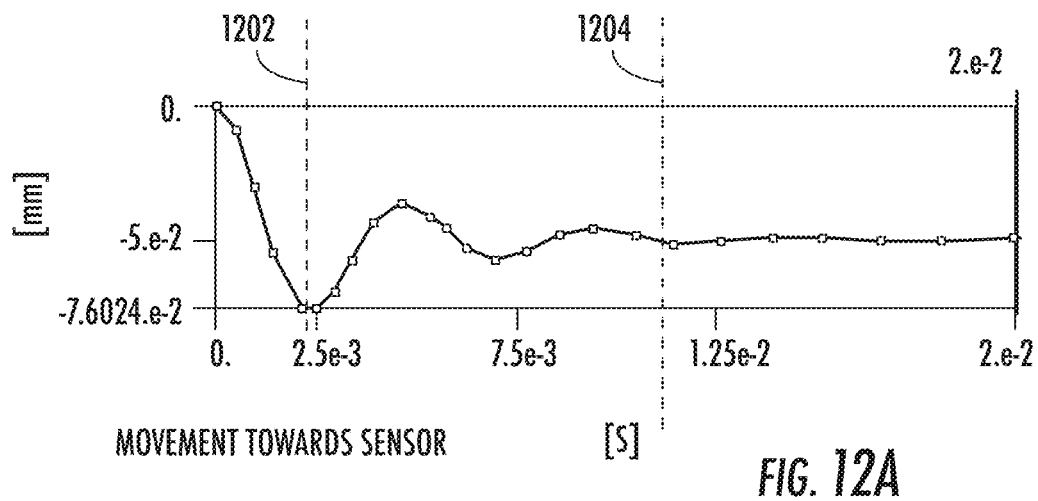
Figure 12B:
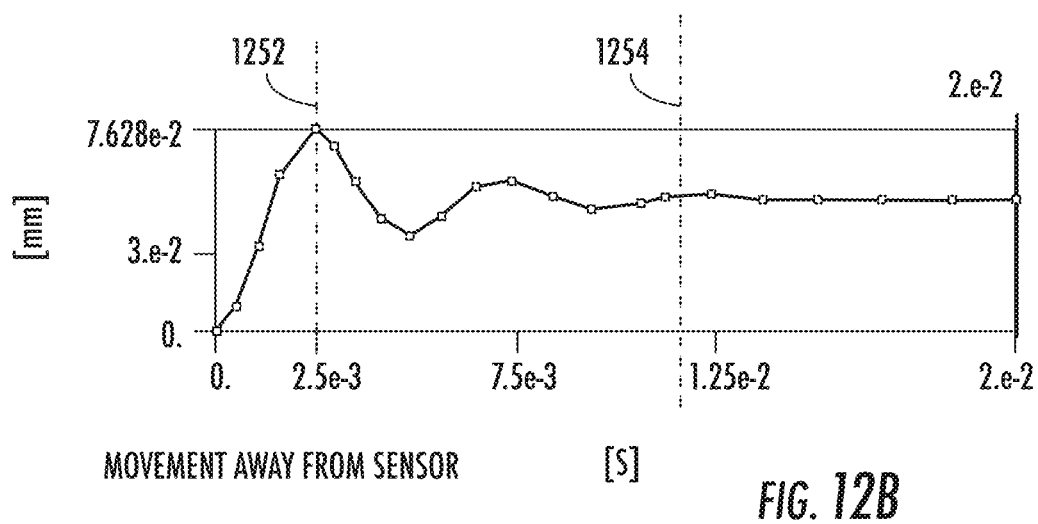
Figure 13A:
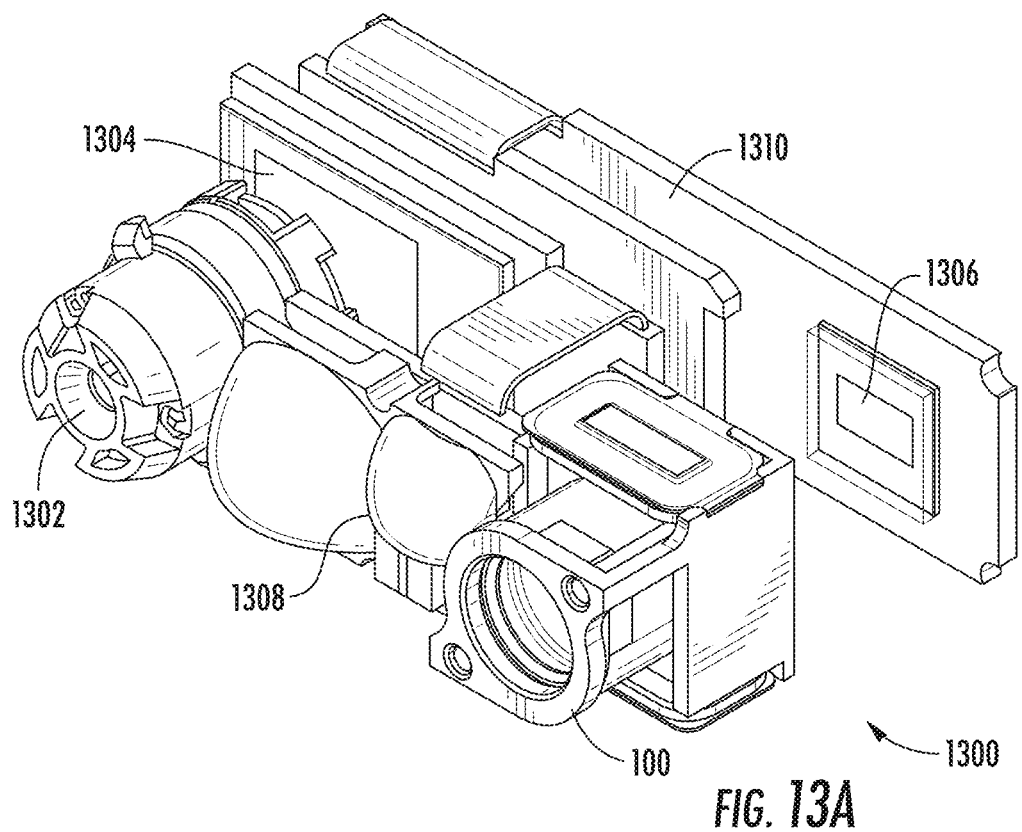
Figure 13B:
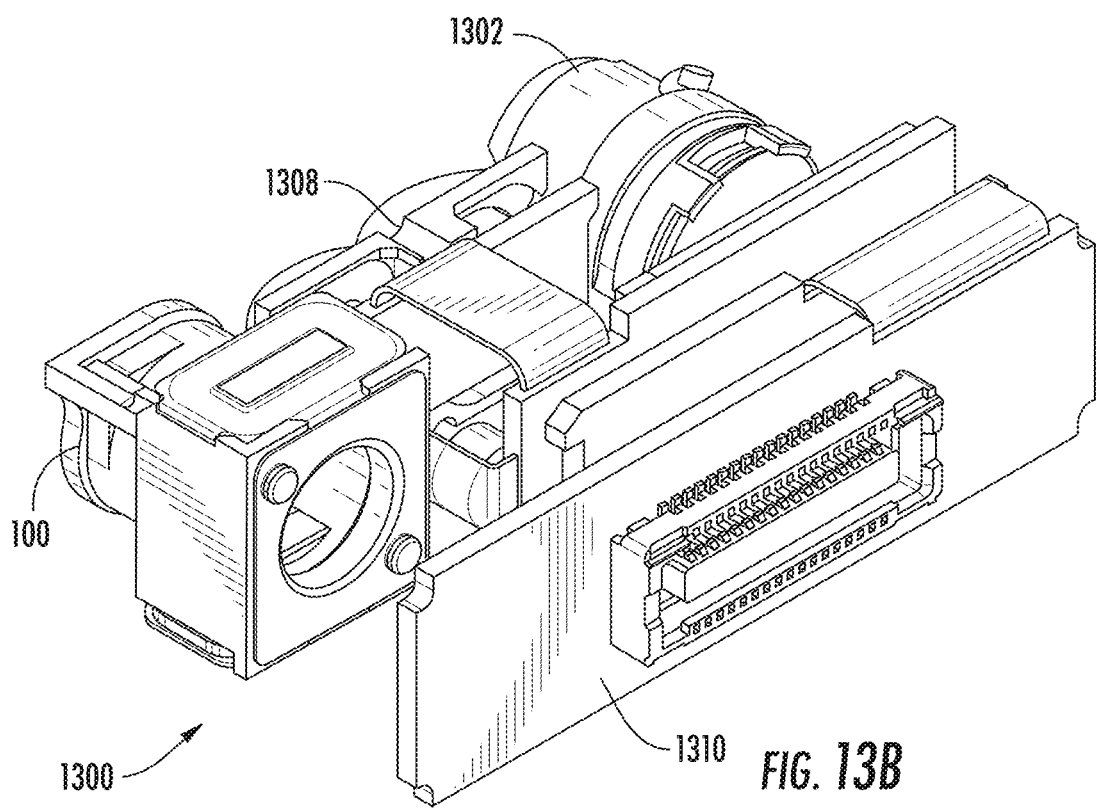
Figure 14A:
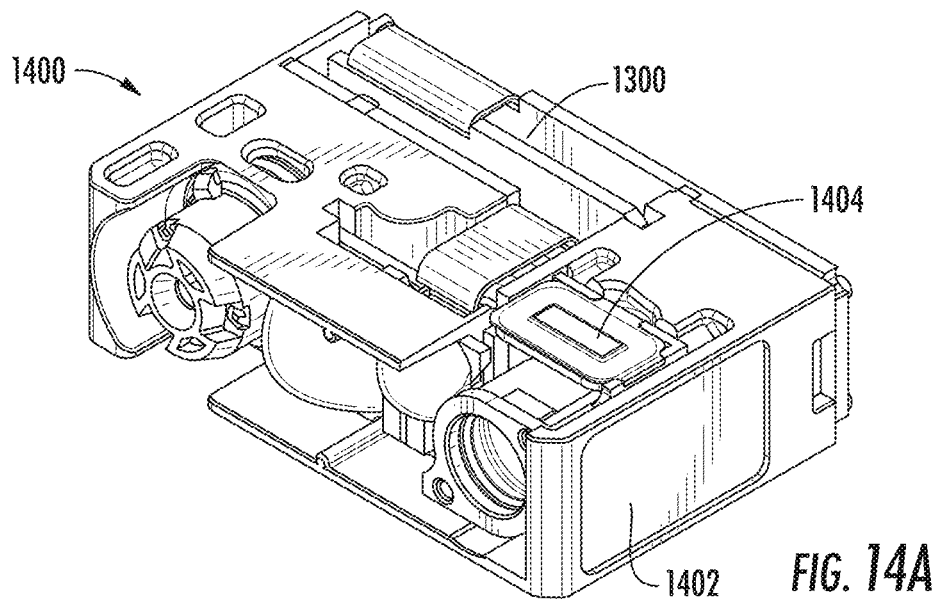
Figure 14B:
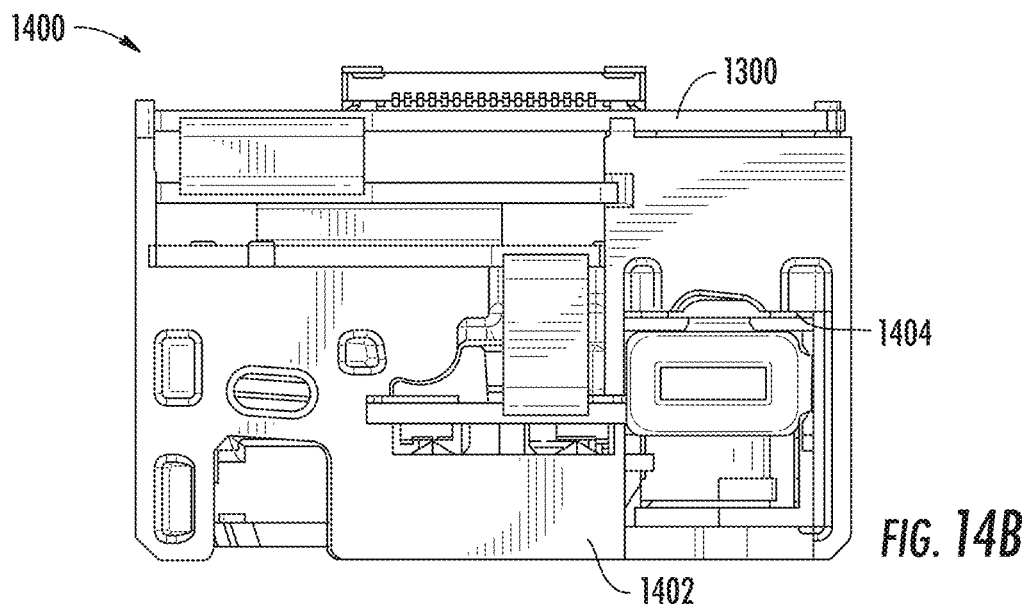
Figure 14C:
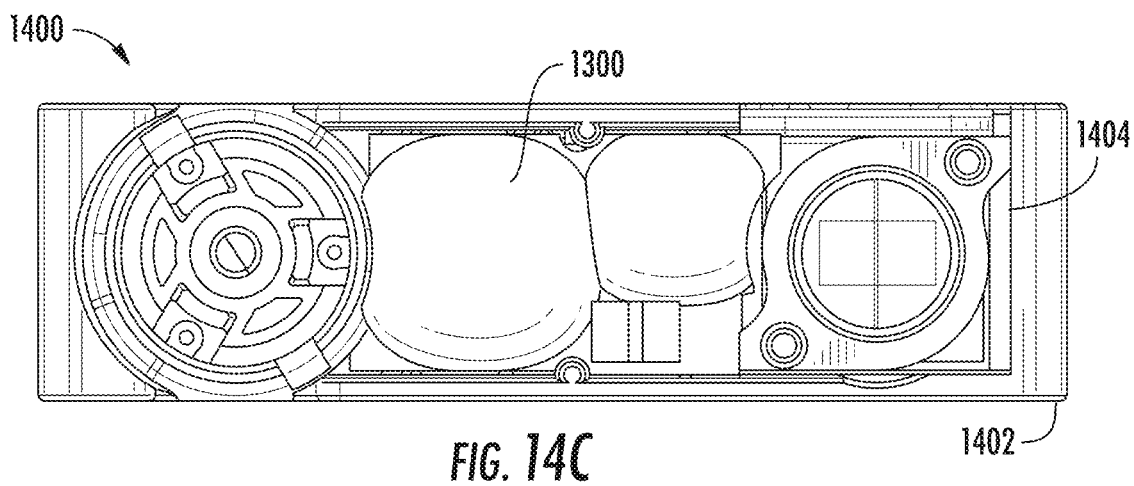
Figure 15:
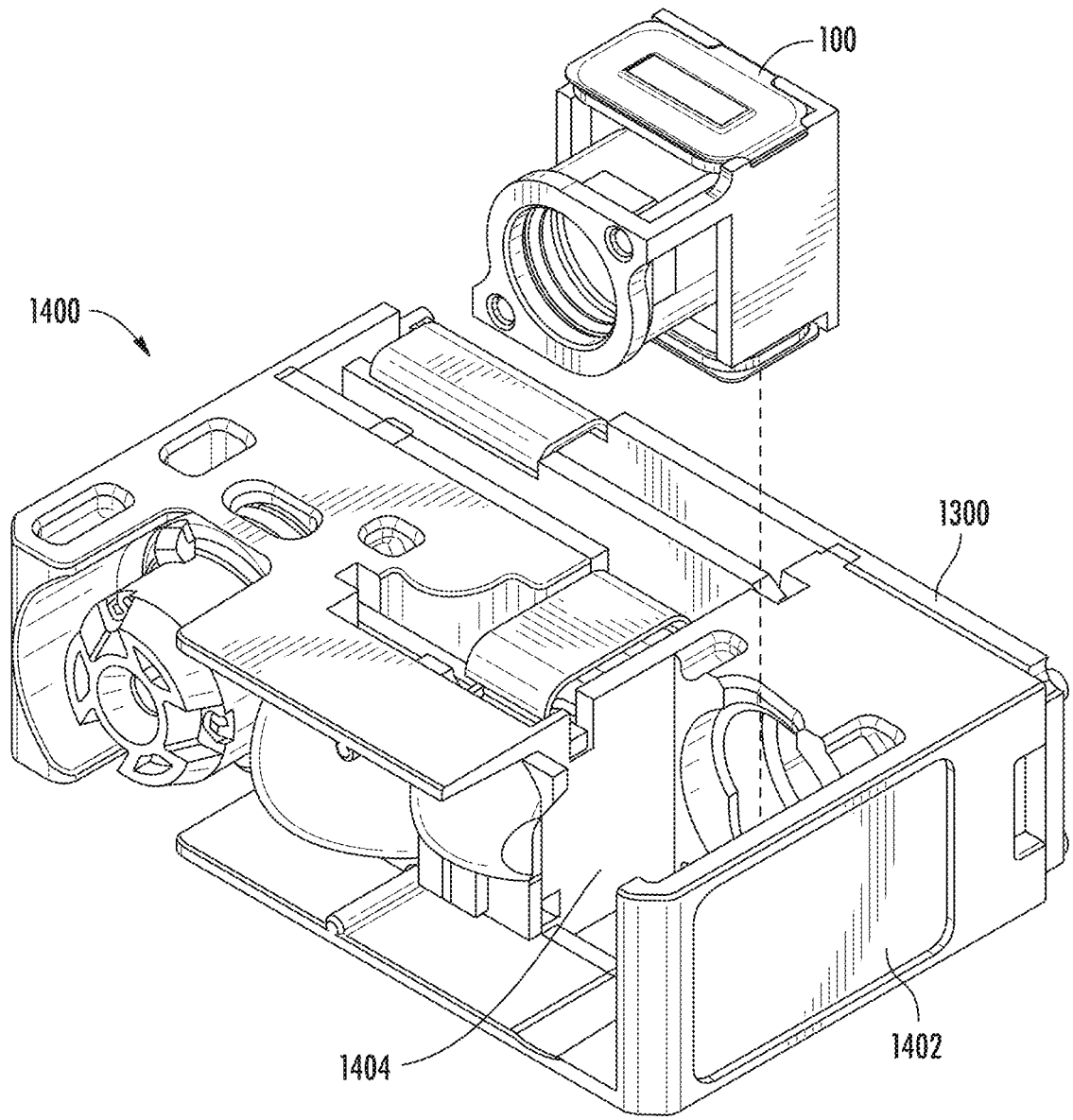
Figure 17A:
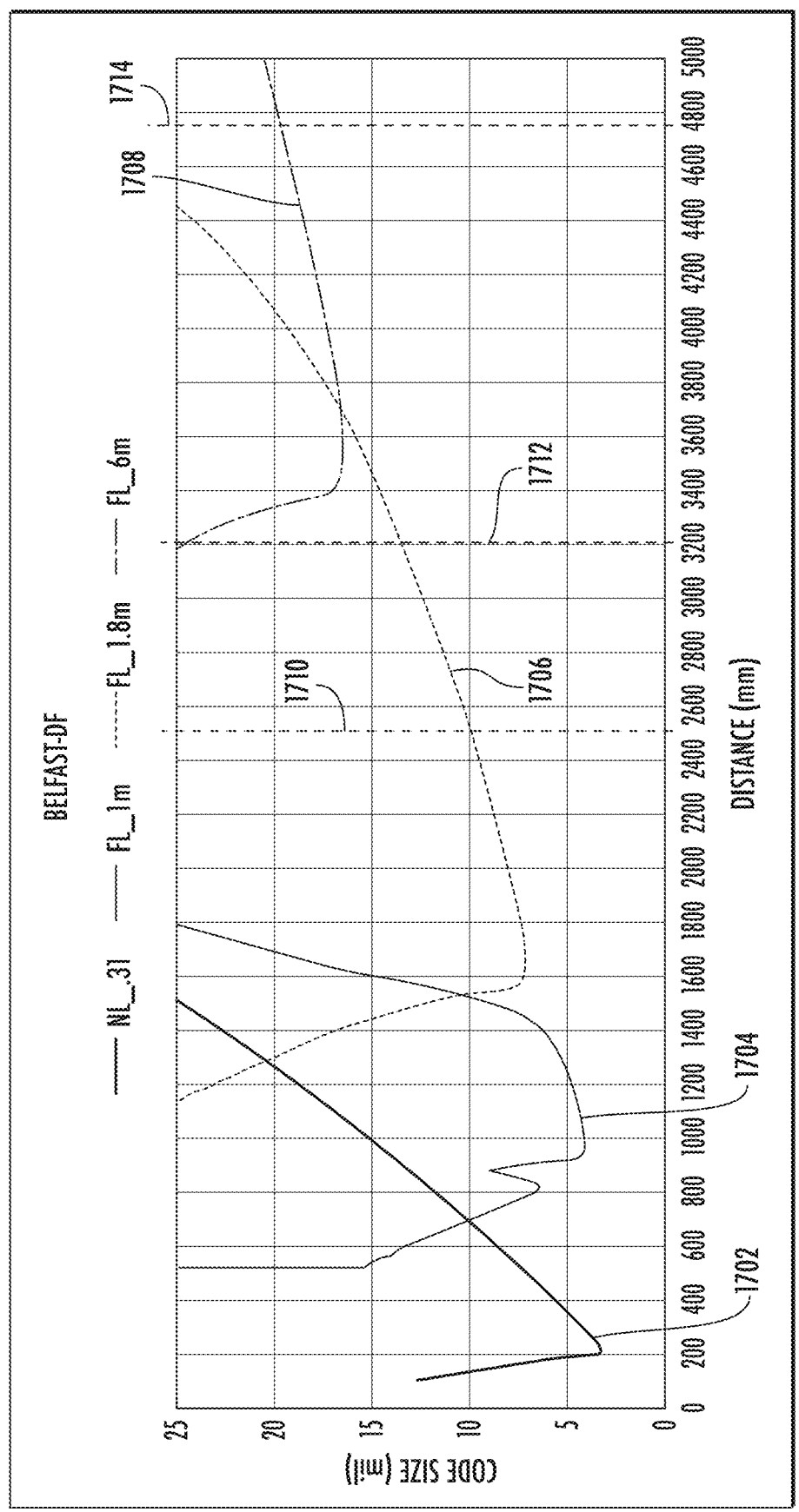
Figure 17B:
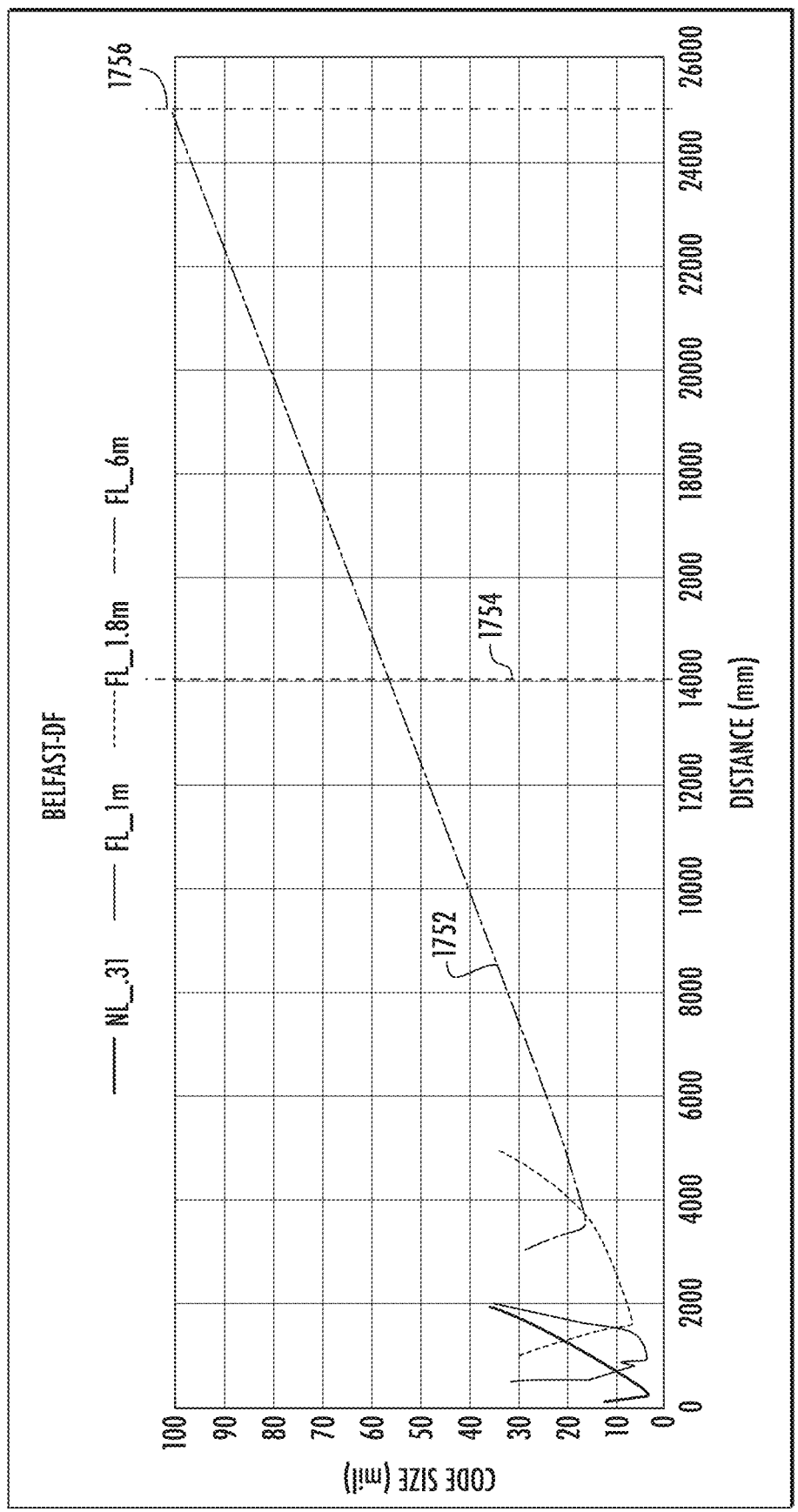
Figure 18:
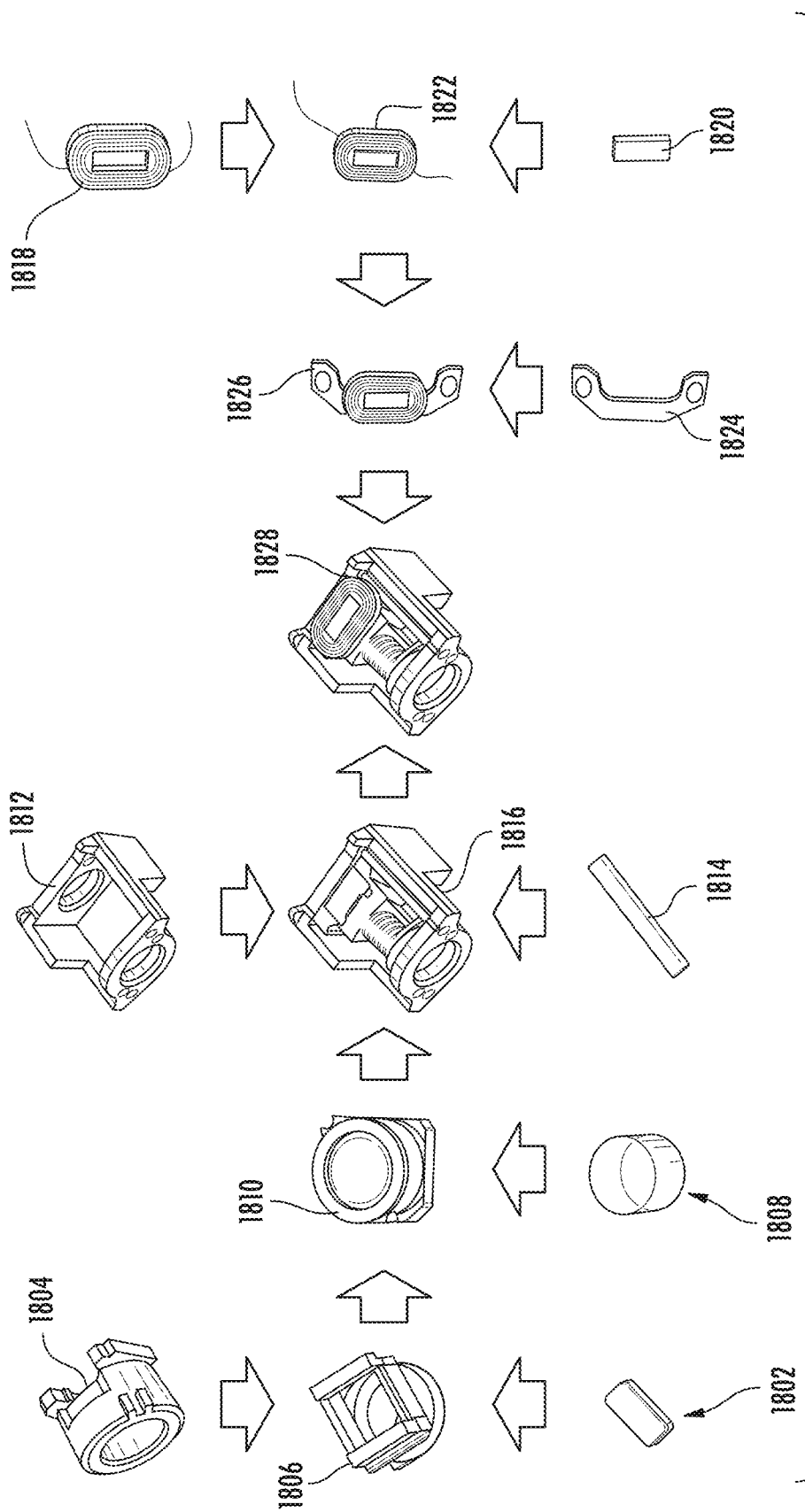
Figure 19:
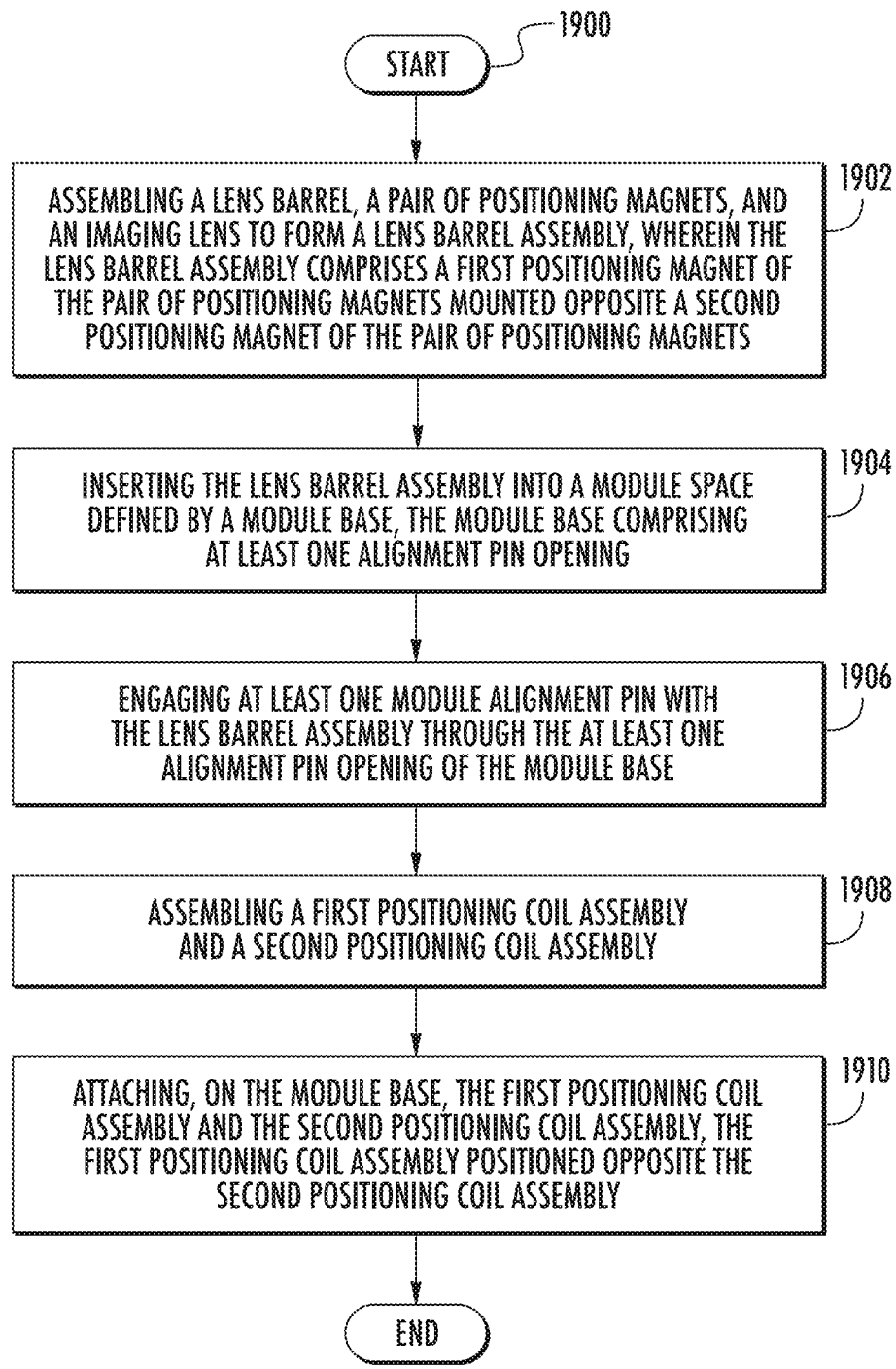
Figure 20:
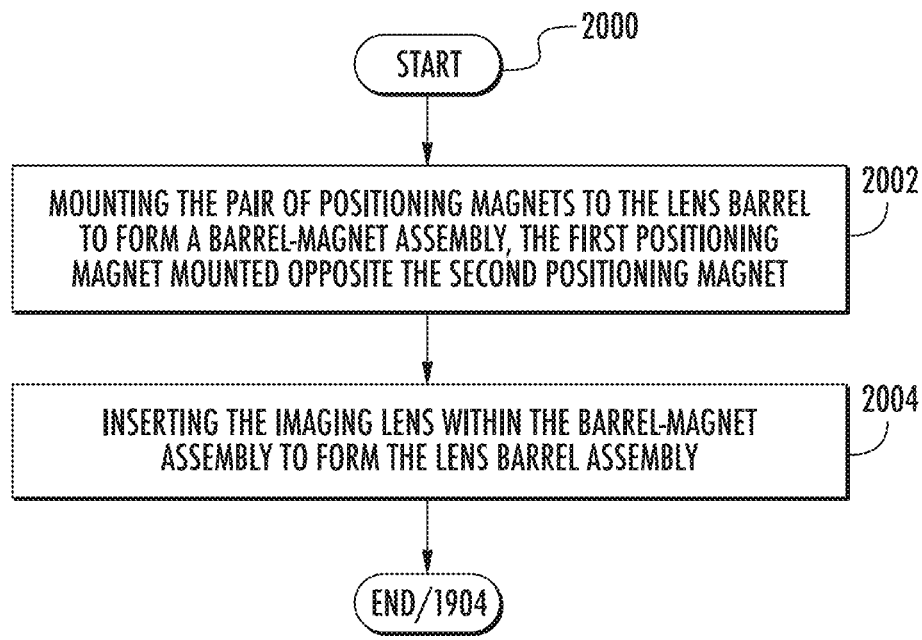
Figure 21:
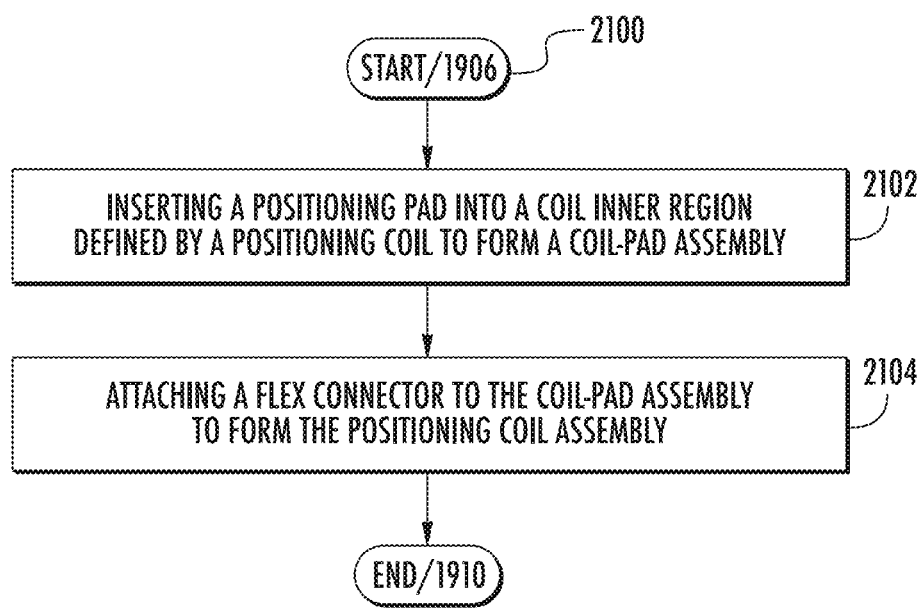

Having thus described the embodiments of the disclosure in general terms, reference now will be made to the accompanying drawings, which are not necessarily drawn to scale, and wherein:

FIG. 1A illustrates a first example discrete focusing lens assembly in accordance with at least one example embodiments of the present disclosure;

FIG. 1B illustrates a second example discrete focusing lens assembly in accordance with at least one example embodiments of the present disclosure;

FIGS. 2A-2E illustrate various views of an example discrete focusing lens assembly as assembled, in accordance with at least some example embodiments of the present disclosure;

FIGS. 3A and 3B illustrate an example lens mount for mounting an example discrete focusing lens assembly to or within one or more apparatuses, in accordance with at least one example embodiments of the present disclosure;

FIGS. 4A and 4B illustrate design details of an example lens barrel assembly, in accordance with at least one example embodiments of the present disclosure;

FIGS. 5A and 5B illustrate cross-sectional views of the example lens barrel assembly, in accordance with at least one example embodiments of the present disclosure;

FIG. 6 illustrates various design detailed of an example positioning coil board, in accordance with at least one example embodiment of the present disclosure;

FIGS. 7A and 7B illustrate an example visualization of light traversal through an example discrete focusing lens assembly for capture by an associated image sensor, in accordance with at least one example embodiment of the present disclosure;

FIGS. 8A, 8B, and 8C each illustrate example visualizations of a lens barrel assembly positioned at different focus positions, in accordance with at least one example embodiment of the present disclosure;

FIGS. 9A, 9B, and 9C each illustrate a visualization of an image data object including representations of various visual encoded indicias captured by an image sensor using a discrete focusing lens assembly having a lens barrel assembly positioned at different focus positions, in accordance with at least one example embodiment of the present disclosure;

FIG. 10A illustrates magnetic forces exerted by each of a pair of coil positioning assemblies associated with a pair of positioning magnets of a discrete focusing lens assembly in a circumstance where the pair of coil positioning assemblies are in a non-powered state, in accordance with at least one example embodiment of the present disclosure;

FIG. 10B illustrates magnetic forces exerted by each of a pair of coil positioning assemblies associated with a pair of positioning magnets of a discrete focusing lens assembly in a circumstance where the pair of coil positioning assemblies are in a first powered state, in accordance with at least one example embodiment of the present disclosure;

FIG. 11 illustrates an example distribution of the force in relation to displacement of a lens barrel assembly from a neutral focus position, in accordance with at least one example embodiment of the present disclosure;

FIG. 12A illustrates an example graphing of the displacement of an example lens barrel assembly when applying a first force to move the lens barrel assembly from a default focus position to a far focus position, in accordance with at least one example embodiment of the present disclosure;

FIG. 12B illustrates another example graphing of the displacement of an example lens barrel assembly when applying a second force to move the lens barrel assembly from a default focus position to a near focus position, in accordance with at least one example embodiment of the present disclosure;

FIGS. 13A and 13B illustrate various views of an example discrete focusing multi-sensor imaging engine including a discrete focusing lens assembly, in accordance with at least one example embodiment of the present disclosure;

FIGS. 14A, 14B, and 14C illustrate various views of an example discrete focusing multi-sensor imaging apparatus 1400, in accordance with at least some example embodiments of the present disclosure;

FIG. 15 illustrates an example imaging apparatus including an apparatus chassis modified to enable housing of an example discrete focusing lens assembly, in accordance with at least some example embodiments of the present disclosure;

FIG. 16 illustrates a perspective view of an example mobile discrete focusing multi-sensor imaging apparatus including at least one discrete focusing lens assembly, in accordance with at least one example embodiment of the present disclosure;

FIGS. 17A and 17B illustrates the various example ranges at which various imagers of an example discrete focusing multi-sensor imaging capture image data objects from which representations of visual encoded indicia of varying sizes may be successfully read, in accordance with at least some example embodiments of the present disclosure;

FIG. 18 illustrates an example visualization for a process of assembling various components to form a discrete focusing lens assembly, and the intermediate components formed thereby, in accordance with at least one example embodiment of the present disclosure;

FIG. 19 illustrates a flowchart depicting example operations of an example process for assembling a discrete focusing lens assembly, in accordance with at least one example embodiment of the present disclosure;

FIG. 20 illustrates a flowchart depicting example additional operations of the example process for assembling a discrete focusing lens assembly, specifically of an example process for assembling a lens barrel, a pair of positioning magnets, and an imaging lens to form a lens barrel assembly, in accordance with at least one example embodiment of the present disclosure; and FIG. 21 illustrates a flowchart depicting example additional operations of the example process for assembling a discrete focusing lens assembly, specifically of an example process for assembling a positioning coil assembly, in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Image apparatuses are configured to enable performance of one or more image processing tasks. For example, in at least some example contexts, an image apparatus is configured to enable reading of 2D symbologies, such as one or more barcodes, QR codes, data matrices, and/or the like. Often, such image apparatuses include one or more imagers for capturing image data object(s) representing a particular field of view defined by the imager. For example, an imager may include one or more image capture optics, such as one or more lens assemblies, coupled with an image sensor configured to capture light that traverses through the image capture optics to interact with the image sensor. In this regard, the lens assembly may define a particular field of view to be captured by the associated image sensor, and/or may define a particular focus range such that the image sensor captures an image data object that is clear and/or otherwise optimal for processing at and/or around the focus range. Such imagers may be associated with an illuminator of and/or associated with the imaging apparatus, for example including an illumination projection lens and associated illumination source, that provides light that illuminates the field of view to be captured.

Variable focus lens assemblies enable adjustment of the focus range to one or more different focus ranges. By adjusting the focus range, the effective range at which the lens assembly may be used to capture image data objects that are clear and/or well-defined enough to be successfully processed for a particular image processing task may be improved. For example, a variable focus lens adjustable between a first focus range and a second focus range may be used to capture image data objects sufficient for processing without repositioning an object to be scanned and/or the imaging apparatus itself.

In some contexts, an imaging apparatus and/or the components therein are limited based on certain requirements and/or circumstances of the operational environment in which it functions. In the context of mobile imaging apparatuses, for example, the imaging apparatus and each component thereof must remain functional, perform quickly, and be of a sufficiently small form factor for use in a mobile context. For example, in the context where an imaging apparatus is to be integrated within a cell phone or other limited form factor device, the imaging apparatus is restricted based on the limited height of the cell phone mobile apparatus chassis (often approximately 7 millimeters). Similarly in this regard, to operate in such a context, the components of the imaging apparatus are each restricted by the even smaller form factor of the imaging apparatus Conventional variable focus lens implementations each have limitations unsuitable for use in such small form factor mobile apparatus contexts. For example, conventional voice coil motor focusing is highly sensitive to vibration and impact, such that use in a mobile imaging apparatus context where such vibrations and impact due to user operation and/or transport are likely. Additionally, for example, liquid lens focusing is limited by a large component size unsuitable for use in such small factor mobile imaging apparatus contexts. Additionally, for example, linear piezo motor focusing suffers slow response rate unsuitable for use in such small form factor mobile imaging apparatus. In this regard, in the mobile imaging apparatus context, each conventional implementation for variable lens focusing functions unreliably, cannot be compacted into a sufficiently small form factor, and/or suffers a slow response rate.

Embodiments herein provide discrete focusing lens assemblies. Embodiments include discrete focusing lens assemblies including a lens barrel assembly positioned based on interactions between one or more positioning magnets and one or more positioning pads. In some such embodiments, each of a pair of positioning magnets is associated with one of a pair of positioning pads. The positioning pads are each associated with a positioning coil configured to receive an electrical charge that powers the positioning coil. The powered positioning coil is configured to generate a magnet force exerted to reposition the lens barrel assembly to a new focus position. In this regard, the lens barrel assembly is positioned based on the powered state of each of the positioning coils. Such implementations quickly reposition the lens barrel assembly such that the discrete focusing lens assembly is rapidly refocused (e.g., within a desired threshold), are less susceptible to vibrations, and may be implemented of a sufficiently small form factor for use in a mobile context. As such, embodiment imaging apparatuses may utilize one or more discrete focusing lens assemblies, for example as one or more lens assemblies in a multi-sensor environment.

Such embodiment discrete focusing lens assemblies provide a sufficient reliability, compact size, and high-speed response sufficient for use in small form factor imaging apparatuses. In this regard, such discrete focusing lens assemblies may be implemented in one or more imaging apparatuses to improve the effective range over which the imaging apparatus may capture image data objects for successful processing. It should be appreciated that, although several embodiments are described with respect to mobile imaging apparatus, such embodiments may be similarly implemented in one or more non-mobile imaging apparatuses. In some such embodiments, the embodiments may not be limited by a small form factor, but may use a similar structure as described herein.

Definitions

The term "imaging apparatus" refers to one or more hardware and/or software components configured to capture an image data object for processing. In some embodiments, an imaging apparatus includes at least one illuminator source and/or corresponding optics configured to provide an illumination onto a field for capture. A non-limiting example of an imaging apparatus is a "multi-sensor imaging apparatus," which refers to an imaging apparatus including a plurality of image sensors each configured to enable capture of an image data object, and The term "assembly height" refers to a maximum height of each subcomponent of a discrete focusing lens assembly. In some embodiments, discrete focusing lens assembly is designed to such that the assembly height falls below a maximum height requirement. For example, the maximum height requirement may be imposed based on the height for a desired apparatus chassis, such as a cell phone chassis.

The term "powering" refers to providing a current to an electrical circuit, component, and/or electrical conductor.

The term "positioning coil" refers to an electrical conductor wound into a coil shape and configured to generate a magnetic field upon powering the positioning coil. The positioning coil defines a "coil inner region," which refers to the open region between the positioning coil defined by the wound positioning coil.

The term "positioning coil assembly" refers to a positioning coil connected to at least a flex component to connect the positioning coil to a module base and/or coil powering circuitry.

The term "coil powering circuitry" refers to hardware configured to provide current to one or more positioning coil assemblies. In some example contexts, coil powering circuitry includes at least one power source connected to one or a plurality of positioning coil assemblies.

The term "powered state" refers to a value of current powering each of a pair of positioning coil assemblies. In an example context, a powered state represents the value of the sign of the current powering each of a pair of positioning coil assemblies. The term "non-powered state" refers to a value of no current powering each of a pair of positioning coil assemblies.

The term "imaging optical lens" refers to one or more lenses and/or supporting optical components defining an aperture that enables light to be received by an image sensor associated with the imaging optical lens. In some embodiments, an imaging optical lens is formed entirely of glass, entirely of plastic, an optical liquid material, and/or of any combination thereof.

The term "lens barrel assembly" refers to a component associated with a corresponding image sensor, the component including at least an imaging optical lens and a lens housing. In some embodiments, as escribed herein, the lens barrel assembly includes one or more defined areas to support a positioning magnet.

The term "positioning magnet" refers to a magnet included in a lens barrel assembly to enable shifting of a focus position for the lens barrel assembly. In some embodiments, a lens barrel assembly includes a pair of positioning magnets designed to interact with one or more associated components, such as a pair of positioning coil assemblies and/or positioning pads, to change the focus position of the barrel lens assembly as described herein. Non-limiting examples of a positioning magnet includes a plated neodymium magnet, including without limitation a zinc-plated magnet, a nickel-plated magnet, and/or other protective coating.

The term "positioning pad" refers to magnetic material designed to fit within the coil inner region of a positioning coil. In one example context, a positioning pad is shaped as a cuboid. A positioning coil assembly is positioned adjacent to a positioning magnet that is associated with the positioning pad. In this regard, in some contexts, a pair of symmetrical positioning pads are positioned opposite one another, each associated with one of a pair of positioning coil assemblies, the pair of positioning coil assemblies positioned opposite one another, such that when the positioning coil assemblies are in an non-powered state, the positioning pad is aligned with the positioning magnet. The term "iron positioning pad" refers to a positioning pad specifically formed of iron, including an iron coating, and/or formed of majority iron.

The term "module base" refers to a housing configured to enable positioning and/or alignment of one or more components of a discrete focusing lens assembly. Additionally or alternatively, in some embodiments, a module base enables connection of one or more of the components with corresponding powering circuitry and/or processing circuitry.

The term "coil position" refers to a position of a positioning coil with respect to an associated with a lens barrel assembly. In some embodiments, for example, a first positioning coil is positioned at a first coil position located on top of an associated lens barrel assembly, and a second positioning coil is positioned at a second coil location located on the bottom of an associated lens barrel assembly, such that the first coil position is opposite the second coil position.

The term "positioning area," with respect to a positioning coil assembly, refers to defined portion of a module base designed to support a positioning coil assembly. including a positioning pad within the coil inner region. In some embodiments, a module base includes a first coil position and a second coil position to support a pair of positioning coil assemblies, the first coil position opposite the second coil position such that the pair of coil assemblies generates a magnetic force to move the lens barrel assembly along a longitudinal axis.

The term "inner module space" refers to a void of space defined by the inner walls and/or other supporting structures of the module base. In some embodiments, the inner module space is defined sufficiently to fit a lens barrel assembly and/or corresponding positioning and/or alignment components, such as at least one module alignment pin.

The term "alignment pin opening" refers to a space in a component, defined by an outer boundary, designed to receive and/or secure a module alignment pin. In at least one example context, an alignment pin opening defines a cylindrical space configured to receive a cylindrical module alignment pin.

The term "module alignment pin" refers to a screw, pin, dowel, and/or other fastener designed to engage an alignment pin opening of a component. In at least one example context, the module alignment pin is designed to engage the alignment pin opening through sliding into the alignment pin opening. The term "friction-free pin" refers to a module alignment pin designed to be associated with a friction coefficient below a maximum friction threshold. In some embodiments, the friction-free pin is designed based on one or more materials, coatings, and/or a combination thereof.

The term "focus position" refers to a position of a lens barrel assembly within the inner module space of a module base. In this regard, in an example context, the focus positioning of a lens barrel assembly represents a shift from a default position, and/or an absolute position, along a longitudinal axis defined by at least one module alignment pin. In an example context, the focus position of lens barrel assembly is changed based on a value of power applied to one or more positioning coil assemblies.

The term "front positional limit" refers to a focus position closest to the inner wall of the front of a module base. In some embodiments, the front positional limit is defined by the inner wall of the front of the module base itself. In other embodiments, the front positional limit is defined by one or more front limit components.

The term "back positional limit" refers to a focus position closest to the inner wall of the back of a module base. In some embodiments, the back positional limit is defined by the inner wall of the back of the module base itself. In other embodiments, the back positional limit is defined by one or more back limit components.

The term "focus range" refers to an optimal distance between a lens barrel assembly and/or imaging apparatus and a field for the field to be in focus. In at least one example context, as the focus position of a lens barrel assembly changes, so does the focus range. The term "default focus range" refers to a particular focus range predetermined to be the most likely distance between the lens barrel assembly and/or imaging apparatus and a field for an intended use, such as for detecting, capturing, and/or decoding two-dimensional symbologies and/or three-dimensional symbologies.

The term "default focus position" refers to a focus position of a lens barrel assembly when each of a pair of positioning coil assemblies is in a non-powered state. In an example context, the default focus position aligns each positioning magnet of the lens barrel assembly with an associated positioning pad.

The term "predetermined focus position" refers to a discrete value of a focus position from a possible set of focus positions. For example, in at least one example context, a discrete focusing lens assembly is designed based on a 3-state set of focus positions: a first focus position for a first powered state (e.g., positive current), a second focus position for a second powered state (e.g., negative current), and a third focus position for a non-powered state (e.g., no current).

The term "continuous focus position" refers to a value of a focus position from a continuous range of focus positions defined by a maximum focus position and a minimum focus position. In at least one example context, a continuous focus position reflects a value based on the value of power provided to the pair of positioning coil assemblies.

The term "near focus position" refers to a value of a focus position to focus the lens barrel assembly for a predetermined focus range under a predetermined threshold. The term "far focus position" refers to a value for a focus position to focus the lens barrel assembly for a second predetermined focus range above a predetermined threshold. The term "neutral focus position" refers to a value for a focus position to focus the lens barrel assembly for a third predetermined focus range at a predetermined threshold.

The term "non-glossy dark surface" refers to a surface that reflects below a predetermined threshold percentage of received light in a specular direction. In some embodiments, to minimize specular light, the non-glossy dark surface is of a sufficiently dark color.

The term "magnet surface epoxy" refers to a coating of a positioning magnet to provide a non-glossy dark surface along at least one surface of the positioning magnet.

The term "lens mount" refers to one or more structural components and/or hardware securing the position and/or alignment of a discrete focusing lens within an imaging apparatus. In some embodiments, an apparatus chassis of an imaging apparatus comprises a defined space that engages the discrete focusing lens, such that the outer wall of the defined space comprises the lens mount.

The term "visual encoded indicia" refers to a rendered, printed, and/or otherwise visible representation of one or more symbologies configured for scanning by an imaging apparatus. Non-limiting examples of a visual encoded indicia include a 2D barcode, UPC, Quick Response Code, Data Matrix, and custom encoded image.

Example Discrete Focusing Lens Assemblies

FIG. 1A illustrates a first example discrete focusing lens assembly, in accordance with at least some embodiments of the present disclosure. In this regard, FIG. 1A illustrates an exploded view of the first example discrete focusing lens assembly. Specifically, FIG. 1A depicts the first example discrete focusing lens assembly from a back perspective view.

As illustrated, FIG. 1A depicts an exploded view of the discrete focusing lens assembly 100. The discrete focusing lens assembly comprises a lens barrel assembly 104, module alignment pins 102, a module base 106, and a positioning coil board 108. The module base 106 is specially designed to define an inner module space. The inner module space is designed to fit the lens barrel assembly 104, such that the lens barrel assembly 104 may be positioned within the inner module space of the module base 106. The module base 106 further includes apertures, at the front and back of the module base 106, to enable light to traverse through the apertures and lens elements of the lens barrel assembly 104.

The lens barrel assembly 104 includes an open frame lens barrel housing one or more optical components, such as one or more image lenses and/or other lens elements, to define a particular field of view. In this regard, the lens barrel assembly 104 is designed including a front and back aperture to enable light to traverse through the lens barrel assembly 104 to one or more other components (for example, an image sensor as described herein). Additionally or alternatively, in some embodiments, the lens barrel assembly 104 includes one or more positioning magnets for use in positioning the lens barrel assembly 104, as described herein. For example, as illustrated, the lens barrel assembly 104 includes a top positioning magnet located on top of the lens barrel assembly 104 and a bottom positioning magnet located on the bottom of the lens barrel assembly 104.

The positioning coil board 108 includes hardware and/or circuitry configured to receive an electrical charge. The electrical charge powers one or more positioning coils of at least one positioning coil assembly of the positioning coil board 108. In this regard, as illustrated for example, the positioning coil board 108 includes a top positioning coil assembly and a bottom positioning coil assembly, the top and bottom positioning coil assembly positioned opposite one. In some such embodiments, the positioning coil board 108 is designed to receive an electrical current applied to power each positioning coil assembly thereof. As illustrated, the positioning coil board 108 is designed such that the top positioning coil assembly of the positioning coil board 108 extends over the at least a portion of the top space of the module base 106, for example to interact with a top positioning magnet of the lens barrel assembly 104. Similarly as illustrated, the positioning coil board 108 is designed such that the bottom positioning coil assembly of positioning coil board 108 extend over at least a portion of the bottom space of the module base 106.

The module alignment pins 102 include components designed to position and align each of the lens barrel assembly 104, module base 106, and/or positioning coil board 108, for example as depicted with respect to FIGS. 2A-E. Specifically, the module alignment pins 102 each embody dowels, rods, and/or pins. As illustrated, each of the components 104, 106, and 108 include assembly alignment openings configured to engage with the module alignment pins 102. In this regard, for example, the diameter of the module alignment pins 102 may each be approximately the same as each of the assembly alignment openings, such that the module alignment pins 102 may be engaged through each of the assembly alignment openings. In this regard, in some embodiments, the module alignment pins 102 enable axial alignment of the lens barrel assembly 104 and one or more additional components, for example the module base 106 and/or the positioning coil board 108. In some embodiments, one or more components does not include assembly alignment openings. For example, in at least one embodiment, the positioning coil board 108 does not include any assembly alignment openings. In some such embodiments, the module alignment pins 102 may not engage the positioning coil board 108, and/or may engage the positioning coil board 108 without engagement through the assembly alignment openings (e.g., where the positioning coil board is pressed up against one end of one or more of the module alignment pins 102).

The lens barrel assembly 104 may be designed to transverse along the module alignment pins 102 to reposition the lens barrel assembly 104 within the inner module space defined by the module base 106. For example, in this regard, the positioning coil board 108 may interact with the lens barrel assembly 104 such that a powered magnetic force is exerted on the lens barrel assembly 104. In at least one example context, the positioning coil assemblies of the positioning coil board 108 are powered to cause a magnetic force to be exerted on the lens barrel assembly 104, which interacts with a default magnetic force between the lens barrel assembly 104 and the positioning coil board 108. The magnetic force causes the lens barrel assembly 104 to translate to a new focus position along the module alignment pins 102, such that the lens barrel assembly 104 is positioned differently within the inner module space defined by the module base 106. In this regard, the front of the module base 106 defines a front positional limit, and the back of the module base 106 defines a back positional limit, for the lens barrel assembly 104 within the module space defined by the module base 106.

As illustrated in FIG. 1B, some embodiments include one or more additional components, and/or one or more of the components may be modified, to define positional limits for a lens barrel assembly within a module base. In this regard, the components may define a most forward position to which a lens barrel assembly may be moved within the inner module space defined by the module base (e.g., a front position limit representing a position closest to the front of the module base), and/or a most backward position to which a lens barrel assembly may be moved within the inner module space defined by the module base (e.g., a back position limit representing a position closest to the back of the module base). As illustrated, for example, FIG. 1B depicts a discrete focusing lens assembly 150 with positional limits.

The discrete focusing lens assembly 150 includes lens barrel assembly 154, a module base 156, and a positioning coil board 158. The components 154-158 are designed similarly to the similarly named components described above with regard to FIG. 1A. In this regard, repeated disclosure to this effect is omitted for the sake of brevity. Each of the components 154-158 are modified to receive one or more positional limiting components. For example, each of the components 154-158 may include one or more limit component openings configured to engage one or more limit components of the discrete focusing lens assembly 150.

As illustrated, the discrete focusing lens assembly 150 includes front limit screws 160A and back limit screws 160B. The front limit screws 160A engage front limit component openings of at least the module base 156. In this regard, the front limit screws 160A may set a front positional limit for the lens barrel assembly 154 within the module space defined by the module base 156. For example, the front limit screws 160A may be interacted with in a first direction, for example in a clockwise direction, to extend the front limit screws 160A into the inner module space defined by the module base 156. As the front limit screws 160A extend further into the module space defined by the module base 156, the front limit screws 160A may block the lens barrel assembly 154 from being positioned more forward than the front limit screws 160A allow, as the screws would physically block such positions. As such, by extending the front limit screws 160A into the inner module space defined by the module base 156, the front positional limit moves further from the front of the module base 156.

Similarly, the front limit screws 160A may be interacted with in a second direction, for example in a counter-clockwise direction, to retract the front limit screws 160A from the inner module space defined by the module base 156. In this regard, the front limit screws 160A extends outward from the front of the module base 156 as the front limit screws are retracted from the inner module space defined by the module base 156. As such, by retracting the front limit screws 160A, the front positional limit moves closer to, or is defined by, the front of the module base 156.

FIG. 1B similarly depicts back limit screws 160B. The back limit screws 160B engage back limit component openings of at least the module base 156, and/or of the positioning coil board 158 and/or lens barrel assembly 154. It should be appreciated that the back limit screws 160B may set a back positional limit for the lens barrel assembly 154 within the module space defined by the module base 156. The back limit screws 160B may similarly be interacted with to extend further into the module space defined by the module base 156, for example in response to interaction in a first direction (which may be the same or opposite the first direction for the front limit screws 160A), and may similarly be interacted with to retract from the module space defined by the module base 156, for example in response to interaction in a second direction (which may be the same or opposite the second direction for the front limit screws 160A). In this regard, by extending the back limit screws 160B into the inner module space defined by the module base 156, the back positional limit moves further from the back of the module base 156. Similarly, by retracting the back limit screws 160B from the inner module space defined by the module base 156, the back positional limit moves closer to, or is defined by, the back of the module base 156. Accordingly, the limit screws enable adjustable front and/or back positional limits in some such embodiments.

Figure 2A:
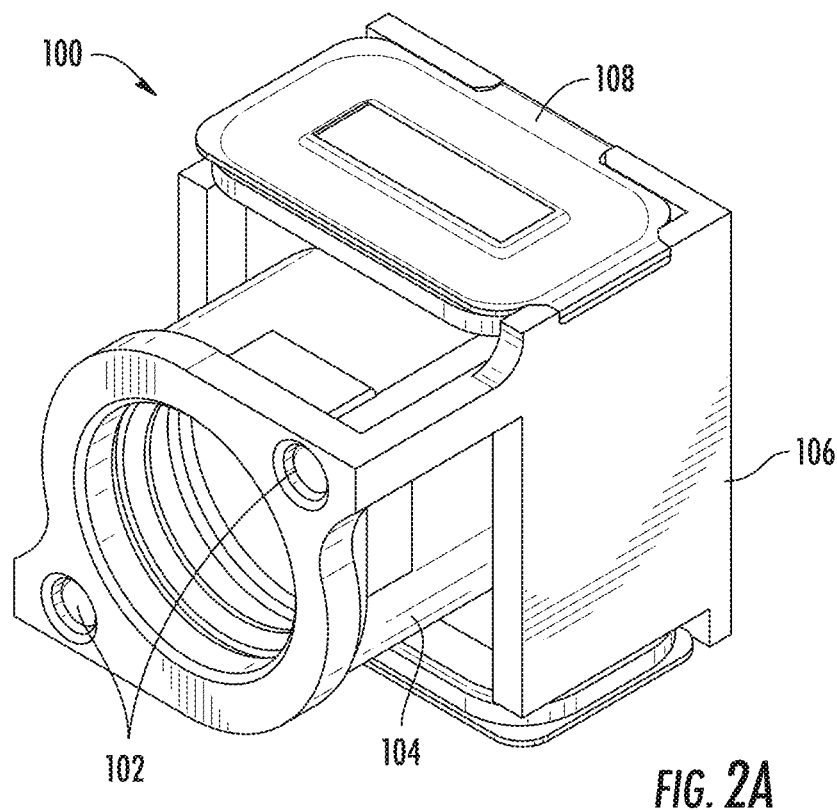
Figure 2B:
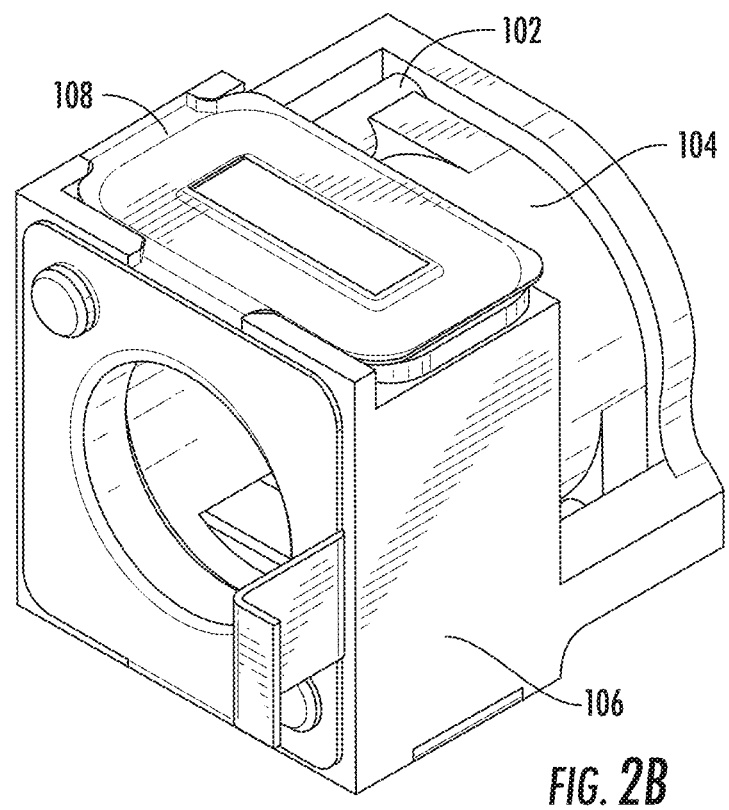
Figure 2C:
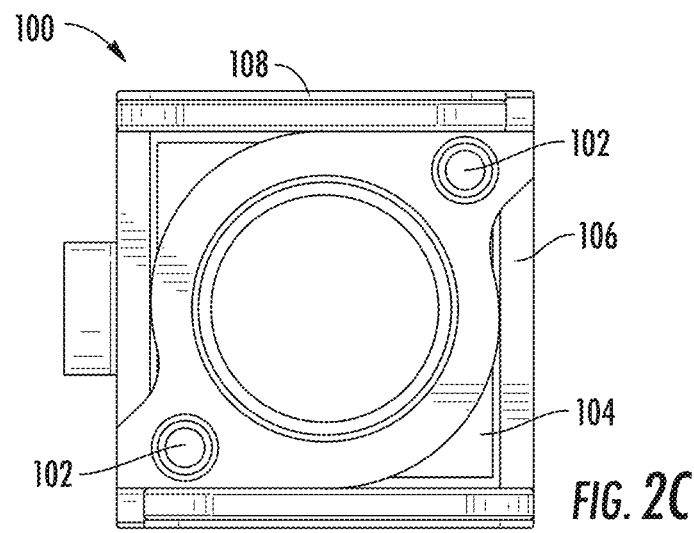
Figure 2D:
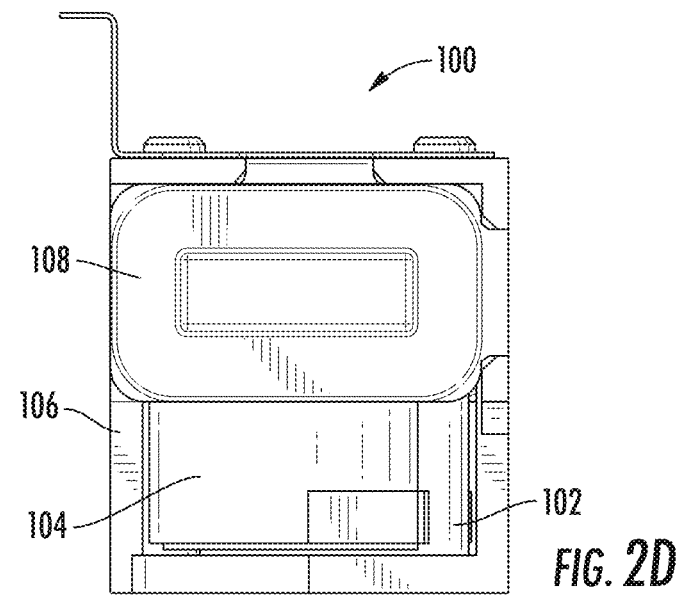
Figure 2E:
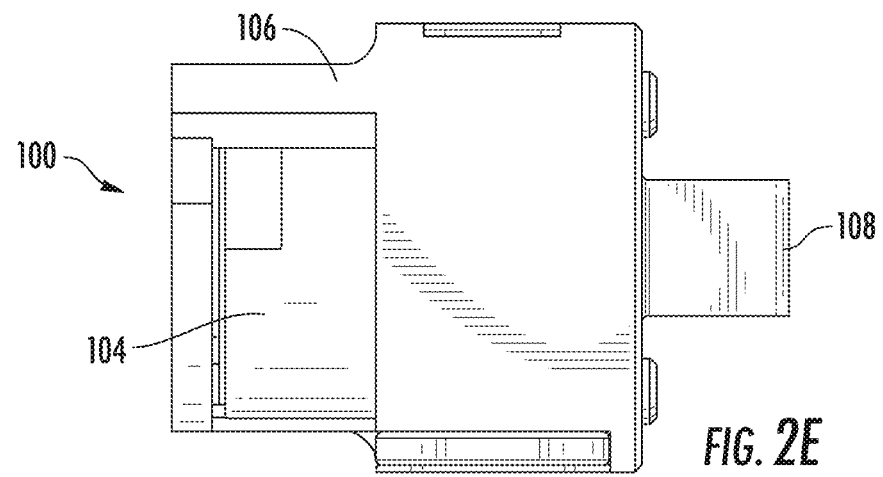

FIGS. 2A-2E illustrate various views of the discrete focusing lens assembly 100 as assembled. Specifically, FIG. 2A depicts the discrete focusing lens assembly 100 from a front perspective view. FIG. 2B depicts the discrete focusing lens assembly 100 from a back perspective view. FIG. 2C depicts a first orthogonal view of the front of the discrete focusing lens assembly 100. FIG. 2D depicts a second orthogonal view of the top of the discrete focusing lens assembly 100. FIG. 2E depicts a third orthogonal view of the side of the discrete focusing lens assembly 100.

As illustrated the lens barrel assembly 104 is positioned within the inner module space defined by the module base 106. The positioning coil board 108 includes a pair of positioning coil assemblies located on opposite sides of the module base 106, specifically the top and the bottom, for interacting with the lens barrel assembly 104. In this regard, the lens barrel assembly 104 is engaged with the module alignment pins 102 such that the lens barrel assembly 104 may transverse, or otherwise slide, along the module alignment pins 102. For example, the lens barrel assembly 104 may be repositioned based on magnetic forces generated by the positioning coil board 108. The top and bottom positioning coil assemblies of the positioning coil board 108, when in a powered state, create a magnetic force that interact with a default magnetic force between the lens barrel assembly and the positioning coil assemblies of the positioning coil board 108 to reposition the lens barrel assembly 104 forward or backwards from a default position.

Additionally or alternatively, some embodiments include one or more components for mounting the discrete focusing lens assembly within and/or connected with one or more apparatuses, such as one or more imaging apparatuses, test apparatuses, and/or the like. For example, as illustrated and described with respect to FIGS. 3A and 3B, some embodiments include a lens mount 302 for mounting the discrete focusing lens assembly 100 to one or more associated apparatuses. As illustrated in FIG. 3A, the lens mount 302 defines an inner mount space 304. The lens mount 302 is designed such that a discrete focusing lens assembly, such as the discrete focusing lens assembly, may be placed within the inner mount space 304 defined by the lens mount 302. Additionally or alternatively, the lens mount 302 may include one or more components, such as pins, slot configuration(s), snap configuration(s), and/or the like, or other components, to secure the discrete focusing lens assembly 100 to the lens mount 302. Additionally or alternatively still, the lens mount 302 may include one or more elements for attaching to an imaging apparatus, test apparatus, and/or the like. A non-limiting example of a lens mount comprises any of a number of known industry cameras that accept M12 threaded lenses, such as micro video lenses. It should be appreciated that, in other embodiments, a discrete focusing lens assembly such as the discrete focusing lens assembly 100 and/or discrete focusing lens assembly 150 may be mounted directly to an imaging apparatus, test apparatus, and/or the like without use of the lens mount 302. For example as described herein, an imaging apparatus may be designed to directly connect the discrete focusing lens assembly to one or more other components, such as a processor and/or the like, within an apparatus chassis for the imaging apparatus.

Example Details for Discrete Focusing Lens Assembly Components

Having described example discrete focusing lens assemblies and construction at a high level, further details of the components described are provided herein. It should be appreciated that, in various embodiments described herein, details of such components may be combined in any combination. For example, in one or more embodiments, one or more optional and/or additional components of each of the components may be included.

FIGS. 4A and 4B illustrate details of an example lens barrel assembly, specifically lens barrel assembly 104. FIG. 4A depicts an exploded view of the lens barrel assembly 104 from a front perspective. FIG. 4B. depicts an assembled view of the lens barrel assembly 104 from the front perspective.

As illustrated, the lens barrel assembly 104 includes an open frame lens barrel 404. The open frame lens barrel 404 may be a single piece, or a plurality of connected and/or otherwise melded pieces, forming a housing for the various other components as described. For example, the open frame lens barrel 404 includes a top magnet opening designed to receive a first positioning magnet 406A to be located on top of the lens barrel assembly 104, and the open frame lens barrel 404 includes a bottom magnet opening designed to receive a second positioning magnet 406b to be located on bottom of the lens barrel assembly 104. In some embodiments, the open frame lens barrel 404 is designed such that the first positioning magnet 406A and/or second positioning magnet 406B snap, fit, and/or otherwise are attached and/or located in position without the user of additional structures, components, and/or the like. In yet other embodiment, the first positioning magnet 406A and/or second positioning magnet 406B is/are attached to the open frame lens barrel 404 using one or more adhesives and/or other non-structural elements. Alternatively or additionally, in some embodiments, the positioning magnets 406A and/or 406B are molded into the open frame lens barrel 404 to be locked into position, or otherwise locked into the open frame lens barrel 404 with one or more thermal setting features. For example, in some embodiments, at least a portion of the open frame lens barrel 404 is melted down over one or more of the positioning magnets 406A and/or 406B to secure the positioning magnets 406A and/or 406B in place.

The open frame lens design includes a plurality of openings configured to enable engagement with one or more other components, for example of the discrete focusing lens assembly. For example, in some embodiments the open frame lens barrel 404 includes one or more alignment pin openings designed to receive one or more module alignment pins. As illustrated, the open frame lens barrel 404 includes a pair of second alignment pin openings 408B, one of the second alignment pin openings 408B in the front of the open frame lens barrel 404 and another in the back of the open frame lens barrel 404. Additionally, the open frame lens barrel 404 includes a pair of first alignment pin openings 408A, the pair of first alignment pin openings 408A located opposite the second alignment pin openings 408B. In this regard, the pair of first alignment pin openings 408A similarly includes one of the first alignment pin openings 408A in the front of the open frame lens barrel 404 and another of the first alignment pin openings 408A in the back of the open frame lens barrel 404 (not depicted). In this regard, the second alignment pin openings 408B may be aligned with one another such that a straight module alignment pin, such as one of the module alignment pins 102, may engage each of the second alignment pin openings 408B. Similarly, the first alignment pin openings 408A may be aligned with one another such that a straight module alignment pin, such as one of the module alignment pins 102, may engage each of the first alignment pin openings 408A. The aligned nature of the openings enables the open frame lens barrel 404 to engage each of the module alignment pins to align the lens barrel assembly 104 with respect to one or more other components while also enabling the open frame lens barrel 404 to transverse along the module alignment pins.

Additionally or alternatively, in some embodiments, the open frame lens barrel 404 includes one or more openings to enable access to one or more limit screws. For example, in this regard, the open frame lens barrel 404 may include one or more additional openings located in the opposite corners of one or more alignment pin openings, for example alignment pin openings 408B. The additional openings may be sufficiently sized to enable one or more instruments to pass through the openings to engage one or more limit screws for adjustment. Example instruments include a screwdriver, hex key, and/or the like, for engaging one or more limit screws, and/or other positioning limit components. In some embodiments, the additional openings enable access to back limiting screws, and/or other back positioning limit components, from the front of the lens barrel assembly.

Further as illustrated, the open frame lens barrel 404 defines a front and back aperture to enable light to traverse through the open frame lens barrel 404. The apertures may define an inner barrel space defined to house one or more optical elements. For example, as illustrated, the open frame lens barrel 404 defines circular apertures associated with imaging lens 402. In some embodiments, for example as illustrated, one or more of the positioning magnets, such as the first positioning magnet 406A and/or second positioning magnet 406B, are within the light path defined by the back aperture of the open frame lens barrel 404.

The imaging lens 402 includes one or more optical components for concentrating, refracting, and/or otherwise manipulating light entering the open frame lens barrel. In some embodiments, the imaging lens 402 comprises a plurality of sub-lenses designed to manipulate, in a desired manner, the light traversing through the aperture. For example, the imaging lens 402 may be designed to angle light for capture at one or more desired points, such as at a location of an associated image sensor. The imaging lens 402 may be constructed of any number of materials, for example glass, optical plastic, and/or the like, or a combination thereof. Additionally or alternatively, the imaging lens 402 may be constructed of one or more lenses embodying any number of lens designs.

FIGS. 5A and 5B illustrate cross-sectional views of the lens barrel assembly 104. Specifically, FIG. 5A illustrates a cross-sectional view of the lens barrel assembly 104 from a first side of the assembly. FIG. 5B illustrates a cross-sectional view of the lens barrel assembly 104 from the back of the assembly.

As illustrated in FIG. 5B, the first alignment pin openings 408A appear as a single opening as they are perfectly, or near perfectly (e.g., within a desired margin of error), aligned with one another. Similarly, the second alignment pin openings 408B appear as a single opening as they are perfectly, or near perfectly, aligned with one another. As described, this alignment enables the lens barrel assembly to by sufficiently supported for alignment and/or positing by one or more module alignment pins through engagement with the first alignment pin openings 408A and/or second alignment pin openings 408B. Additionally, the aligned design of the alignment pin openings enables the lens barrel assembly 104 to traverse along the module alignment pins.

As illustrated in FIGS. 5A and/or 5B, one or more of the positioning magnets may be located within the light path defined by the apertures of the open frame lens barrel 404. In this regard, the overall dimensions of the lens barrel assembly 104 may be minimized by ensuring the positioning magnet(s) do not require placement above the open frame lens barrel 404. For example, in some embodiments, the positioning magnet(s) may each be of a particular height equal to and/or lesser than the thickness of the open frame lens barrel 404 such that the positioning magnets do not increase the total height for the lens barrel assembly. In one or more embodiments, the open frame lens barrel 404 is designed and/or modified to include one or more defined spaces for supporting the positioning magnet(s). For example as illustrated, the first positioning magnet 406A is positioned at the top of the open frame lens barrel 404 and the second positioning magnet 406B is positioned at the bottom of the open frame lens barrel 404. In this regard, the positioning magnets 406A and 406B may be located opposite one another within the lens barrel assembly 104 to evenly affect the position of the lens barrel assembly 104 without increasing the overall size of the lens barrel assembly 104.

Additionally or alternatively, one or more of the positioning magnets 406A and/or 406B may be specially designed to minimize the effects of the positioning magnet being in the light path. As illustrated, the first and second positioning magnets 406A and 406B are each positioned within the light path to minimize the form factor of the assembly, which may cause unwanted light reflection off one or more of the positioning magnets 406A and/or 406B to be reduced for improved functionality. For example, in some embodiments, one or more of the first positioning magnet 406A and/or second positioning magnet 406B comprises a non-glossy dark surface. The non-glossy dark surface may minimize the effects of light reflections off the first positioning magnet 406A and/or second positioning magnet 406B affecting one or more associated image sensors. It should be appreciated that the non-glossy dark surface of one or more of the positioning magnets may be obtained in any of a number of ways. For example, in some embodiments, one or more of the first positioning magnet 406A and/or second positioning magnet 406B include a magnet surface epoxy. The magnet surface epoxy may be applied to the positioning magnet(s) to cause such positioning magnet(s) to have a non-glossy dark surface without noticeably increasing the dimensions of the positioning magnet(s) and/or affecting the functionality of such positioning magnet(s). In at least one example embodiment where one or more of the positioning magnets comprises a glossy and/or reflective material, for example a zinc and/or nickel plating, the magnet surface epoxy may cover the glossy and/or reflective surface without affecting the form factor and/or functionality of the positioning magnet(s). In some embodiments one or more of the positioning magnets may be constructed of a non-glossy dark material, such that the positioning magnet(s) include a non-glossy dark surface upon being manufactured and/or otherwise without additional steps.

FIG. 6 illustrates various design detailed of an example positioning coil board in accordance with at least one example embodiment of the present disclosure. Specifically, FIG. 6 depicts a first perspective view of the positioning coil board 158. It should be appreciated that similar details may be present in one or more other implementations of a positioning coil board, for example positioning coil board 108 as described herein.

The positioning coil board 158 includes a coil connection board 602. The coil connection board 602 embodies hardware. circuitry, and/or the like for connecting one or more subassemblies of the positioning coil board 158. In this regard, the coil connection board 602 may be embodied by conductive material configured to receive an electric current to power one or more subassemblies of the positioning coil board 158, such as one or more positioning coil assemblies and/or components thereof. For example, the coil connection board 602 receive an electrical current to power the first positioning coil 604A and/or second positioning coil 604B.

As illustrated, the coil connection board 602 includes a first alignment pin opening 610A and a second alignment pin opening 610B (collectively "alignment pin openings 610"). The first alignment pin opening 610A is located opposite the second alignment pin opening 610B. Each of the alignment pin openings may be designed to engage a module alignment pin, for example when the positioning coil board 158 is positioned and/or aligned with one or more other components of a discrete focusing lens assembly. In this regard, for example, the first alignment pin opening 610A may be aligned with a first alignment pin opening of a module base and/or lens barrel assembly, and/or the second alignment pin opening 610B may be aligned with a second alignment pin opening of a module base and/or lens barrel assembly, when the components are properly aligned for operation. It should be appreciated that, in other embodiments, a positioning coil board does not include any alignment pin opening(s). For example, in this regard, the positioning coil board may be fixedly attached to the module base, without being secured by and/or otherwise engaged with one or more module alignment pins.

The coil connection board 602 further includes a first limit component opening 608. The first limit component opening 608 may be located opposite a second limit component opening (not depicted). In this regard, the first and/or second limit component openings may be designed to engage with one or more limit components, for example together with associated limit component openings of one or more other components such as a module base. For example, as described, the first limit component opening 608 may engage one of the back limit screws 160B as described with respect to FIG. 1 for setting a back positional limit for an associated lens barrel assembly. Similarly, the second limit component opening may engage the other of the back limit screws 160B. In this regard, the limit components may extend through both limit component openings of the positioning coil board 158 and an associated module base.

The positioning coil board 158 further comprises a first positioning coil 604A and a second positioning coil 604B (collectively "positioning coils 604"). Each of the positioning coils 604 may comprise a wound length of electrically conductive wire. In this regard, each of the positioning coils 604 may be powered to a powered state based on the electrical current passed through the positioning coil of the positioning coils 604. It should be appreciated that each of the positioning coils 604 may comprise the same material, for example copper wire, coated copper wire, tinned wire, and/or the like. It should be appreciated that, in some embodiments, each of the positioning coils 604 is designed to generate the same strength magnetic field as the other of the positioning coils 604 in a circumstance where the coil is set to the same powered state.

As illustrated, each of the positioning coils 604 defines a coil inner region comprising an open space between the wire coil. In this regard, the positioning coil board 157 may include a positioning pad located in the coil inner region for each of the positioning coils 604. Specifically, as illustrated, the first positioning pad 606A is located in a first coil inner region of the first positioning coil 604A. Additionally, the second positioning pad 606B is located in a coil inner region of the second positioning coil 604B. In this regard, each of the first positioning pad 606A and the second positioning pad 606B (collectively "positioning pads 606") may comprise particular volumetric dimensions specific to fit within the inner region defined by the corresponding positioning coil.

In some embodiments, each of the positioning pads 606 comprises a component of magnetic material. For example, in some embodiments, each of the positioning pads 606 comprise a mass of iron, or majority iron, designed to fit within the coil inner region of the corresponding positioning coil. In this regard, each of the positioning pads 606 may be configured to interact with one or more magnets of a discrete focusing lens assembly when assembled, such as where the positioning magnets of a lens barrel assembly are aligned with each of the positioning pads 606 when the discrete focusing lens assembly is assembled for operation and when each of the positioning coils 604 are in a non-powered state. For example, the first positioning pad 606A may interact with a first positioning magnet of a lens barrel assembly. Similarly, the second positioning pad 606B may interact with a second positioning magnet of the lens barrel assembly.

In some embodiments, each of the positioning pads 606 is secured within the coil inner region using any of a myriad of manners. For example, in some embodiments, one or more for the positioning pads 606 is secured using one or more adhesives. Additionally or alternatively, in some embodiments, each inner coil region is defined by a coil frame. In some such embodiments, each coil frame may be molded entirely and/or partially around the corresponding positioning pad of the positioning pads 606 to secure the corresponding positioning pad. In some such embodiments, the coiled wire is wound around the coil frame.

As illustrated, the first positioning coil 604A is located opposite the second positioning coil 604B. Similarly in this regard, the first positioning pad 606A is located opposite the second positioning pad 606B. Accordingly, the first positioning pad 606A may interact with a first positioning magnet of a lens barrel assembly, and the second positioning pad 606B may interact with a second positioning magnet of the lens barrel assembly, to maintain and/or cause adjusting of the position of the lens barrel assembly within a module base. For example, in at least one example context, the first positioning pad 606A, a first positioning magnet of a lens barrel assembly, the second positioning pad 606B, and a second positioning magnet of the lens barrel assembly, are all aligned in a default state based on a default magnetic force between the positioning magnets and corresponding positioning pad of the positioning pads 606A, such as when each of the positioning coils 604 are in a non-powered state.

The first positioning coil 604A may be powered to a first powered state to generate a first magnetic field, and the second positioning coil 604B may be powered to generate a second magnetic field symmetric to that of the first magnetic field. Accordingly, the first magnetic field and second magnetic field may cancel out with respect to one or more directions opposite one another. In this regard, the interaction of the first magnetic field and second magnetic field may result in a resulting magnetic field providing a force in only one direction, for example representing a lateral direction with respect to one or more module alignment pins of a lens barrel assembly. This resulting magnetic force may further interact with the default magnetic force between the positioning magnet(s) of a lens barrel assembly and the positioning pads 606A to move the lens barrel assembly to a new focus position, as described herein, based on the resulting magnetic force.

Examples of Image Capture and Focus Relationship

Having described example assemblies and component details for the various components of the assembly, additional description is provided with respect to operation of discrete focusing lens assemblies for image capture. Additionally or alternatively, additional description is provided regarding the focus position of a discrete focusing lens assembly for purposes of image capture. It should be appreciated that, based on the above disclosure, one or more of the lens assemblies as described may be utilized for image capture in any of the contexts described.

FIGS. 7A and 7B illustrate the traversal of light through a discrete focusing lens assembly for capture by an associated image sensor, in accordance with at least one example embodiment of the present disclosure. Specifically, FIG. 7A depicts a side cross-sectional view of a discrete focusing lens assembly, with light trace visualization, and a corresponding image sensor. FIG. 7B depicts a front perspective view of the discrete focusing lens assembly, with light trace visualization, and the corresponding image sensor. In some embodiments, for example, the components as depicted may be integrated into an imaging apparatus as described herein.

FIGS. 7A and 7B include an image sensor 702. In some embodiments, the image sensor 702 is configured to capture an image data object representing incoming light interacting with the image sensor 702. Specifically, as illustrated, the light may be traversed through one or more optical components, such as the discrete focusing lens assembly 100. In this regard, the image sensor may convert the light waves that interact with the image sensor 702 into data represented in the corresponding captured image data object.

The discrete focusing lens assembly 100, as illustrated, is located in front of the image sensor 702. In this regard, light that reaches the image sensor 702 may traverse through one or more apertures defined by the discrete focusing lens assembly 100, and/or optical elements positioned therein. For example, as illustrated, incoming light may enter the front of the discrete focusing lens assembly 100 and interact with one or more imaging lenses of the discrete focusing lens assembly 100 before exiting the discrete focusing lens assembly 100 and interacting with the image sensor 702. In this regard, the discrete focusing lens assembly 100 and/or various subcomponents thereof may manipulate the incoming light to reorient the light towards the image sensor 702 and/or one or more target portions of the image sensor 702.

Light trace 704 represents an example visualization of the manipulation of light rays that transverse through the discrete focusing lens assembly. As illustrated, the light trace 704 depicts incoming light that is reflected, refracted, and/or otherwise manipulated by the discrete focusing lens assembly for capture by the image sensor 702. Specifically, as illustrated, incoming light may interact with one or more imaging lenses of a lens barrel assembly of the discrete focusing lens assembly 100, and/or one or more components of the lens barrel assembly such as an open frame lens barrel housing such image lens(es). In this regard, as illustrated by the light trace 704, at least some of the incoming light may be reflected towards the image sensor 702 upon interacting with the open frame lens barrel. Similarly, at least some incoming light may be angled towards one or more specific portions of the image sensor 702 to enable capture of an image data object representing the incoming light.

The light trace 704 may be changed based on one or more changes to aspect(s) of the discrete focusing lens assembly 100. For example, in some embodiments, the focus position of the lens barrel assembly within the discrete focusing lens assembly 100 alters the manipulation of light by the discrete focusing lens assembly 100, such that incoming light at a particular point may interact with the image sensor 702 at different point(s) based on the focus position of the lens barrel assembly. Accordingly, by repositioning the lens barrel assembly within the discrete focusing lens assembly 100, the image data object captured by the image sensor 702 may change to reflect the adjusted focus position. In some such embodiments, repositioning the lens barrel assembly within the discrete focusing lens assembly 100 causes objects at a particular focus range corresponding to the focus position to be reflected more clearly within the captured image data object, for example as described herein with respect to image data objects including representations of one or more visual coded indicia.

FIGS. 8A, 8B, and 8C illustrate example visualizations of a lens barrel assembly positioned at different focus positions within a module base of a discrete focusing lens assembly. Specifically, FIG. 8B depicts a lens barrel assembly at a first focus position, the first focus position for neutral field focusing. FIG. 8B depicts the lens barrel assembly at a second focus position, the second focus position for far field focusing. FIG. 8C depicts the lens barrel assembly at a third focus position, the third focus position for near field focusing.

FIG. 8A depicts the lens barrel assembly 104 within the module base 106 at a first focus position for neutral field focusing. In some such embodiments, the focus position is defined based on an offset of the lens barrel assembly 104 from a default position. The default position may be defined by the position of the lens barrel assembly 104 when one or more coil positioning assemblies of the discrete focusing lens assembly 100 are in a non-powered state, or in other embodiments a default powered state. For example, in some embodiments, the lens barrel assembly 104 is located at a middle focus position in a non-powered state, the middle focus position defining a default focus position when in the non-powered state (e.g., zero current via the positioning coil assemblies). In some such embodiments where the coil positioning assemblies are in a non-powered state, the lens barrel assembly 104 may be positioned within the discrete focusing lens assembly 100 based on a default magnetic force between one or more positioning magnets of the lens barrel assembly 104 and one or more positioning pads of the discrete focusing lens assembly 100.

For purposes of description, the focus position associated with the lens barrel assembly 104 may be defined with regard to one or more offsets with respect to one or more particular axes associated with the positioning pads of the discrete focusing lens assembly 100 and/or positioning magnets of the lens barrel assembly 104, and corresponding offsets to the front and back of the module base 106 within which the lens barrel assembly 104 is aligned. For example, FIGS. 8A, 8B, and 8C each include the pad front axis 802A depicting a front axis of the pair of positioning pads for the discrete focusing lens assembly 100, a pad center axis 802B depicting a center axis for the pair of positioning pads of the discrete focusing lens assembly 100, and a pad back axis 802C representing a rear axis for the pair of positioning pads of the discrete focusing lens assembly 100.

As illustrated in FIG. 8A, in at least one example embodiment, at the neutral focus position the lens barrel assembly 104 is positioned such that the positioning magnets of the lens barrel assembly 104 align with the various axes associated with the pair of positioning pads. In this regard, the front of the positioning magnets is aligned with the pad front axis 802A, the back of the positioning magnets is aligned with the pad back axis 802C, and the center of the positioning magnets is aligned with the pad center axis 802B. In other embodiments, at the neutral focus position, the center of the positioning magnets aligns with the pad center axis 802B, but the front of the positioning magnets does not align with the pad front axis 802A and/or the back of the positioning magnets does not align with the pad back axis 802C. For example, in some such embodiments, the positioning magnets are each bigger and/or smaller in width than the positioning pads, such that the front and/or back of the positioning magnets are not aligned with the positioning pads when the centers of the positioning magnets align with the center of the positioning pads.

As illustrated, when the lens barrel assembly 104 is positioned at the neutral focus position, the front of the lens barrel assembly 104 is a spaced by a first offset from the inner wall of the front of the module base 106. Specifically, as illustrated, the inner wall of the front of the module base 106 is spaced from the front of the discrete focusing lens assembly 100 by the neutral focus frontal position offset 806A. The neutral focus frontal position offset 806A may be designed as a predetermined distance between the front of the lens barrel assembly 104 and the inner wall of the front of the module base 106 when the lens barrel assembly 104 is at a neutral focus position. In some embodiments, the neutral focus frontal position offset 806A represents a maximum distance that the lens barrel assembly 104 may be moved forward from the neutral focus position for example to focus the discrete focusing lens assembly 100 for improved near field focusing.

Further, when the lens barrel assembly 104 is positioned at the neutral focus position, the back of the lens barrel assembly 104 is spaced by a second offset from inner wall of the back of the module base 106. Specifically, as illustrated, the inner wall of the back of the module base 106 is spaced from the back of the lens barrel assembly 104 by the neutral focus back position offset 808A. The neutral focus back position offset 808A may be designed as a predetermined distance between the back of the lens barrel assembly 104 and the inner wall of the back of the module base 106 when the lens barrel assembly 104 is at the neutral focus position. In some embodiments, the neutral focus back position offset 808A represents a maximum distance that the lens barrel assembly 104 may be moved backwards from the neutral focus position, for example to focus the discrete focusing lens assembly 100 for improved far field focusing.

As illustrated in FIG. 8B, in at least one example embodiment, at a far focus position the lens barrel assembly 104 is positioned such that the positioning magnets of the lens barrel assembly 104 are offset from the various axes associated with the pair of positioning pads by a far position magnetic offset 804B. In this regard, the front of the positioning magnets is shifted backwards from the pad front axis 802A by the far position magnetic offset 804B, the back of the positioning magnets is shifted backwards from the pad back axis 802C by the near position magnetic offset 804B, and the center of the positioning magnets is shifted backwards from the pad center axis 802B by the near position magnetic offset 804B. In other embodiments, for example where the positioning magnets are larger and/or smaller than the positioning pads, only the center of the positioning magnets is offset from the pad center axis 802B by the far position magnetic offset 804B.

The far focus position may be defined by the position of the lens barrel assembly 104 when one or more coil positioning assemblies of the discrete focusing lens assembly 100 are in a first powered state, for example a far focus powered state. In some such embodiments where the coil positioning assemblies are in the far focus powered state, the lens barrel assembly 104 may be positioned within the discrete focusing lens assembly 100 based on the magnetic force created by the coil positioning assemblies in the far focus powered state together with the default magnetic force between one or more positioning magnets of the lens barrel assembly 104 and one or more positioning pads of the discrete focusing lens assembly 100. For example, in this regard, the interaction between the magnetic forces may result in a resulting magnetic force defining the far focus position.

As illustrated, when the lens barrel assembly 104 is positioned at the far focus position, the back of the lens barrel assembly 104 is positioned as far backwards as possible within the module base 106. In this regard, there is no back position offset between the inner wall of the back of the module base 106 and the back of the lens barrel assembly 104. In some such embodiments, the inner wall of the back of the module base 106 may be in contact with the back of the lens barrel assembly 104 to stop the lens barrel assembly 104 from moving any further backwards. In other embodiments, at the far focus position, the lens barrel assembly 104 may be in contact with one or more back limit components, such as back limit screws as described with respect to discrete focusing lens assembly 150. It should be appreciated that, as illustrated, the far focus position may be positioned backwards from the neutral focus position by the distance represented by the neutral focus back position offset as described above with respect to 808A.

Further, when the lens barrel assembly 104 is positioned at the far focus position, the front of the lens barrel assembly 104 is spaced by a second offset from the inner wall of the front of the module base 106. Specifically, as illustrated, the inner wall of the front of the module base 106 is spaced from the front of the lens barrel assembly 104 by the far focus frontal position offset 806B. The far focus frontal position offset 806B may represent a distance equal to the neutral focus back position offset 808A added to the neutral focus frontal position offset 806A. In other words, in some such embodiments, the far focus frontal position offset 806B represents the maximum distance the front of the lens barrel assembly 104 can be located from the inner wall of the front of the module base 106. It should be appreciated that, to move the lens barrel assembly 104 to the far focus position, the magnetic offset 804B may match the neutral focus back position offset 808A as described above. It should be appreciated that moving the lens barrel assembly 104 may improve the far field focusing of the discrete focusing lens assembly 100.

As illustrated in FIG. 8C, in at least one example embodiment, at a near focus position the lens barrel assembly 104 is positioned such that the positioning magnets of the lens barrel assembly 104 are offset from the various axes associated with the pair of positioning pads by a near position magnetic offset 804C. In this regard, the front of the positioning magnets is shifted forward from the pad front axis 802A by the near position magnetic offset 804C, the back of the positioning magnets is shifted forward from the pad back axis 802C by the near position magnetic offset 804C, and the center of the positioning magnets is shifted forward from the pad center axis 802B by the near position magnetic offset 804C. In other embodiments, for example where the positioning magnets are larger and/or smaller than the positioning pads, only the center of the positioning magnets is offset from the pad center axis 802B by the near position magnetic offset 804C.

The near focus position may be defined by the position of the lens barrel assembly 104 when one or more coil positioning assemblies of the discrete focusing lens assembly 100 are in a second powered state, for example a near focus powered state. In some such embodiments where the coil positioning assemblies are in the near focus powered state, the lens barrel assembly 104 may be positioned within the discrete focusing lens assembly 100 based on the magnetic force created by the coil positioning assemblies in the near focus powered state together with the default magnetic force between one or more positioning magnets of the lens barrel assembly 104 and one or more positioning pads of the discrete focusing lens assembly 100. For example, in this regard, the interaction between the magnetic forces may result in a resulting magnetic force defining the near focus position.

As illustrated, when the lens barrel assembly 104 is positioned at the near focus position, the front of the lens barrel assembly 104 is positioned as forward as possible within the module base 106. In this regard, there is no frontal position offset between the inner wall of the front of the module base 106 and the front of the lens barrel assembly 104. In some such embodiments, the module base 106 may be in contact with the lens barrel assembly 104 to stop the lens barrel assembly 104 from moving any more forward. In other embodiments, at the near focus position, the lens barrel assembly 104 may be in contact with one or more front limit components, such as front limit screws as described with respect to discrete focusing lens assembly 150. It should be appreciated that, as illustrated, the near focus position may be positioned forward from the neutral focus position by the distance represented by the neutral focus frontal position offset as described above with respect to 806A.

Further, when the lens barrel assembly 104 is positioned at the near focus position, the back of the lens assembly 104 is spaced by a second offset from the inner wall of the back of the module base 106. Specifically, as illustrated, the inner wall of the back of the module base 106 is spaced from the back of the lens barrel assembly 104 by the near focus back position offset 808C. The near focus back position offset 808C may represent a distance equal to the neutral focus back position offset 808A added to the neutral focus frontal position offset 806A. In other words, in some such embodiments, the near focus back position offset 808C represents the maximum distance the back of the lens barrel assembly 104 can be located from the inner wall of the module base 106. It should be appreciated that, to move the lens barrel assembly 104 to the near focus position, the magnetic offset 804C may match the neutral focus frontal position offset 806A as described above. It should be appreciated that moving the lens barrel assembly 104 may improve the near field focusing of the discrete focusing lens assembly 100.

It should be appreciated that the focus positions described above are merely exemplary for purposes of description and illustration. In other embodiments, the lens barrel assembly may be positioned continuously within the module base. In this regard, for example, the positioning coil assemblies of the discrete focusing lens assembly 100 may be powered to any number of powered states. Each of the powered states may correspond to a resulting magnetic force defining a different focus position. In some such embodiments, as the lens barrel assembly 104 is positioned more forward within the module base 106 along a continuous spectrum of focus positions, the near field focusing of the discrete focusing lens assembly 100 improves. Similarly, in some such embodiments, as the lens barrel assembly 104 is positioned more backwards within the module base 106 along a continuous spectrum of focus positions, the far field focusing of the discrete focusing lens assembly 100 improves.

FIGS. 9A, 9B, and 9C each illustrate a visualization of an image data object including representations of various visual encoded indicias captured by an image sensor using a discrete focusing lens assembly having a lens barrel assembly at different focus positions. Specifically, each of FIGS. 9A, 9B, and 9C depict a near-field indicia at a first distance the discrete focusing lens assembly, a neutral-field indicia at a second distance from the discrete focusing lens assembly, and a far-field indicia at a third distance from the discrete focusing lens assembly. In one example context, for example as illustrated, the near-field indicia may be positioned 1 meter from the discrete focusing lens assembly, the neutral-field indicia may be positioned 1.8 meters from the discrete focusing lens assembly, and the far-field indicia may be positioned 6 meters from the discrete focusing lens assembly. It should be appreciated that, in other embodiments, the near-field indicia, neutral field indicia, and/or far-field indicia may be positioned at alternative distances to those described above, for example where the far-field indicia is positioned further than the neutral-field indicia positioned further than the near-field indicia.

FIG. 9A depicts an image data object representing the various visual encoded indicias as captured using a lens barrel assembly at a default focus position, for example as depicted with respect to FIG. 8A. In this regard, the lens barrel assembly may be positioned to enable capture of the visual encoded indicias at medium or determined middle-range, distances in better focus, for example at and/or around 1.8 meter from the lens barrel assembly.

FIG. 9A includes a first representation of the far-field indicia 902A, a first representation of the neutral-field indicia 904A, and a first representation of the near-field indicia 906A. As illustrated, the first representation of the far-field indicia 902A is not in focus, such that the captured representation is blurry due to not being at a distance close to the focus range associated with the neutral focus position of the lens barrel assembly. Similarly, the first representation of the near-field indicia 906A is also not in focus, such that the captured representation is blurry as also not being at a distance close to the focus range associated with the neutral focus position of the lens barrel assembly. However, in this regard, the near-field indicia 906A is closer to the focus range associated with the near focus position for the lens barrel assembly, and as such in better focus than the representation of the far-field indicia 902A. The first representation of the neutral-field indicia 904A is best in focus as the focus range for the neutral focus position matches, and/or is closest to, the distance at which the neutral-field indicia is located. As such, objects at this distance are represented most clearly in captured image data objects. As such, when the lens barrel assembly is positioned in at the neutral focus position, the visual encoded indicia at the focus range associated with the neutral focus position for the lens barrel assembly, for example 1.8 meters, may be most likely to be successfully detected and/or successfully decoded from the image data object.

FIG. 9B depicts an image data object representing the various visual encoded indicias as captured using a lens barrel assembly at a near focus position. In this regard, the lens barrel assembly may be positioned to enable capture of the visual encoded indicias at close distances in better focus, for example at and/or around 1 meter from the lens barrel assembly. FIG. 9B includes a second representation of the far-field indicia 902B, a second representation of the neutral-field indicia 904B, and a third representation of the near-field indicia 906B. As illustrated, the second representation of the far-field indicia 902B is least in focus, such that the captured representation is blurry due to being the furthest from the focus range corresponding to the near focus position of the lens barrel assembly. Further in this regard, the second representation of the neutral-field indicia 904B is more in focus than the far-field indicia 902B, however the neutral-field indicia 904B remains partially blurred as the focus range for the neutral focus position is not equal to the distance at which the neutral-field indicia is located. As such, the second representation of the near-field indicia 906B is the most in focus, for example such that the data represented in the image data object most clearly represents the visual encoded indicia. In this regard, the focus range for the near focus position may match, or most closely match, the distance for the near-field indicia, such that objects at this distance are represented most clearly in captured image data objects. As such, visual encoded indicia at the near focus range associated with the near focus position for the lens barrel assembly, for example 1 meter, may be most likely to be successfully detected and/or successfully decoded from the image data object.

FIG. 9C depicts an image data object representing the various visual encoded indicias as captured using a lens barrel assembly at a far focus position. In this regard, the lens barrel assembly may be positioned to enable capture of the visual encoded indicias at far distances in better focus, for example at and/or around, or more than, 6 meter from the lens barrel assembly. FIG. 9C includes a third representation of the far-field indicia 902C, a third representation of the neutral-field indicia 904C, and a third representation of the near-field indicia 906C. As illustrated, the third representation of the near-field indicia 906C is least in focus, such that the captured representation is blurry due to being the furthest from the focus range corresponding to the far focus position of the lens barrel assembly. Further in this regard, the third-representation of the neutral-field indicia 904B is more in focus than the third representation of the near-field indicia 906C, however the third representation of the neutral-field indicia 904C remains partially blurred as the focus range for the far focus position is not equal to the distance at which the neutral-field indicia is located. As such, the third representation of the far-field indicia 902C is the most in focus, for example such that the data represented in the image data object most clearly represents the visual encoded indicia. In this regard, the focus range for the far focus position may match, or most closely match, the distance for the far-field indicia, such that objects at this distance are represented most clearly in captured image data objects. As such, visual encoded indicia at the far focus range associated with the far focus position for the lens barrel assembly, for example 6 meter, may be most likely to be successfully detected and/or successfully decoded from the image data object.

It should be appreciated that the illustrated representations are merely exemplary. In other embodiments, such representations may become better in focus by positioning the lens barrel assembly at one or more other focus positions. For example, in some other embodiments, a representation of a visual encoded indicia at 3 meters may be in focus at an additional focus position between the neutral focus position and the far focus position along a continuous focus position spectrum.

Example Magnetism Forces and Functionality Details of the Barrel Lens Assembly

Having described the physical configuration of the focus position of the lens barrel assembly, details are now provided regarding the magnetic forces that cause repositioning of the lens barrel assembly and functionality details associated with discrete focusing lens assemblies. It should be appreciated that the specific details, and/or implementation values, described are merely exemplary. Indeed, in other embodiments similar implementations may be utilized similar to that described and depicted. In this regard, the specific implementations as depicted and/or described should be understood not to limit the scope and/or spirit of this disclosure.

FIGS. 10A and 10B illustrate the magnetic forces exerted by each of a pair of coil positioning assemblies associated with a pair of positioning magnets of a discrete focusing lens assembly, in accordance with at least some example embodiments of the present disclosure. Specifically, FIG. 10A depicts the magnetic forces exerted by each of a pair of coil positioning assemblies associated with a pair of positioning magnets of a discrete focusing lens assembly in a circumstance where the pair of coil positioning assemblies are in a non-powered state. FIG. 10B depicts the magnetic forces exerted by each of a pair of coil positioning assemblies associated with a pair of positioning magnets of a discrete focusing lens assembly in a circumstance where the pair of coil positioning assemblies are in a first powered state.

As illustrated in FIG. 10A, a first positioning magnet in combination with a first positioning coil assembly exerts a first magnet-coil force 1002. For example, in this regard, the first positioning magnet and first positioning coil assembly may be located towards the top of the discrete focusing lens assembly. Similarly, a second positioning magnet in combination with a second positioning coil assembly exerts a second magnet-coil force 1004. For example, the second positioning magnet and second positioning coil assembly may be located towards the top of the discrete focusing lens assembly.

The first magnet-coil force 1002 may be symmetric with respect to the second magnet-coil force 1004. The magnetic forces 1002 and 1004 may be generated opposite one another, such that the first magnet-coil force 1002 combines with the second magnet-coil force 1004 along a desired direction of movement (e.g., forward or backwards) to improve the efficiency for moving the lens barrel assembly in the desired direction, and counteracts in one or more orthogonal directions not required for such movement (for example, towards one or more positioning pads). In this regard, in some such embodiments, the lens barrel assembly may remain at a default focus position despite the presence of the first magnet-coil force 1002 and second magnet-coil force 1004. In some such embodiments, the first magnet-coil force 1002 and second magnetic-coil force 1004 may move the lens barrel assembly to a default focus position, and/or move the lens barrel assembly along an axis of movement to another focus position based on a current direction and current strength of the current flowing through each of a pair of positioning coil assemblies. As such, the first magnet-coil force 1002 in combination with the second magnet-coil force 1004 may define the default focus position for the lens barrel assembly within the module base.

FIG. 10B illustrates a third magnet-coil force 1052 and a fourth magnet-coil force 1054. The third magnet-coil force 1052 maybe exerted by the top positioning magnet in combination with the top positioning coil assembly powered to a first powered state. Similarly, the fourth magnet-coil force 1054 may be exerted by the bottom positioning magnet in combination with the bottom positioning coil assembly powered to the first powered state. As illustrated, the third magnet-coil force 1052 includes at least some magnetic forces symmetric but opposite to at least some magnetic forces exerted by the fourth magnet-coil force 1054. Such opposite magnetic forces may counteract such that there is no net magnetic force in such directions, for example orthogonal to a direction of movement enabled by engagement of the lens barrel assembly with one or more module alignment pins. Additionally, the third magnet-coil force 1052 and the fourth magnet-coil force 1054 each exert magnetic forces in the same direction parallel to the direction of movement enabled by engagement of the lens barrel assembly with one or more module alignment pins (for example, towards the front of the module base). These magnetic forces may be applied to the lens barrel assembly to reposition the lens barrel assembly to a new focus position along the module alignment pin(s). It should be appreciated that in a circumstance where the positioning coil assemblies are powered to a different powered state, for example to a negative state as compared to the first powered state, the generated magnetic forces may be in the opposite direction parallel to the module alignment pins, for example such that the magnetic forces are applied to the lens barrel assembly to cause movement in the other direction (for example, towards the back of the module base).

FIG. 11 illustrates an example distribution of the force in relation to displacement. Specifically, as illustrated, the distribution includes a graph 1150 of the displacement of the lens barrel assembly as compared to the exerted magnetic force. In this regard, the front of the module base may be associated with a positive displacement, and the back of the module base may be associated with a negative displacement. Specifically, as illustrated, at a default and/or otherwise neutral focus position (e.g., 0.00 um), the magnetic force is approximately 22 mN. As the displacement increases in the positive direction (i.e., towards the front of the module base) the required force decreases and approaches zero. Similarly, as the displacement decreases in the negative direction (i.e., towards the back of the module base) the required force further increases, approaching 39 mN.

The focus position may be defined based on the current direction and strength within one or more positioning coil assemblies, such as a pair of positioning coil assemblies. For example, in this regard, the lens barrel assembly may be positioned at a default position under no current to the pair of positioning coil assemblies (e.g., in a non-powered state). Further, in this regard, the lens barrel assembly may be positioned at a maximal forward position when a first maximal current strength in a first direction is applied to the pair of positioning coil assemblies (e.g., a first powered state). Similarly, in this regard, the lens barrel assembly may be positioned at a maximal backward position when a second maximal current strength in a second direction is applied to the pair of positioning coil assemblies (e.g., a second powered state).

By distributing the various required forces to position the lens barrel assembly at the front, back, or neutral focus position within the module base, the discrete focusing lens assembly is designed to quickly position the lens barrel assembly to the extreme positions by rapidly altering the exerted magnetic force. In this regard, for example, one or more positioning coil assemblies may be manipulated to exert zero or near-zero magnetic force, such as the lowest possible magnetic force, to position the lens barrel assembly at a near focus position as close to the front of the module base as possible, and for example furthest from an image sensor. Similarly, one or more positioning coil assemblies may be manipulated to exert a maximum magnetic force, or near-maximum magnetic force, to position the lens barrel assembly at a far focus position as close to the back of the module base as possible, and for example closest to a corresponding image sensor. Further, one or more positioning coil assemblies may be manipulated to exert an intermediate, target magnetic force to position the lens barrel assembly at a neutral focus position towards the middle of the module base. In this regard, the discrete focusing lens assembly may be designed to quickly exert the necessary force to enable displacement of the lens barrel assembly to translate to at least these three discrete focus positions. It should be appreciated that, in other embodiments, a discrete focusing lens assembly may be configured to exert the necessary force to enable displacement of the lens barrel assembly to translate to any number of other focus positions.

FIG. 12A, for example, illustrates an example graphing of the displacement of the lens barrel assembly when applying a first force to move the lens barrel assembly from a default focus position to a far focus position, such as from the middle of the module base to the back of the module base closest to an associated image sensor. As illustrated, the lens barrel assembly reacts to the applied force such that the lens barrel assembly reaches the far focus position at approximately position time 1202, for example within 2 milliseconds. Further, the lens barrel assembly stabilizes its position by position time 1204, for example within 10 milliseconds. In this regard, the magnetic forces sufficiently reposition the lens barrel assembly to a far focus position with a quick response time that may be unnoticeable during human operation and/or otherwise not impede operation of the assembly and/or an associated imaging apparatus.

FIG. 12B illustrates another example graphing of the displacement of the lens barrel assembly when applying a second force to move the lens barrel assembly from a default focus position to a near focus position, such as from the middle of the module base to the front of the module base furthest from an associated image sensor. As illustrated, the lens barrel assembly reacts to the applied force such that the lens barrel assembly reaches the near focus position at approximately position time 1252, for example between 2 and 2.5 milliseconds. Further, the lens barrel assembly stabilizes its position by position time 1254, for example again within 10 milliseconds. In this regard, the magnetic forces also sufficiently reposition the lens barrel assembly to a near focus position with a quick response time that may be unnoticeable during human operation and/or otherwise not impede operation of the assembly and/or an associated imaging apparatus. For example, conventional variable focus implementations (many of which cannot fit in a small form factor apparatus, as describe, achieve a stable focus in 19-21 milliseconds, such that one or more of the example embodiments described herein respond faster than conventional implementations.

Example Apparatuses Including at Least a Discrete Focusing Lens Assembly

Having described various possible implementations of discrete focusing lens assemblies, and the various details thereof, additional description is provided regarding apparatuses integrating at least one discrete focusing lens assembly. It should be appreciated that, in some embodiments, one or more of the of the apparatuses as described may include one discrete focusing lens assembly, for example to replace far-field imaging optics. Alternatively or additionally, in some embodiments, one or more of the apparatuses may include a plurality of discrete focusing lens assemblies, for example at least a first to replace far-field imaging optics and a second to replace near-field imaging optics. As such, the specific embodiments described and/or depicted herein should not limit the scope and spirit of the disclosure.

FIGS. 13A and 13B illustrate an example discrete focusing multi-sensor imaging engine including a discrete focusing lens assembly. Specifically, FIG. 13A depicts a front perspective view of a discrete focusing multi-sensor imaging engine 1300. FIG. 13B depicts a back perspective view of the discrete focusing multi-sensor imaging engine 1300.

The discrete focusing multi-sensor imaging engine 1300 includes various hardware configured to enable capture, transmission, and/or processing of one or more image data objects. For example, the discrete focusing multi-sensor imaging engine 1300 may be configured to capture a near-field image data object representing a near-field of view, and capture a far-field image data object representing a far-field of view. Additionally or alternatively, the discrete focusing multi-sensor imaging engine 1300 may be configured to produce one or more illuminations for capturing such image data objects. Specifically, as illustrated, the discrete focusing multi-sensor imaging engine 1300 includes a near-field lens assembly 1302 associated with a near-field image sensor 1304. The near-field lens assembly 1302 and near-field image sensor 1304 may form a near-field imager configured to receive light from a particular near-field of view and capture said light in a near-field image data object that represents the near-field of view from the perspective of the near-field imager.

Similarly, the discrete focusing multi-sensor imaging engine 1300 includes the discrete focusing lens assembly 100 associated with a discrete focusing image sensor 1306. In this regard, the discrete focusing lens assembly 100 and discrete focusing image sensor 1306 form a far-field imager configured to receive light from a particular far-field of view and capture said light in a far-field image data object that represents the far-field of view from the perspective of the far-field imager. In this regard, the discrete focusing lens assembly 100 may be manipulated, for example via one or more activation signals, to position a lens barrel assembly at various focus positions when desired, for example to configure the discrete focusing lens assembly 100 for focusing for capturing representations of objects at a particular determined and/or predetermined focus range.

The discrete focusing multi0sensor imaging engine 1300 further includes integrated illumination-aimer optics 1308.

In this regard, the integrated illumination-aimer optics may be designed to produce one or more illumination patterns based on incoming light received from one or more illuminator sources (not depicted) of the discrete focusing multi-sensor imaging engine 1300. For example, the integrated illumination-aimer optics 1308 may be associated with illumination optics located underneath the integrated illumination-aimer optics 1308. Additionally or alternatively, in some embodiments, the integrated illumination-aimer optics 1308 is configured to receive an aimer illumination and project a corresponding aimer pattern based on one or more aimer subassemblies of the integrated illumination-aimer optics 1308.

The discrete focusing multi-sensor imaging engine 1300 further includes an imaging board 1310. The imaging board 1310 includes hardware, circuitry, and/or the like, configured to power and/or enable activation of one or more associated components connected with the imaging board 1310. For example, in some embodiments, the imaging board 1310 is connected to at least the near-field image sensor 1304, image sensor 1306, one or more illuminator sources of the discrete focusing multi-sensor imaging engine 1300, and/or one or more aimer sources of the discrete focusing multi-sensor imaging engine 1300. In this regard, the imaging board 1310 may enable activation of each of these components, for example to activate the near-field image sensor 1304 and/or 1306 to cause capture of an image data object. In some such circumstances, the imaging board 1310 further transmits such captured image data objects from the image sensor(s) 1306 and/or 1304 to one or more processors and/or other hardware connected to the discrete focusing multi-sensor imaging engine 1300. Additionally or alternatively, in some embodiments, the imaging board 1310 is connected to at least the discrete focusing lens assembly 100, for example to provide power to and/or otherwise activate one or more coil positioning subassemblies to a desired powered state. In some embodiments, the imaging board 1310 is connected with one or more external processors and/or other circuitry for performing such functionality. In some embodiments, the imaging board 1310 is embodied by one or more printed circuit board(s). For example, in at least one example embodiment, the imaging board 1310 includes a flexible printed circuit board configured to connect various layers on which one or more other components of the discrete focusing multi-sensor imaging engine 1300 may be mounted and/or otherwise connected.

In this regard, the discrete focusing lens assembly 100 may provide variable focusing to the discrete focusing multi-sensor imaging engine 1300 within a range of focus positions based on the design of the discrete focusing lens assembly 100. For example, in at least some embodiments, the discrete focusing lens assembly 100 is configured for positioning at a near focus position, a neutral focus position, and a far focus position. In some such embodiments, the discrete focusing lens assembly 100 may include one or more activation signals to power one or more coil positioning assemblies as determined appropriate to reposition a lens barrel assembly within the discrete focusing lens assembly 100 to a desired focus position for capturing one or more image data objects.

In some embodiments, the discrete focusing lens assembly 100 receives power from one or more components of the discrete focusing multi-sensor imaging engine 1300. For example, in some embodiments, the discrete focusing lens assembly 100 is connected to coil powering circuitry embodied in the discrete focusing multi-sensor imaging engine 1300, such that the coil powering circuitry provides power to the discrete focusing lens assembly 100. In this regard, the coil powering circuitry may set the discrete focusing lens assembly 100 to a powered state by providing a certain value of power (e.g., current and/or voltage) to the discrete focusing lens assembly 100 and/or subcomponents thereof, such as one or more positioning coil assemblies. In some embodiments, the coil powering circuitry is embodied by the imaging board 1310, or at least a portion thereof. In this regard, the discrete focusing lens assembly 100 may be integrated with and/or otherwise connected to the imaging board 1310, which may receive one or more instructions from an included and/or associated processor for providing a determined value of power to the discrete focusing lens assembly 100.

In some embodiments, the discrete focusing multi-sensor imaging engine 1300 may be included in one or more imaging apparatuses. For example, in this regard, FIGS. 14A, 14B, and 14C illustrate an example discrete focusing multi-sensor imaging apparatus 1400, in accordance with at least some example embodiments of the present disclosure. Specifically, FIG. 14A depicts the discrete focusing multi-sensor imaging apparatus 1400 from a front perspective view. FIG. 14B depicts the discrete focusing multi-sensor imaging apparatus 1400 from a top-down orthogonal view. FIG. 14C depicts the discrete focusing multi-sensor imaging apparatus 1400 from a front orthogonal view.

As illustrated, the discrete focusing multi-sensor imaging apparatus 1400 includes the discrete focusing multi-sensor imaging engine 1300 housed within a particular apparatus chassis 1402. In this regard, the apparatus chassis 1402 may be configured to fit each of the components described with respect to the discrete focusing multi-sensor imaging engine 1300. For example, in this regard, the apparatus chassis 1402 may be designed and/or modified to define a discrete focus lens assembly space 1404, such as is illustrated in FIG. 15. The discrete focus lens assembly space 1404 may be configured to fit the discrete focus lens barrel assembly, for example discrete focus lens barrel assembly 100, within the defined discrete focus lens assembly space 1404. In some embodiments, the apparatus chassis 1402 comprises an existing apparatus chassis locally modified to define the discrete focus lens assembly space 1404. In this regard, the discrete focus lens assembly may be implemented in the discrete focusing multi-sensor imaging apparatus without affecting the other configurations of the discrete focusing mufti-sensor imaging engine 1300. Additionally or alternatively, in some embodiments, the apparatus chassis 1402 is designed to enable removal and/or replacements of the discrete focusing lens assembly 100 without requiring dismantling the entirety of the discrete focusing multi-sensor imaging apparatus 1400. For example, as illustrated in FIG. 15, in some embodiments the discrete focusing lens assembly 100 may be readily removed from the discrete focus lens assembly space 1404 and/or inserted into the discrete focus lens assembly space 1404 for operation. In some such implementations, the discrete focus lens assembly space 1404 includes one or more hardware support structures, protrusions, and/or the like configured to engage the discrete focus lens assembly within the discrete focus lens assembly space 1404 and/or otherwise enable connection between the discrete focus lens assembly and one or more components of the discrete focusing multi-sensor imaging engine 1300, such as an imaging board.

In some embodiments, a discrete focusing lens assembly is designed to fit in a minimal form factor apparatus. For example in this regard, in some embodiments, the discrete focusing lens assembly 100 is designed to fit within an apparatus chassis 1402 for use within a small form factor mobile imaging engine. The overlapping and compact nature of the discrete focusing lens assembly 100 enables the assembly to fit within height restricted form factors commonly associated with such mobile imaging environments. For example, in some embodiments, the discrete focusing lens assembly 100 is designed with a height of less than 7 millimeters, such that the discrete focusing lens assembly 100 may fit within a variety of conventional mobile apparatus chasses.

Such imaging apparatuses may further be integrated in any number of larger apparatuses, housings, and/or the like. For example FIG. 16 illustrates a perspective view of an example mobile discrete focusing multi-sensor imaging apparatus 1600. The mobile discrete focusing multi-sensor imaging apparatus 1600 includes a mobile apparatus chassis designed to fit one or more sub-apparatuses and/or sub-assemblies therein. For example, as illustrated, the mobile discrete focusing multi-sensor imaging apparatus 1600 includes a cell phone mobile apparatus chassis 1602. The cell phone mobile apparatus chassis 1602 may be a small form factor apparatus chassis, for example such that the chassis is limited based on a restricted apparatus height. In some such embodiments, for example, the cell phone mobile apparatus chassis 1602 includes a conventional mobile apparatus chassis associated with an apparatus height of approximately 7 millimeters, for example 6.8-7.5 mm.

Further, as illustrated, the mobile discrete focusing multi-sensor imaging apparatus 1600 includes the discrete focusing multi-sensor imaging apparatus 1400. In this regard, the discrete focusing multi-sensor imaging apparatus 1400 may be designed with a sufficiently small form factor to fit within the cell phone mobile apparatus chassis 1602 despite the restricted apparatus height. For example, in this regard the discrete focusing multi-sensor imaging apparatus 1400 may be designed with a height of 6.8 mm. Further, the discrete focusing lens assembly therein includes a minimized profile sufficient for fitting within the discrete focusing multi-sensor imaging apparatus 1400, while the specific design details enable the assembly to response within a desired response rate and without being susceptible to vibrations and/or impact due to the securing of the components, for example using one or more module alignment pins, and minimal physically engaging components for moving the lens barrel assembly therein.

FIGS. 17A and 17B illustrates the various example ranges at which the imagers of an example discrete focusing multi-sensor imaging 1400, such as the discrete focusing multi-sensor imaging engine 1400, capture image data objects from which representations of visual encoded indicia of varying sizes may be successfully read, for example where the visual encoded indicia is detected and/or decoded. For example, in the example context as depicted, the illustrated graph includes such details for a near-field imager (for example, associated with a focus range of 0.31 meters), and a far-field imager including a discrete focus lens assembly as described herein. Specifically, the graph includes a first plot 1702 for the near-field imager associated with a focus range of 0.31 meters, a second plot 1704 for the far-field imager including a discrete focusing lens assembly positioned at a near focus position with a focus range of 1 meter, a third plot 1706 for the far-field imager including the discrete focusing lens assembly positioned at a neutral focus position with a focus range of 1.8 meter, and a fourth plot 1708 for the far-field imager including the discrete focusing lens assembly positioned at a far focus position with a focus range of 6 meters. It should be appreciated that the graph depicts successful reading (e.g., detecting and/or decoding) of various visual encoded indicia as described.

As illustrated, the plot 1702 indicates the near-field imager captures image data objects representing a visual encoded indicia successfully read the visual encoded indicia from a range of approximately 100 mm from the visual encoded indicia to approximately 1500 mm. The read visual encoded indicia included a 13 mil code at the lowest range, to a 4 mil visual representation indicia at approximately 210 mm, to a 25 mil code at max range of approximately 1500 mm. In this regard, the effective range for the near-field imager may be defined based on these parameters and the particular visual encoded indicia to be read.

The far-field imager including a discrete focusing lens assembly positioned for a focus range of 1 meter successfully read the visual encoded indicia from a range of approximately 460 mm to approximately 1800 mm. The read visual encoded indicia included a 25 mil visual encoded indicia at the minimum range, to an approximately 4.5 mil visual encoded indicia at approximately 1000 m, to a 25 mil visual encoded indicia at the max range of approximately 1800 mm. The far-field imager including a discrete focusing lens assembly positioned for a focus range of 1.8 meter successfully read the visual encoded indicia from a range of approximately 1140 mm to 4450 mm. The read visual encoded indicia included a 25 mil visual encoded indicia at approximately 1125 mm, to an approximately 7 mil visual encoded indicia at approximately 1650 mm, to a 25 mil visual encoded indicia at the max range of 4450 mm. Within this range, various sized conventional visual encoded indicia types were successfully read up to particular max ranges. For example, range marker 1710 indicates a maximum range at which a 10 mil C39 visual encoded indicia was successfully read, in particular at 2500 mm (2.5 m/8.2 ft). Further, range marker 1712 indicates a maximum range at which a 13 mil UPC visual encoded indicia was successfully read, in particular at 3200 mm (3.2 m/10.5 ft).

Additionally, as illustrated, the far-field imager including a discrete focusing lens assembly positioned for a focus range of 6 meters read at a much larger range. For example, as illustrated, the read visual encoded indicia included a 25 mil visual encoded indicia at the minimum range of approximately 3190 mm, to an approximately 16.5 mil visual encoded indicia at approximately 3600 mm, to an approximately 21 mil visual encoded indicia at 5000 mm. Within this range, range marker 1714 indicates a maximum range at which a 20 mil C39 visual encoded indicia was successfully read, in particular at 4800 mm (4.8 m/15.7 ft).

FIG. 17B illustrates a second graph across a much larger range scale, specifically from 0 mm to 26000 mm, and for various larger sizes of visual encoded indicia, specifically from 0 mil to 100 mil. In this regard, the graph includes an extended plot 1752 for the far-field imager including a discrete focusing lens assembly positioned at the far focus position with a focus range of 6 meters. As illustrated, the read visual encoded indicia continued from a 21 mil visual encoded indicia at 5000 mm to a 100 mil visual encoded indicia at 25000 mm. Within this range, range marker 1754 indicates a maximum range at which a 50 mil C39 visual encoded indicia was successfully read, in particular at 14000 mm (14 m/46 ft). Additionally, range marker 1756 indicates a maximum range at which a 100 mil C39 visual encoded indicia was successfully read, in particular at the maximum range of 25000 mm (25 m/82 ft).

In this regard, in some example embodiments, utilization of a discrete focusing lens assembly enables the effective range of a multi-sensor imaging apparatus to improve at far ranges. Such far range improvements may be obtained without affecting near range performance for the imaging apparatus. For example, whereas conventional far-field imagers may be configured to successfully read a 100 mil code at about 10 meters, one or more embodiments described herein may successfully read at 25 meters with the same near range performance. Further, as the size of the visual encoded indicia to be read increases, such improvements further enable reading of the visual encoded indicia from several meters away to several tens of meters away. As such, some example discrete focusing lens assemblies provide such advantages in effective reading range in addition to improvements in resistance against vibrations and/or impact and while maintaining sufficiently fast response times.

Example Processes for Discrete Focusing Lens Assembly

Having described various aspects of discrete focusing lens assemblies and associated apparatuses, additional description is provided with respect to assembly of one or more discrete focusing lens assemblies in accordance with at least some example embodiments herein. It should be appreciated that, in this regard, operations for assembling a discrete focusing lens assembly as described herein provide a particular process, which may be utilized to create a particular machine for utilization as described herein. Additionally or alternatively, it should be appreciated that one or more operations and/or subprocesses of the processes described may be implemented in any order, such that embodiment processes may include one or more steps in orders other than described and/or depicted. As such, the specific implementations as depicted and/or described should not limit the scope and spirit of this disclosure.

FIG. 18 depicts an example visualization for a process of assembling various components to form a discrete focusing lens assembly in accordance with at least one example embodiment as described herein. In this regard, FIG. 18 depicts various components and the corresponding intermediate components formed as the discrete focusing lens assembly 1828 is assembled. In some embodiments, the various depicted components are assembled as described with respect to the process depicted in FIGS. 19-21.

As illustrated, one or more positioning magnets 1802 is/are mounted to an open frame lens barrel 1804 to form a barrel-magnet assembly 1806. As illustrated, for example, the barrel-magnet assembly 1806 includes a pair of positioning magnets mounted opposite one another in defined spaces on the open frame lens barrel 1804. an imaging lens 1808 is inserted into the barrel-magnet assembly 1806, forming the lens barrel assembly 1810. The lens barrel assembly 1810 is inserted into an inner module space defined by a module base 1812, and module alignment pins 1814 are inserted to position and/or align the lens barrel assembly 1810 within the module base 1812, to form a secured module-lens barrel assembly 1816. In some embodiments, the module base 1812 and/or open frame lens barrel 1804 include one or more module alignment pin openings designed to receive the module alignment pins 1814 for positioning and/or aligning, and/or locking the position and/or alignment, of such components.

Afterwards, before, or in parallel with assembling the secured module-lens barrel assembly 1816, one or more positioning coil assemblies 1826 are assembled. As illustrated, each positioning coil 1818 receives a positioning pad 1820 secured into an inner coil region defined by the positioning coil 1818 to form a coil-pad assembly 1822. A coil-pad flex connector 1824 is attached to the coil-pad assembly 1822 to form a positioning coil assembly 1826. Such operations form a subroutine for forming a positioning coil assembly 1826, which may be repeated any number of times to assemble a desired number of positioning coil assembly 1826. For example, as illustrated, the subroutine may be performed twice to assemble a pair of positioning coil assemblies 1826. Additionally or alternatively, in some embodiments, the positioning coil assemblies are attached to a coil component board (not depicted) for attachment to a module base, such as the module base 1812.

Upon assembling the desired number of positioning coil assemblies 1826, the positioning coil assemblies 1826 are attached to the secured module-lens barrel assembly 1816 to form the discrete focusing lens assembly 1828. In some embodiments, a pair of positioning coil assemblies 1826 is attached. For example, in at least one example embodiment, a first positioning coil assembly 1826 is attached at a top coil location of the secured module-lens barrel assembly 1816, and a second positioning coil assembly 1826 is attached opposite the top coil location at a bottom coil location of the secured module-lens barrel assembly 1816. In some embodiments, each of the positioning coil assembly 1826 is attached to the secured module-lens barrel assembly 1816 using the coil-pad flex connector 1824. Alternatively or additionally in some embodiments, each of the positioning coil assembly 1826 is attached to a positioning coil board using the coil-pad flex connector 1824, for example at a first coil location opposite a second coil location, and the positioning coil board is secured to the secured module-lens barrel assembly 1816 using the module alignment pins 1814. For example, the module alignment pins 1814 may be engaged with module alignment openings of the positioning coil board.

FIG. 19 illustrates a flowchart depicting example operations of an example process 1900 for assembling a discrete focusing lens assembly, in accordance with at least some example embodiments of the present disclosure. In some embodiments, a human operator may perform some or all of the depicted operations alone or in conjunction with one or more human-operated machines and/or tools. Additionally or alternatively, in some embodiments, a machine operator performs some or all of the depicted operations.

The process 1900 begins at block 1902. Block 1902 includes assembling a lens barrel, a pair of positioning magnets, and an imaging lens to form a lens barrel assembly. Additionally, in at least some such embodiments, the lens barrel assembly comprises a first positioning magnet of the pair of positioning magnets mounted opposite a second positioning magnet of the pair of positioning magnets. In some embodiments, each positioning magnet is mounted using one or more adhesive and/or chemical securing means. In other embodiments, each positioning magnet is physically secured by engaging with the lens barrel. In some embodiments, the process for assembling the lens barrel, the pair of positioning magnets, and the imaging lens to form the lens barrel assembly includes one or more subprocesses, for example process 2000 as described below with respect to FIG. 20.

Block 1904 includes inserting the lens barrel assembly into a module space defined by a module base. The module space may be defined based on one or more outer structures of the module base, for example one or more walls, such that the module space defines an inner enclosure defined by the structure of the module base. In some embodiments, the module space is defined with sufficient volumetric dimensions to enable the lens barrel assembly to fit within the defined module space. Additionally or alternatively, in some embodiments, the module base includes one or more alignment pin openings for positioning and/or aligning the lens barrel assembly within the module base, as described.

Block 1906 includes engaging at least one module alignment pin with the lens barrel assembly through the at least one alignment pin opening of the module base. In some embodiments the module alignment pin engages at least one alignment pin opening of the module base and at least one module pin opening of the lens barrel assembly. In this regard, the lens barrel assembly may be engaged such that the lens barrel assembly may still slide along the module alignment pin, when force is applied to the lens barrel assembly, to reposition within the module base. In this regard, the module alignment pin may enable the barrel lens assembly to remain properly positioned and/or aligned within the module base while still repositioning to a desired focus position.

Block 1908 includes assembling a first positioning coil assembly and a second positioning coil assembly. In this regard, each positioning coil assembly may include at least a positioning coil and a corresponding positioning pad. The positioning coil assembly may be assembled for attaching to one or more other components as described. In some embodiments, the process for assembling the first positioning coil assembly and/r the second positioning coil assembly includes one or more subprocesses, for example process 2100 as described below with respect to FIG. 21.

Block 1910 includes attaching, on the module base, the first positioning coil assembly and the second positioning coil assembly. The first positioning coil assembly may be positioned opposite the second positioning coil assembly, for example such that the first positioning coil assembly is located at a coil location on top of the module base and the second positioning coil is located at a second coil location opposite the first coil location on bottom of the module base. In other embodiments, the first positioning coil assembly and/or second positioning coil assembly are attached on the module base through attaching the first positioning coil assembly and/or the second positioning coil assembly to a positioning coil board, and attaching the positioning coil board to the module base. For example, as described, in some embodiments the module alignment pints engage one or more module positioning openings of the positioning coil board to position and/or align the positioning coil board with the module base.

FIG. 20 illustrates a flowchart depicting example operations of an example process 2000 for assembling a lens barrel, a pair of positioning magnets, and an imaging lens to form a lens barrel assembly, in accordance with at least some example embodiments of the present disclosure. In some embodiments, a human operator may perform some or all of the depicted operations alone or in conjunction with one or more human-operated machines and/or tools. Additionally or alternatively, in some embodiments, a machine operator performs some or all of the depicted operations.

The process 2000 begins at block 2002. Block 2002 includes mounting the pair of positioning magnets to the lens barrel to form a barrel-magnet assembly. As described, the pair of positioning magnets may be mounted opposite one another, for example with a first positioning magnet located on top of the lens barrel and a second positioning magnet located on bottom of the lens barrel. Further as described, each of the positioning magnets may be mounted utilizing physical means and/or chemical means, such as one or more epoxies, adhesives, and/or the like.

Block 2004 includes inserting the imaging lens within the barrel-magnet assembly to form the lens barrel assembly. In some embodiments, the lens barrel is designed to include a front aperture and a back aperture to enable light to traverse through the lens barrel. In some embodiments, the imaging lens matches, or substantially matches, the aperture shape sufficient to maintain the position of the imaging lens within the imaging barrel. For example, in an example context where the lens barrel defines a circular aperture of a particular diameter, the imaging lens may similarly include a circular and/or cylindrical design matching the diameter of the aperture, or slightly smaller sufficient to fit the imaging lens within the aperture. In some embodiments, one or more adhesives and/or physical means are utilized to secure the imaging lens within the barrel-magnet assembly. For example, in some embodiments, the barrel lens defines a slot configured to receive the imaging lens when the imaging lens is positioned and/or aligned properly.

Upon completion of block 2004, in some embodiments, flow returns to one or more other blocks of the flows as described and/or illustrated. For example, in some embodiments, flow returns to block 1904 to continue the process described above with respect to FIG. 19. Additionally or alternatively, in other embodiments, the process ends upon completion of block 2004.

FIG. 21 illustrates a flowchart depicting example operations of an example process 2100 for assembling a positioning coil assembly, in accordance with at least some example embodiments of the present disclosure. It should be appreciated that the process may be repeated for any number of positioning coil assemblies, for example for a first coil assembly and a second coil assembly. In some embodiments, a human operator may perform some or all of the depicted operations alone or in conjunction with one or more human-operated machines and/or tools. Additionally or alternatively, in some embodiments, a machine operator performs some or all of the depicted operations.

The process 2100 begins at block 2102. In some embodiments, block 2102 begins after one or more blocks as depicted and/or described with respect to the other flowcharts herein, for example after block 1906 as depicted with respect to FIG. 19. Block 2102 includes inserting a positioning pad into a coil inner region defined by a positioning coil to form a coil-pad assembly. In some embodiments, a positioning coil embodies one or more wound wires, such that the wound wires surrounds the coil inner region. Accordingly, a positioning pad may be of a sufficient size to fit within the coil inner region defined by the positioning coil. In some embodiments, the positioning pad is secured within the coil inner region by any of a number of known physical and/or chemical means.

Block 2104 includes attaching a flex connector to the coil-pad assembly to form the positioning coil assembly. In some embodiments, a flex connector includes one or more printed circuit boards, hardware, and/or other circuitry configured to enable connection of the positioning coil to powering and/or controlling hardware. For example, in some embodiments, the flex connector includes a flexible printed circuit board to enable connection of the positioning coil assembly with one or more circuits, hardware, and/or the like configured to power the positioning coil to a powered state. In some embodiments, the flex connector is attached to the underside of the positioning coil by any of a number of known physical and/or chemical means. In some such embodiments, the flex connector may be utilized to connect the positioning coil assembly to hardware for powering the positioning coil, and/or associated hardware further connected to such powering hardware.

Upon completion of block 2104, in some embodiments, flow returns to one or more other blocks of the flows as described and/or illustrated. For example, in some embodiments, flow returns to block 1910 to continue the process described above with respect to FIG. 19. Additionally or alternatively, in other embodiments, the process ends upon completion of block 2104.

CONCLUSION

It should be appreciated that the example implementations described herein are each non-limiting examples of various embodiments of the present disclosure. In this regard, one or more enhancements implemented in the various embodiments may be provided in any combination. Additionally or alternatively, in some embodiments, one or more components may be provided with modifications as described herein.

For example, some embodiments may provide for any number of focus positions, and others may provide for a limited number of discrete focus positions (e.g., a far focus position, a neutral focus position, and a near focus position). Additionally or alternatively, embodiment imaging apparatuses may include any number of discrete focusing lens assemblies each configured in any of a number of ways, for example within different discrete focusing positions. Such implementations are intended to be covered by the disclosure herein and the scope of the appended claims provided herein.

The embodiments disclosed have been described with certain example configurations and/or implementation details. It should be appreciated that in other embodiments, for example, components may be embodied by other materials known in the art for creating such components and/or structural equivalents. Further, it should be appreciated that embodiments may include any number of known structural elements, or utilize known methodologies, for securing the components and/or sub-components thereof (e.g., for securing one or more LEDs, or other components, to a circuit board or other printed circuit board) without deviating from the scope and spirit of the disclosure.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel operations may be advantageous. Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve the desirable results described and/or claimed.

What is claimed is:

1. A discrete focusing lens assembly comprising:
   a lens barrel, wherein the lens barrel includes a first positioning magnet and a second positioning magnet; and
   wherein the first positioning magnet and the second positioning magnets are mounted opposite to each other;
   a positioning coil board comprising at least a first positioning coil assembly and a second positioning coil assembly;
   a module base defining an inner module space designed to fit the lens barrel assembly, and wherein the module base is designed to support the first positioning coil assembly at a first coil position and the second positioning coil assembly at a second coil position, the first coil position opposite the second coil position; and
   at least one module alignment pin engaged with the module base, the positioning coil board, and the lens barrel assembly,
   wherein the first positioning coil assembly and the second positioning coil assembly, together with the lens barrel assembly, define a focus position for the lens barrel assembly.

2. The discrete focusing lens assembly of claim 1, wherein the first positioning coil assembly comprises a first positioning coil, wherein the first positioning coil is positioned around a first positioning pad, and wherein the second positioning coil assembly comprises a second positioning coil, wherein the second positioning coil is positioned around a second positioning pad, and wherein the lens barrel assembly comprises a first positioning magnet located adjacent to the first positioning pad, a second positioning magnet located adjacent to the second positioning pad, and an imaging optical lens, wherein first positioning pad, the first positioning coil, and the first positioning magnet together with the second positioning pad, the second positioning coil, and the second positioning magnet define the focus position for the lens barrel assembly.

3. The discrete focusing lens assembly of claim 2, wherein the first positioning pad is located in a first coil inner region defined by the first positioning coil and the second positioning pad is located in a second coil inner region defined by the second positioning coil.

4. The discrete focusing lens assembly of claim 1, wherein the module base, the positioning coil board, and the lens barrel assembly each comprise at least one alignment pin opening, each alignment pin opening positioned to enable the at least one module alignment pin to engage each of the module base, the positioning coil board, and the lens barrel assembly through the at least one alignment pin opening.

5. The discrete focusing lens assembly of claim 1, wherein the module base, the positioning coil board, and the lens barrel assembly each comprise a first alignment pin opening and a second alignment pin opening, each of the first alignment pin openings located opposite one of the second alignment pin openings, and wherein the at least one module alignment pin comprises a first alignment pin and a second alignment pin, wherein the first alignment pin is engaged with the module base, the positioning coil board, and the lens barrel assembly via each of the first alignment pin openings, and wherein the second alignment pin is engaged with the module base, the positioning coil, and the lens barrel assembly via each of the second alignment pin openings.

6. The discrete focusing lens assembly of claim 2, wherein the first positioning pad comprises a first iron positioning pad, and wherein the second positioning pad comprises a second iron positioning pad.

7. The discrete focusing lens assembly of claim 1, wherein the focus position for the lens barrel assembly comprises a first focus position in a circumstance where the positioning coil board is in a first powered state, wherein the focus position for the lens barrel assembly comprises a second focus position in a circumstance where the positioning coil board is in a second powered state, and wherein the focus position for the lens barrel assembly comprises a default focus position in a circumstance where the positioning coil board is in a non-powered state.

8. The discrete focusing lens assembly of claim 2, wherein the focus position comprises a default focus position in a circumstance where the positioning coil board is in a non-powered state, and wherein the first positioning pad is aligned with the first positioning magnet and the second positioning pad is aligned with the second positioning magnet at the default focus position.

9. The discrete focusing lens assembly of claim 1, further comprising:
coil powering circuitry connected to the positioning coil board, the first positioning coil assembly, the second positioning coil assembly, or a combination thereof, wherein the coil powering circuitry is configured to power the first positioning coil assembly, the second positioning coil assembly, or a combination thereof.

10. The discrete focusing lens assembly of claim 1, wherein the module base comprises a first positioning area to receive the first positioning coil assembly and a second positioning area to receive the second positioning coil assembly.

11. The discrete focusing lens assembly of claim 1, wherein the at least one module alignment pin comprises a friction-free pin.

12. The discrete focusing lens assembly of claim 1, further comprising:
a lens mount for mounting the discrete focusing lens assembly within an imaging apparatus, wherein the lens mount is attached to the module base.

13. A multi-sensor imaging apparatus comprising:
an apparatus chassis configured to house at least a discrete focusing lens assembly and at least one additional lens assembly, wherein the discrete focusing lens assembly comprises:
a lens barrel, wherein the lens barrel includes a first positioning magnet and a second positioning magnet; and
wherein the first positioning magnet and the second positioning magnets are mounted opposite to each other;
a first positioning coil assembly comprising a first positioning coil, wherein the first positioning coil is positioned around a first positioning pad;
a second positioning coil assembly comprising a second positioning coil, wherein the second positioning coil is positioned around a second positioning pad;
a module base defining an inner module space designed to fit the lens barrel assembly, and wherein the module base is designed to support the first positioning coil assembly at a first coil position and the second positioning coil assembly at a second coil position, the first coil position opposite the second coil position; and
at least one module alignment pin engaged with the module base, the positioning coil assembly, and the lens barrel assembly.

14. The multi-sensor imaging apparatus of claim 13, wherein the lens barrel assembly comprising the first positioning magnet located adjacent to the first positioning pad, the second positioning magnet located adjacent to the second positioning pad.

15. The multi-sensor imaging apparatus of claim 14, wherein the first positioning pad, the first positioning coil, and the first positioning magnet together with the second positioning pad, the second positioning coil, and the second positioning magnet define a focus position for the lens barrel assembly.

16. A method of assembling a lens barrel assembly for a discrete focusing lens assembly, the method comprising:
assembling a lens barrel, a pair of positioning magnets, and an imaging lens to form a lens barrel assembly, wherein the lens barrel assembly comprises a first positioning magnet of the pair of positioning magnets mounted opposite a second positioning magnet of the pair of positioning magnets;
inserting the lens barrel assembly into a module space defined by a module base, the module base comprising at least one alignment pin opening;
engaging at least one module alignment pin with the lens barrel assembly through the at least one alignment pin opening of the module base;
assembling a first positioning coil assembly and a second positioning coil assembly; and
attaching, on the module base, the first positioning coil assembly and the second positioning coil assembly, the first positioning coil assembly positioned opposite the second positioning coil assembly.

17. The method of claim 16, wherein assembling the first positioning coil assembly comprises:
inserting a first positioning pad into a first coil inner region defined by a first positioning coil to form a first coil-pad assembly; and
attaching a flex connector to the first coil-pad assembly to form the first positioning coil assembly.

* * * * *